US006567281B2

(12) United States Patent
Riggio et al.

(10) Patent No.: US 6,567,281 B2
(45) **Date of Patent: *May 20, 2003**

(54) INDIVIDUAL OR DISTRIBUTED NON-SATURATING MAGNETIC ELEMENT(S) POWER CONVERTERS AND MULTI-STAGE CONVERTERS

(75) Inventors: Christopher Allen Riggio, Longmont, CO (US); Garth Blair Woodland, Littleton, CO (US)

(73) Assignee: Online Power Supply, Inc., Centennial, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/100,448

(22) Filed: Mar. 18, 2002

(65) Prior Publication Data

US 2002/0172056 A1 Nov. 21, 2002

Related U.S. Application Data

(60) Continuation of application No. 09/923,027, filed on Aug. 6, 2001, which is a division of application No. 09/410,849, filed on Oct. 1, 1999, now Pat. No. 6,272,025.

(51) Int. Cl.[7] .............................................. H02M 3/335
(52) U.S. Cl. ............................ 363/24; 363/40; 363/133
(58) Field of Search ............................. 363/15, 16, 17, 363/24, 25, 26, 39, 40, 41, 97, 98, 132, 133

(56) References Cited

U.S. PATENT DOCUMENTS 3,581,212 A 5/1971 McMurray (List continued on next page.)

FOREIGN PATENT DOCUMENTS

CH 659 156 A5 12/1986 ............. H02J/1/10

(List continued on next page.)

OTHER PUBLICATIONS

Diestung K: "Netzfilter", Radio Fernsehen Elektronik, De, Veb Verlag, Technik, Berlin, vol. 42, No. 11, Nov. 1, 1993, pp. 43–46, XP000466223, ISSN: 1436–1574, p. 46, left–hand column, paragraph 1.

(List continued on next page.)

*Primary Examiner*—Jessica Han
(74) *Attorney, Agent, or Firm*—Rick Martin; Patent Law Offices of Rick Martin, P.C.

(57) ABSTRACT

Single, multistage, and distributed magnetic switched and tank resonant power conversion systems utilizing NSME. The NSME provide, superior protection to conducted lightning transients, superior thermal operating bandwidth, higher magnetizing efficiency, greater flux/power density potential and form factor flexibility when implemented with the disclosed circuit strategies. Output voltage is maintained substantially constant and ripple free in the presence of line and load variations by the action of various feedback strategies. These mechanisms combine to produce compensations by controlling the duration and/or frequency of a switch or switches. A novel function generator implementation supplies a signal, which is a function of magnetic flux tracking, AC line phasing, and output voltage feedback to provide output regulation, active ripple rejection, and power factor correction to the AC line. Efficient energy storage and transfer is achieved by the optimized application of NSME. The use of efficient rectifying flyback management techniques protects switches and provides additional output. A second novel generator implementation supplies a two-phase signal, which is a function of switching frequency/duty cycle, and output voltage, provides regulation. Further efficiencies are realized by the inclusion of switching buffers that substantially reduce switching losses by presenting a high slew rate, low source impedance critically damped drive current to the main switch or switches.

31 Claims, 37 Drawing Sheets

U.S. PATENT DOCUMENTS

| | | | | |
|---|---|---|---|---|
| 3,824,441 | A | | 7/1974 | Heyman et al. |
| 3,824,450 | A | | 7/1974 | Johnson et al. |
| 4,353,112 | A | | 10/1982 | Rietveld et al. |
| 4,541,039 | A | | 9/1985 | Sandler |
| 4,625,271 | A | | 11/1986 | Chetty et al. |
| 4,841,165 | A | | 6/1989 | Bowles |
| 4,994,952 | A | | 2/1991 | Silva et al. |
| 5,041,956 | A | | 8/1991 | Marinus |
| 5,282,125 | A | | 1/1994 | Dhyanchand et al. |
| 5,282,126 | A | | 1/1994 | Hüsgen |
| 5,285,369 | A | | 2/1994 | Balakrishnan |
| 5,349,514 | A | * | 9/1994 | Ushiki et al. ............. 363/97 X |
| 5,392,206 | A | | 2/1995 | Peterson et al. |
| 5,555,150 | A | | 9/1996 | Newman, Jr. |
| 5,644,480 | A | | 7/1997 | Sako et al. |
| 5,646,832 | A | | 7/1997 | Pulhamus, Jr. et al. |
| 5,689,409 | A | | 11/1997 | Scharlach et al. |
| 5,703,767 | A | | 12/1997 | Stacey |
| 5,715,153 | A | | 2/1998 | Lu |
| 5,742,495 | A | | 4/1998 | Barone |
| 5,754,413 | A | | 5/1998 | Fraidlin et al. |
| 5,812,383 | A | | 9/1998 | Majid et al. |
| 5,812,385 | A | | 9/1998 | Leu |
| 5,875,103 | A | | 2/1999 | Bhagwat et al. |
| 5,880,942 | A | | 3/1999 | Leu |
| 5,943,225 | A | | 8/1999 | Park |
| 5,949,154 | A | | 9/1999 | Williams |
| 6,272,025 | B1 | * | 8/2001 | Riggio et al. ................. 363/24 |

FOREIGN PATENT DOCUMENTS

| | | | |
|---|---|---|---|
| DE | 23 42 294 | 2/1975 | ........... H01F/19/08 |
| DE | 36 40 661 A1 | 6/1988 | ............ H02H/9/04 |
| EP | 0 351 144 A1 | 1/1990 | .......... H03K/17/08 |
| EP | 0 375 020 A2 | 6/1990 | ............ H02H/9/04 |
| EP | 0 435 460 A2 | 7/1991 | ............. H02J/3/46 |
| EP | 0 474 611 A2 | 3/1992 | ............ H02M/7/06 |
| EP | 0 555 648 A2 | 8/1993 | ......... H03K/17/687 |
| EP | 0 782 244 A1 | 7/1997 | ............ H02M/7/06 |
| JP | 63 316919 A | 12/1988 | .......... H03K/17/16 |
| JP | 01 085530 A | 3/1989 | ............ H02H/9/04 |
| JP | 08 205516 A | 8/1996 | ............ H02M/1/00 |
| JP | 11260616 | 9/1999 | ........... H01F/1/147 |
| WO | WO 97/30569 | 8/1997 | ........... H05B/41/14 |
| WO | WO 98/12796 | 3/1998 | .......... H02M/3/335 |
| WO | WO 98/40961 | 9/1998 | ............ H02M/3/04 |

OTHER PUBLICATIONS

Duguay L: "Improving Ruggedness of Rectifiers under Powser Line Disturbances" Proceedings of the International Telecommuncations Conference (Intelec), US, New York, IEEE, Vol. Conf. 17, Oct. 29, 1995, pp. 476–482, XP00729697 ISBN: 0–7803–2751–9, Figure 1.

Flat–transformer technology allows higher–density, lower–cost power converters, Spencer Chin, Jul. 1998, Electronic Products.

Mathews K: "60–mA Current Source Feeds Telecomm Lines", EDN Electrical Design News, US, Cahners Publishing Co., Newton, Massachusetts, vol. 42, No. 26, Dec. 18, 1997, p. 102, XP 0000773059, ISSN: 0012–7515, Figure 1.

Yoshida K et al: "A Novel Current Resonant XVS–PWM Half–Bridge Converter", Electronics & Communications in Japan, Part I—Communications, US, Scripta, Technica, New York, vol. 82, No. 4, Apr. 1999, pp. 45–55, XP000793113, ISSN: 8756–6621—whole document.

* cited by examiner

INDIVIDUAL OR DISTRIBUTED NON-SATURATING MAGNETIC ELEMENT(S) POWER CONVERTERS AND MULTI-STAGE CONVERTERS

CROSS REFERENCE APPLICATIONS

This application is a continuation application of application Ser. No. 09/923,027 filed Aug. 6, 2001 which is a divisional of application Ser. No. 09/410,849 filed Oct. 1, 1999 and issued as U.S. Pat. No. 6,272,025 on Aug. 7, 2001.

FIELD OF INVENTION

The present invention relates to converters, power supplies, more particularly, to single, or multi stage, AC/DC or DC/DC isolated and non-isolated push-pull converters including but not limited to, forward, flyback, buck, boost, push pull, and resonant mode converters, and power supplies, having individual or distributed NSME with high speed FET switching and efficient flyback management and or having input PFC (power factor correction) and input protection from lightning transients. The invention also allows the magnetic element(s) be distributed to accommodate packaging restrictions, multiple secondary windings, or operation at very high winding voltages.

BACKGROUND OF THE INVENTION

There are several basic topologies commonly used to implement switching converters.

A DC-DC converter is a device that converts a DC voltage at one level to a DC voltage at another level. The converter typically includes a magnetic element having primary and secondary windings wound around it to form a transformer. By opening and closing the primary circuit at appropriate intervals control over the energy transfer between the windings occurs. The magnetic element provides an alternating voltage and current whose amplitude can be adjusted by changing the number and ratio of turns in each set of the windings. The magnetic element provides galvanic isolation between the input and the output of the converter.

One of the topologies is the push-pull converter. The output signal is the output of an IC network that switches the transistors alternately "on" and "off". High frequency square waves on the transistor output drive the magnetic element into AC (alternating current) bias. The isolated secondary outputs a wave that is rectified to produce DC (direct current). The push-pull converters generally have more components as compared to other topologies. The push-pull approach makes efficient use of the magnetic element by producing AC bias, but suffers from high parts count, thermal derating, oversized magnetics, and elaborate core reset schemes. The destructive fly-back voltages occurring across the switches are controlled through the use of dissipative snubber networks positioned across the primary switches. Another of the topologies is the forward converter. When the primary of the forward converter is energized, energy is immediately transferred to the secondary winding. In addition to the aforementioned issues the forward converter suffers from inefficient (dc bias) use of the magnetic element. The prior art power supplies use high permeability gapped ferrite magnetic elements. These are well known in the art and are widely used. The magnetics of the prior art power supplies are generally designed for twice the required power rating and require complex methods to reset and cool the magnetic elements resulting in increased costs and limited operating temperatures. This is because high permeability magnetic elements saturate during operation producing heat in the core, which increases permeability and lowers the saturation threshold. This produces runaway heating, current spikes and/or large leakage currents in the air gap, reduced efficiency, and ultimately less power at higher temperatures and/or high load. The overall effects are, lower efficiency, lower power density, and forced air/heatsink dependant supplies that require over-rated ferrite magnetic elements for a given output over time, temperature, and loading.

IMPROVEMENTS

The combined improvements of the invention translate to higher system efficiencies, higher power densities, lower operating temperatures, and, improved thermal tolerance thereby reducing or eliminating the need for forced air cooling per unit output. The non-saturating magnetic properties are relatively insensitive to temperature (see FIG. 17), thus allowing the converter to operate over a greater temperature range. In practice, the operating temperature for the NSME is limited to 200C by wire/core insulation; the non-saturating magnetic material remains operable to near its Curie temperature of 500C.

What are needed are converters having circuit strategies that make advantageous use of individual and distributed NSME.

What are needed are converters having buffer circuits that provide fast, low impedance critically damped switching of the main FET's.

What are needed are converters that incorporate efficient multiple "stress-less" flyback management techniques to rectify and critically damp excessive node voltages across converter switches.

What are needed are converters having flux feedback frequency modulation.

What are needed are converters that correct AC power factor.

What is needed are converters that meet or exceed class B conducted EMI requirements.

What are needed are converters tolerant of lightning and harsh thermal environments. The present invention addresses these and more.

SUMMARY OF THE INVENTION

The main aspect of the present invention is to implement converters having circuit strategies that make advantageous use of individual and distributed NSME for the achievement of the key performance enhancements disclosed herein.

Another aspect of the present invention is to provide unique resonant tank circuit converter strategies with individual and distributed NSME that make use of higher primary circuit voltage excursions in the production of high frequency/high density magnetic flux.

Another aspect of the present invention is a high energy density single stage frequency controlled resonant tank converter topology enabled by the use of individual and distributed NSME. Another aspect of the present invention is to provide a converter design that utilizes a FET drive technique consisting of an ultra fast, low RDS on N-channel FET for charging the main FET gate and an ultra fast P-channel transistor for discharging the main FET gate.

Another aspect of the present invention is to provide converters that incorporate efficient multiple "stress-less" flyback management techniques to rectify and critically damp excessive node voltages across converter switches.

Another aspect of the present invention is to provide a converter having core (flux) synchronized zero crossing frequency modulation. Another aspect of the present invention is to present a high power factor to the AC line.

Another aspect of the present invention is to provide protection from high voltage (input line) transients.

Another aspect of the present invention is to combine distributed magnetics advantageously with the other converter aspects.

Another aspect of the present invention is active ripple rejection provided by several high-gain high-speed isolated control and feedback systems.

Other aspects of this invention will appear from the following description and appended claims, reference being made to the accompanying drawings forming a part of this specification wherein like reference characters designate corresponding parts in the several views.

Before explaining the disclosed embodiments of the present invention in detail, it is to be understood that:

The invention is not limited in its application to the details of the particular arrangements shown or described, since the invention is capable of other embodiments.

The expression "distributed magnetic(s)" refers to the configuration of multiple magnetic elements that share a single series coupled primary winding to induce isolated output currents from multiple series or parallel secondary windings.

Also, the terminology used herein is for the purpose of description not limitation.

DESCRIPTION OF THE PREFERRED EMBODIMENT

In this and other descriptions contained herein, the following symbols shall have the meanings attributed to them: "+" shall indicate a series connection, such as resistor A in series with resistor B shown as "A+B". "||" Shall indicate a parallel connection, such as resistor A in parallel with resistor B shown as "A||B".

Figure 7:
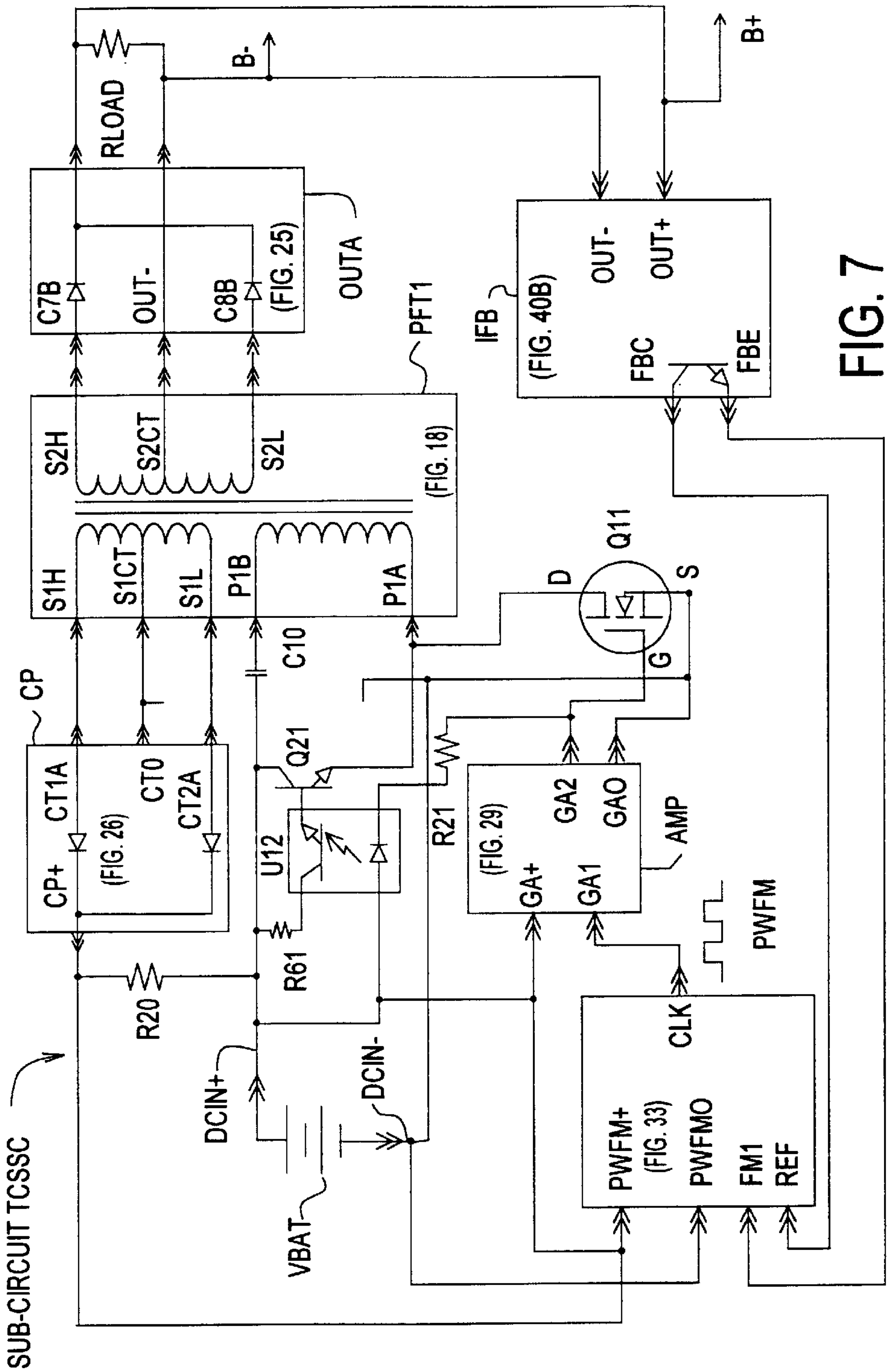
FIG. 7 is the preferred embodiment schematic for a tank coupled single stage converter sub-circuit TCSSC.

Referring first to FIG. 7, a schematic diagram of the preferred embodiment of the invention.

Figure 33:
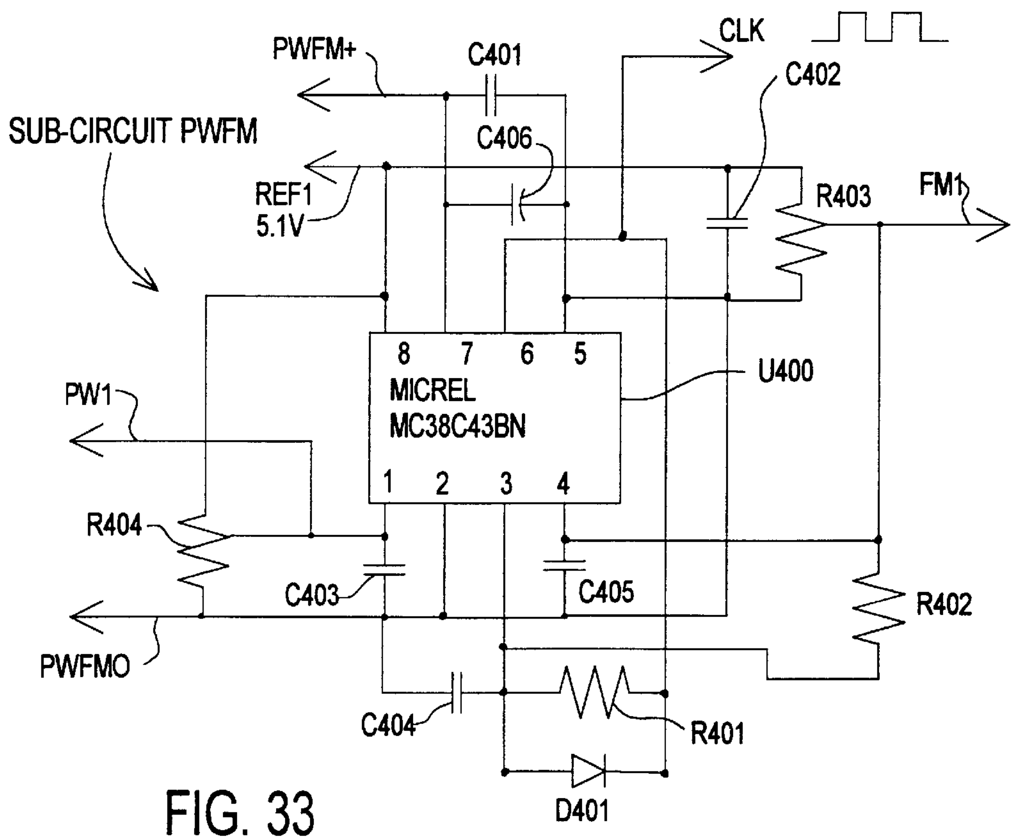
FIG. 33 is a schematic diagram of the pulse-width/Frequency modulator sub-circuit PWFM.

FIG. 7 is a schematic of the preferred embodiment of a tank coupled single stage converter sub-circuit TCSSC. Sub-circuit TCSSC consists of resistor R20 and RLOAD, capacitor C10, transistors Q21 and Q11, sub-circuit CP (FIG. 26), sub-circuit. PFT1 (FIG. 18), sub-circuit OUTA (FIG. 25), sub-circuit AMP (FIG. 29), sub-circuit IFB (FIG. 40B) and sub-circuit PWFM (FIG. 33).

| FIG. 7 Element | Table Value/part number |
|---|---|
| R20 | 1k ohms |
| R61 | 2k ohms |
| Q21 | TST541 |
| U12 | 4N29 |
| Q11 | IRFP460 |
| C10 | 1.8 uf |

Figure 18:
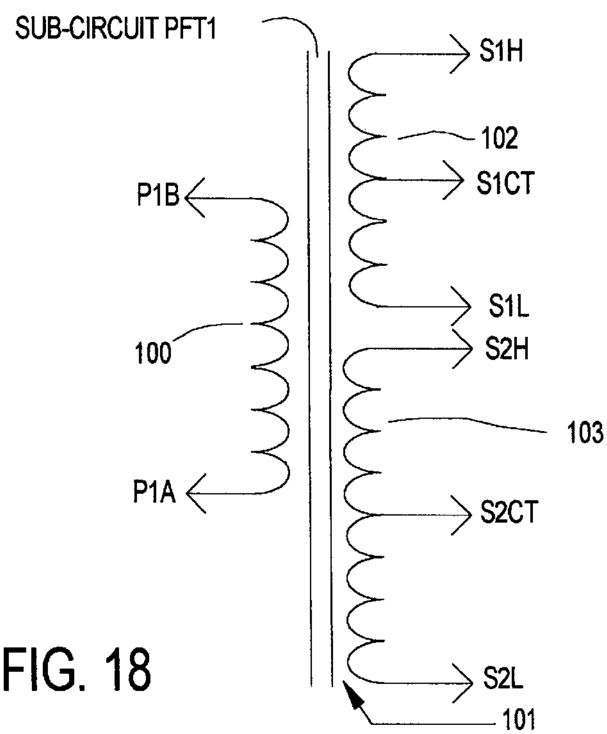
FIG. 18 is a schematic representation of the boost NSME sub-circuit PFT1.
Figure 18A:
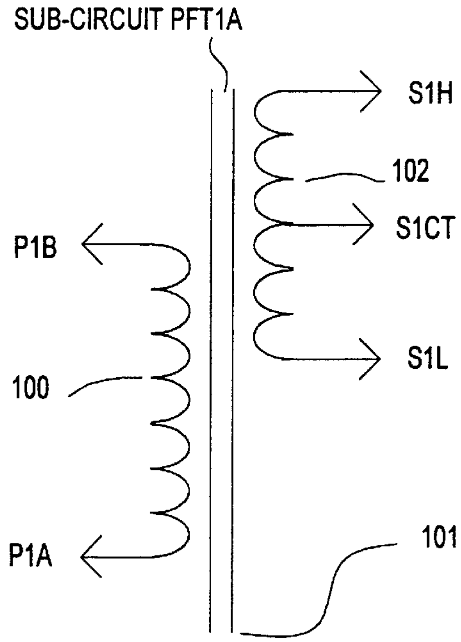
FIG. 18A is a schematic representation of the NSME sub-circuit PFT1A.
Figure 18B:
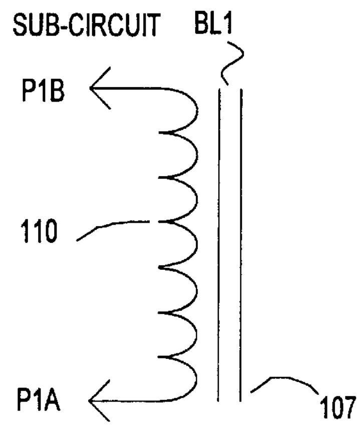
FIG. 18B is a schematic representation of the non-saturating two terminal NSME sub-circuit BL1.
Figure 18C:
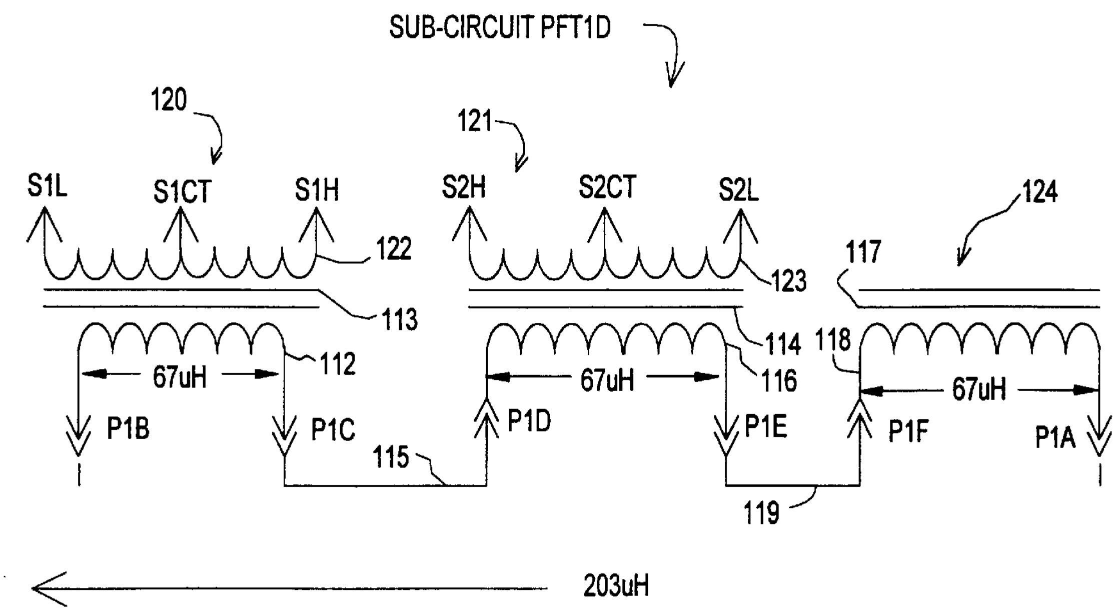
FIG. 18C is a schematic diagram of the NSME implemented as distributed magnetic assembly PFT1D.

TCSSC can be configured to operate as an AC-DC converter, a DC-DC converter, a DC-AC converter, and an AC-AC converter. Sub-circuit TCSSC consists of resistor R20 and RLOAD, capacitor C10, switches Q11 and Q21, opto-isolator U12, sub-circuit PFT1 (FIG. 18), sub-circuit OUTA (FIG. 25), sub-circuit CP (FIG. 26), sub-circuit AMP (FIG. 29), sub-circuit IFB (FIG. 40B) and sub-circuit PWFM (FIG. 33). External power source VBAT connects to pins DCIN+ and DCIN−. Source power may also be derived from rectified AC line voltage such as FIG. 20 or FIG. 21 to form a single stage power factor corrected AC to DC converter with isolated output. From DCIN+ resistor R20 connects to sub-circuit CP pin CP+, sub-circuit AMP pin GA+, U12 LED anode and to sub-circuit PWFM pin PWFM+. Resistor R20 provides startup power to the converter until the control supply regulator sub-circuit CP reaches the desired 18-volt output. VBAT negative is the ground return node connects to sub-circuit PWFM pin PWFM0, Q11 source, sub-circuit AMP pin GA0, sub-circuit CP pin CT0, pin DCIN− and sub-circuit PFT1 pin S1CT. Magnetic element winding node S1H of sub-circuit PFT1 is connected to CP pin CT1A. Magnetic element winding node S1L of sub-circuit PFT1 is connected to CP pin CT2A. Sub-circuit PWFM is designed as a constant 50% duty-cycle variable frequency generator. Sub-circuit PWFM Clock output pin CLK is connected to input of buffer sub-circuit AMP pin GA1. The output of buffer sub-circuit AMP pin GA2 is connected to the gate of Q11 and R21. Resistor R21 is connected to the cathode of U12 LED. The emitter of Q21 and drain of Q11 is connected to sub-circuit PFT1 pin P1A. Pin P1B of sub-circuit PFT1 is connected through tank capacitor C10 to node DCIN+, Q21 collector and through resistor R61 to U12 phototransistor collector. The emitter of U12 phototransistor is connected to the base of Q21. With PWFM pin CLK high transistor Q11 conducts charging capacitor C10 through NSME PFT1 from VBAT storing energy in PFT1. Sub-circuit PWFM switches CLK low, Q11 turns "off". With CLK low LED of U12 is turned "on" injecting base current into Q21. With transistor Q21 "on" the tank circuit is completed, allowing capacitor C10 to discharge into NSME PFT1 winding 100 (FIG. 18). Now the energy not transferred into the load is released from NSME PFT1 into the now forward biased NPN switch Q21 back into capacitor C10. Thus any energy not used by the secondary load remains in the tank coupled primary circuit (winding 100). When the switching occurs at the resonant frequency, high voltages oscillate between C10 and winding 100 creating high flux density AC excursions in PFT1. C10 and PFT1 exchange variable AC currents whose magnitude is controlled by frequency modulation scheme IFB and PWFM. The large primary voltage generates large, high frequency biases in the NSME PFT1 thereby producing high flux density AC excursions to be harvested by secondary windings 102 and 103 (FIG. 18) to support a load or rectifier sub-circuit OUTA. Magnetic element winding node S2H of sub-circuit PFT1 is connected to OUTA pin C7B. Magnetic element winding node S2L of sub-circuit PFT1 is connected to OUTA C8B. Magnetic element winding node S2CT of sub-circuit PFT1 is connected to OUTA pin OUT−. Node OUT− is connected to RLOAD, pin B− and to sub-circuit IFB pin OUT−. Rectified power is delivered to pin OUT+ of OUTA and is connected to RLOAD, pin B+ and to sub-circuit IFB pin OUT+. Sub-circuit IFB provides the isolated feedback signal to the sub-circuit PWFM. Frequency control pin FM1 of sub-circuit PWFM is connected to sub-circuit IFB pin FBE. Internal reference pin REF of sub-circuit PWFM is connected to sub-circuit IFB pin FBC. PWFM is designed to operate at the resonate frequency of the tank (2*pi*(square root (C10*inductance of 100 (FIG. 18)). When sub-circuit IFB senses the converter output is at the target voltage, current from PWFM pin REF is injected into FM1. Injecting current into FM1 commands the PWFM to a lower clock frequency pin CLK. Driving the tank out of resonance reduces the amount of energy added to the tank thus reducing the converter output voltage. In the event the feedback signal from IFB commands the PWFM off or 0 Hz, i.e.: at no load, all primary activity stops. The input current from VBAT may be steady state or variable DC. When TCSSC is operated from rectified AC (sub-circuit LL FIG. 20), high input (line) power factor and input transient protection is achieved. The primary and secondary currents of PFT1 are sinusoidal and free of edge transitions making the converter very quiet. In addition the switches Q11 and Q21 are never exposed to the large circulating voltage induced in the tank (See FIG. 35). This allows the use of lower voltage switches in the design thereby reducing losses and increasing the MTBF. Sub-circuit TCSSC takes advantage of the desirable properties of the NSME in this converter topology. TCSSC is well suited for implementation with distributed NSME PFT1D (FIG. 18C). This combination exemplifies how distributed magnetics enable advantageous high voltage converter design variations that support form factor flexibility and multiple parallel secondary outputs from series coupled voltage divided primary windings across multiple NSME. This magnetic strategy is useful in addressing wire/core insulation, form factor and packaging limitations, circuit complexity and manufacturability. These converter strategies are very useful for obtaining isolated high current density output from a high voltage low current series coupled primary. Adjusting the secondary turn's ratio allows TCSSC to generate very large AC or DC output voltages as well as low-voltage high current outputs.

ADDITIONAL EMBODIMENTS

Figure 1:
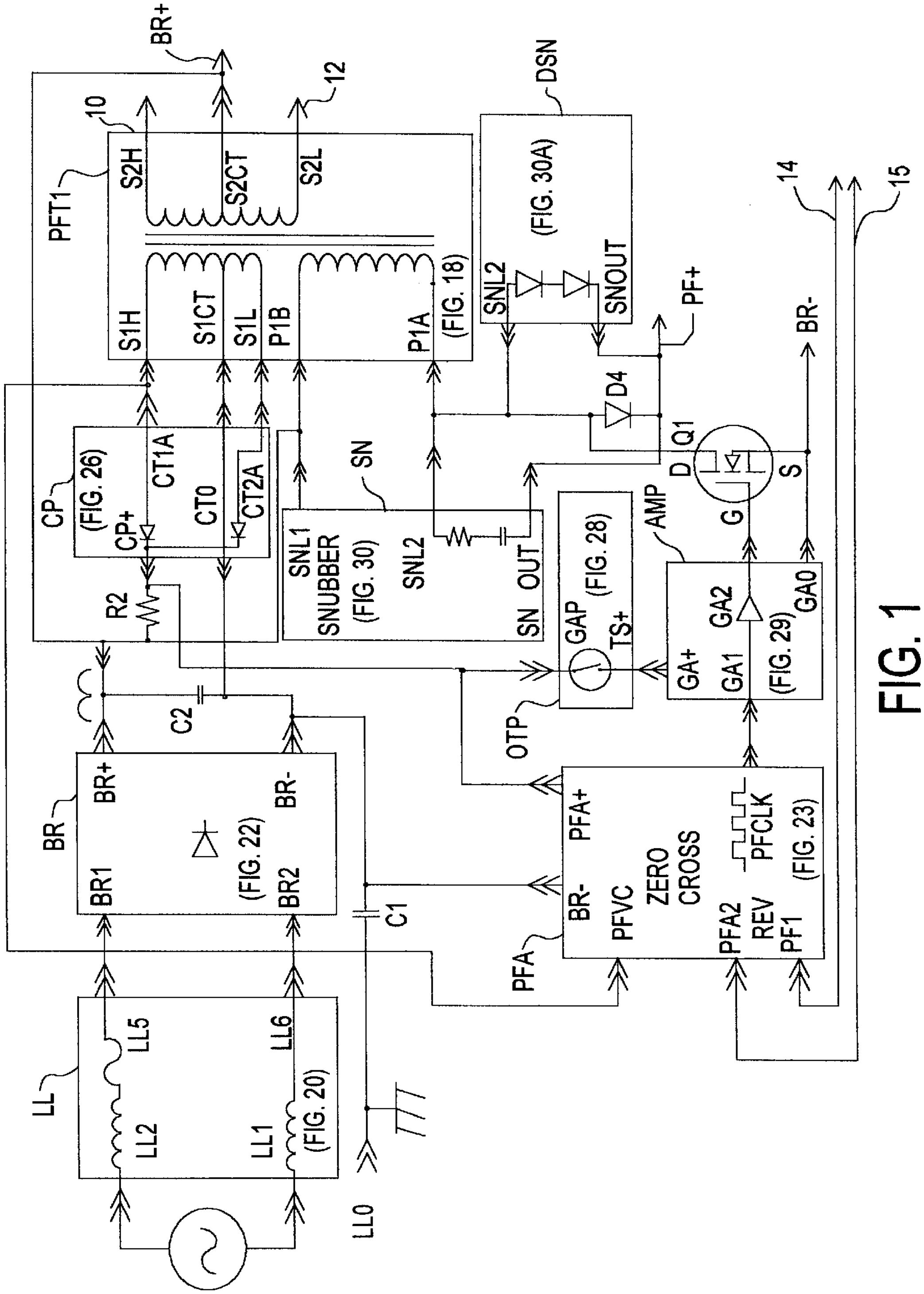
FIGS. 1 and 1A is a schematic diagram of a two-stage power factor corrected AC to DC isolated output converter embodiment of the invention.
Figure 1A:
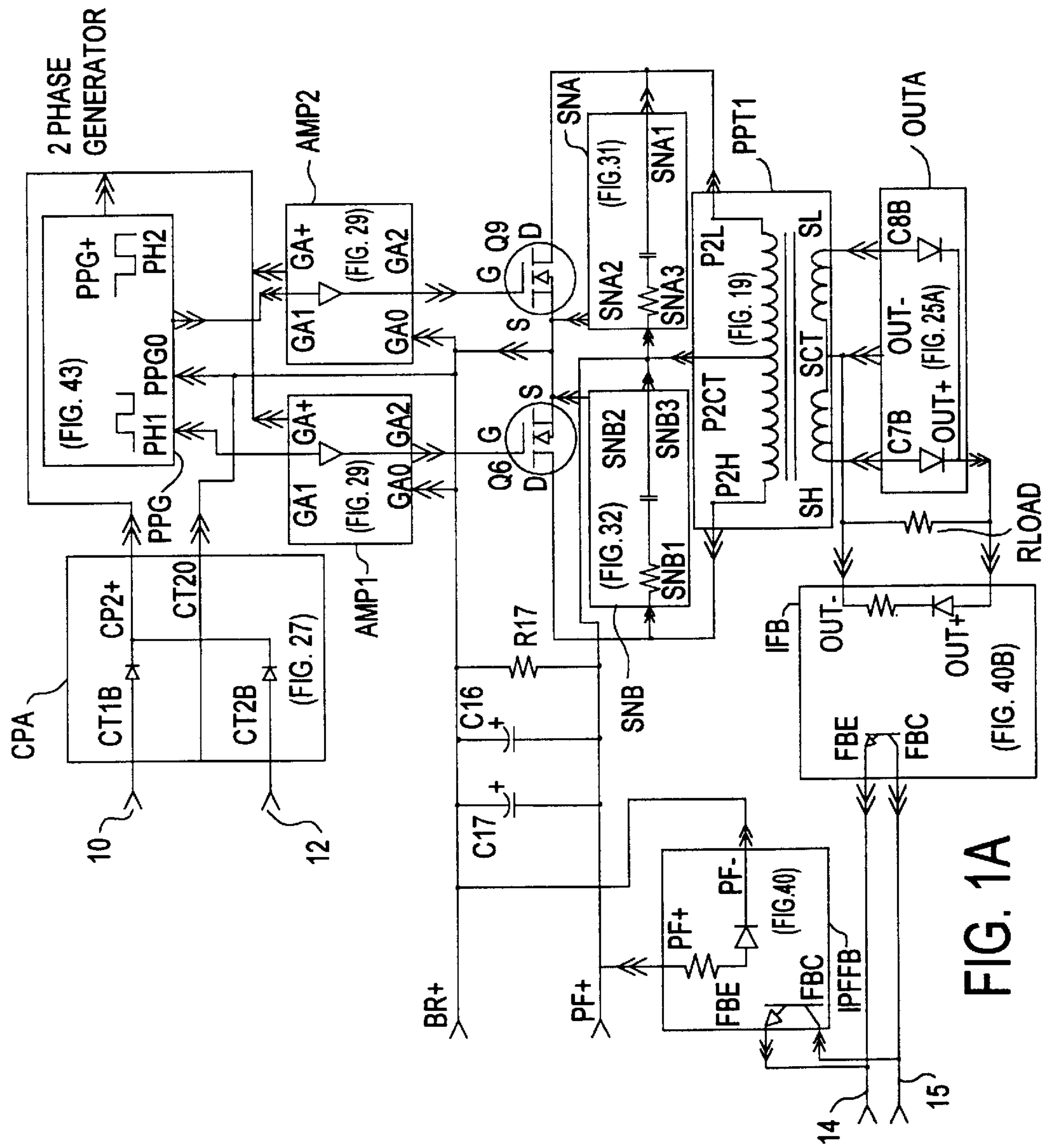
Figure 22:
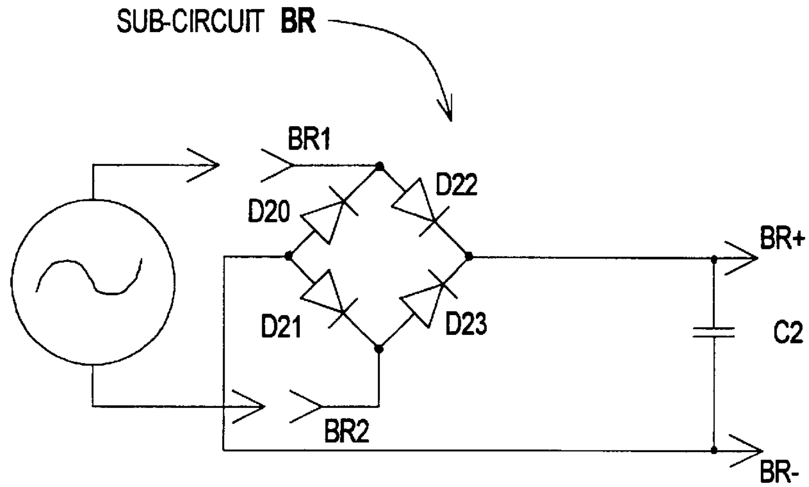
FIG. 22 is a schematic diagram of the AC line rectifier sub-circuit BR.
Figure 25:
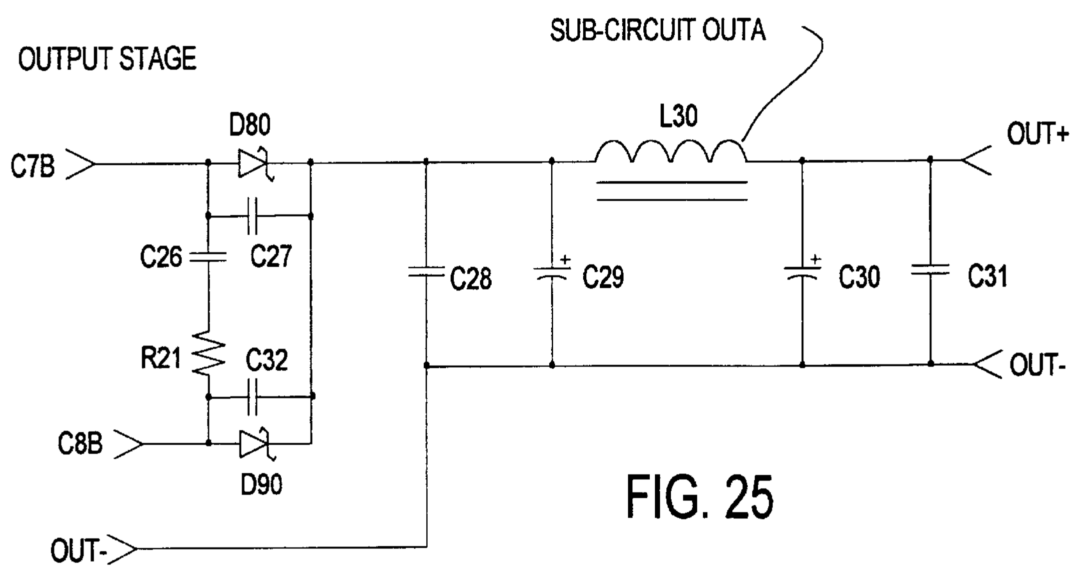
FIG. 25 is a schematic diagram of the output rectifier and filter sub-circuit OUTA.

FIGS. 1 and 1A is a schematic diagram of a two stage power factor corrected AC to DC converter. The invention is comprised of line protection filter sub-circuit LL (FIG. 20) and full-wave rectifier sub-circuit BR (FIG. 22). A power factor corrected regulated boost stage with sub-circuits PFA2 (FIG. 23), snubber sub-circuit SN (FIG. 30), magnetic element sub-circuit PFT1 (FIG. 18), sub-circuit CP (FIG. 26), buffer sub-circuit AMP (FIG. 29), over temperature sub-circuit OTP (FIG. 28), over voltage feedback sub-circuit IPFFB (FIG. 40) and voltage feedback sub-circuit IFB (FIG. 40B). Start up resistor R2, filter capacitor C1, PFC capacitor C2, flyback diode D4, switch transistor Q1, hold up capacitors C17 and C16, and resistor R17. An efficient push-pull isolation stage with sub-circuits CPA (FIG. 27), PPG (FIG. 43), AMP1 (FIG. 29), AMP2 (FIG. 29), snubber sub-circuits SNB (FIG. 32) and SNA (FIG. 31), resistor Rload, transistors Q6 and Q9, magnetic element PPT1 (FIG. 19), and OUTA (FIG. 25).

| FIG. 1 Element | Table Value/part number |
|---|---|
| C1 | 0.01 uf |
| C2 | 1.8 uf |
| R2 | 100k ohms |
| D4 | 8A, 600 V |
| Q1 | IRFP 460 |
| C17 | 100 uf |
| C16 | 100 uf |
| R17 | 375k ohms |
| Q6 | FS 14SM-18A |
| Q9 | FS 14SM-18A |

Figure 29:
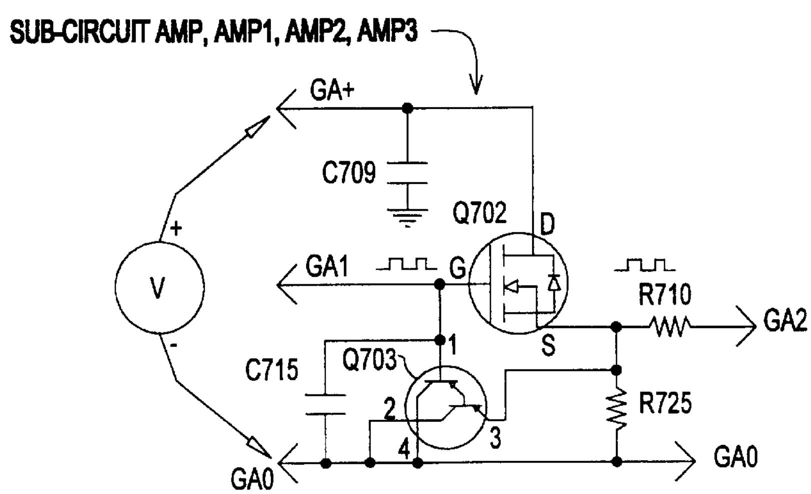
FIG. 29 is a schematic diagram of the high-speed low impedance buffer sub-circuit AMP, AMP1, AMP2 and AMP3.
Figure 30:
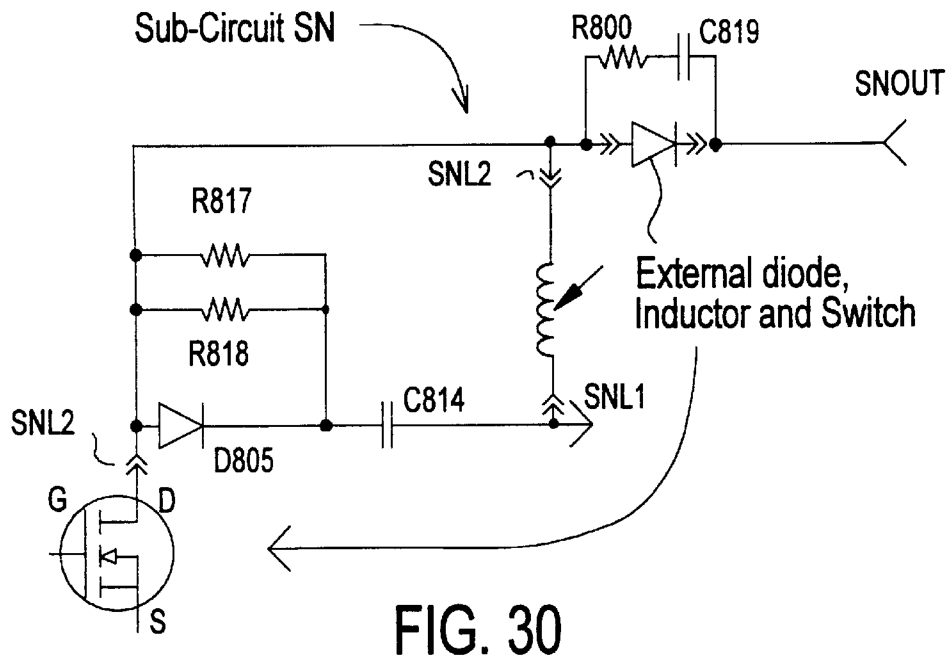
FIG. 30 is a schematic diagram of the main switch snubber sub-circuit SN.

In the two-stage converter the primary side voltage to the second push-pull output stage is modulated by the power factor corrected input (boost) stage. Each stage can comprise of individual and distributed NSME. A graph of B-H hysteresis for the non-saturating magnetics is set forth in FIG. 15. Although the following description is in terms of particular converter topologies, i.e., flyback controlled primary and constant duty cycle push pull secondary, number of outputs, the style, and arrangement of the several topologies are offered by way of example, not limitation. In addition non-saturating magnetics BL1, PFT1, and PPT1 may be implemented as distributed NSME. As an example PFT1 is shown as a distributed magnetic PFT1A (FIG. 18C). Distributed magnetics enable advantageous high voltage converter design variations that support form factor flexibility and multiple parallel secondary outputs from series coupled voltage divided primary windings across multiple NSME. The negative of the hold-up capacitor(s) [C17||C16] is connected to bridge positive. This allows the rectified line voltage to be excluded from the boost voltage in the hold-up capacitor(s). This, in turn, allows direct regulation of the push-pull stage from the boost (PFC) stage. This eliminates the typical PWM control of the oversized thermally derated transformer and many sub-circuit components from the known art. AC line is connected to sub-circuit LL (FIG. 20) between pins LL1 and LL2. AC/earth ground is connected to node LL0. The filtered and voltage limited AC line appears on node/pin LL5 of sub-circuit LL and connected to node BR1 of bridge rectifier sub-circuit BR (FIG. 22). The neutral/AC return leg of the filtered and voltage limited AC appears on pin LL6 of sub-circuit LL is connected to input pin BR2 of BR. The line voltage is full-wave rectified and is converted to a positive haversine appearing on node BR+ of sub-circuit BR (FIG. 22). Start up resistor R2 connects BR+ to sub-circuit CP pin CP+. Node CP+ connects to pins PFA+ of control element sub-circuit PFA (FIG. 23) and over temperature switch sub-circuit OTP (FIG. 28) pin GAP. Resistor R2 provides start up power to the control element until the rectifier/regulator CP is at full output. Node S1H from PFT1 is connected to node PFVC of sub-circuit PFA. The zero crossings of the core are sensed when the voltage at S1H is at zero. The core zero crossings are used to reset the PFC and start a new cycle. The positive node of the DC side of bridge BR+ is connected through capacitor C2 to BR−. C2 is selected for various line and load conditions to de-couple switching current from the line improving power factor while reducing line harmonics and EMI. Primary of NSME sub-circuit PFT1 (FIG. 18) pins P1B and S2CT connects to pin SNL1 of snubber sub-circuit SN (FIG. 30), to sub-circuit BR pin BR+ and connects to pin BR+ (FIG. 1A). The return line for the rectified AC power BR− is connected to the following pins: BR− of sub-circuit BR, PFA pin BR−, sub-circuit AMP pin GA0, output switch Q1 source, capacitor C2, sub-circuit CP pin CT0 sub-circuit PFT1 pin S1CT and CT20 through EMI filter capacitor C1 to earth ground node LL0. Pin BR+ from FIG. 1 is connected to FIG. 1A sub-circuits CPA pin SN pin SNL1, sub-circuit PFT1 pin P1B, and sub-circuit PFT1 pin S2CT. Pin BR+ continues to FIG. 1A connecting to sub-circuit CPA pin CT20, PPG (FIG. 43) pin PPG0, sub-circuit AMP1 pin GA0, sub-circuit AMP2 pin GA0, sub-circuit IPFFB pin PF−, Capacitor [C16||C17|| resistor R17], transistor Q6 source, transistor Q9 source, sub-circuit SNA pin SNA2 and sub-circuit SNB pin SNB2. The drain of output switch Q1 is connected to diode D4 anode, sub-circuit SNB pin SNL2, and sub-circuit PFT1 pin P1A and sub-circuit SN pin SNL2. Snubber network SN reduces the high voltage stress to Q1 until flyback diode D4 begins conduction. Line coupled, power factor corrected boost regulated output voltage of the AC to DC converter stage (FIG. 1) appears on node PF+. Addition efficiency may be realized by connecting sub-circuit DSN (FIG. 30A) in parallel with D4. The regulated boost output PF+ connects to the following: sub-circuit SN pin SNOUT, sub-circuit DSN pin SNOUT and diode D4 cathode. Node PF+ also connects on FIG. 1A to capacitors [C16||C17||R17], sub-circuit IPFFB (FIG. 40) pin PF+, sub-circuit PPT1 (FIG. 19) pin P2CT, snubber sub-circuit SNA (FIG. 31) pin SNA3, and snubber SNB (FIG. 32) pin SNB3. Magnetic element winding pin S1H of sub-circuit PFT1 is connected to CP pin CTLA and pin PFVC of sub-circuit PFA. Magnetic element winding node S1L of sub-circuit PFT1 is connected to CP pin CT2A. Magnetic element winding node S2H of sub-circuit PFT1 is connected to pin 10 FIG. 1A then to CPA pin CT1B. Magnetic element winding node S2L of sub-circuit PFT1 is connected to pin 12 FIG. 1A then to CPA pin CT2B. Sub-circuit PFA using the AC line phase, load voltage, and magnetic element feedback, generates a command pulse PFCLK. Pin PFCLK of sub-circuit PFA (FIG. 23) is connected to the input of buffer amplifier pin GA1 of sub-circuit AMP1 (FIG. 29). Buffered high-speed gate drive output pin GA2 of sub-circuit AMP is connected to gate of switch FET Q1. The buffering provided by AMP shortens switch Q1 ON and OFF times greatly reducing switch losses (see FIGS. 13 & 14). The source of Q1 with pin GA0 is connected to return node BR−. Power to sub-circuit AMP is connected to pin GA+ from sub-circuit OTP pin TS+. Thermal switch THS1 is connected to Q1. In the event the case of Q1 reaches approximately 105C THS1 opens removing power to sub-circuit AMP, safely shutting down the first (input) stage. Normal operation resumes after the switch temperature drops 20–30 deg. C closing THS1. Drain of output switch Q1 is connected to primary winding pin P1A of non-saturating magnetic sub-circuit PFT1 (FIG. 18) and to pin SNL2 of snubber sub-circuit SN (FIG. 30). Reference voltage from PFC sub-circuit PFA pin PFA2 is connected to feedback networks sub-circuit IPFFB pin FBC and to sub-circuit IFB pin FBC. Control current feedback networks is summed at node PF1 of sub-circuit PFA. Pin PF1 is connected to feed back networks sub-circuit IPFFB pin FBE and to sub-circuit IFB pin FBE. Constant frequency/duty-cycle non-overlapping two-phase generator sub-circuit PPG (FIG. 43 1A) generates the drive for the push-pull output stage. Phase one output pin PH1 is connected to sub-circuit AMP1 pin GA1, second phase output pin PH2 is connected to sub-circuit AMP2 pin GA1. Output of amplifier buffer sub-circuit AMP1 pin GAP2 connects to gate of push-pull output switch Q6. Output of amplifier buffer sub-circuit AMP2 pin GAP2 connects to gate of push-pull output switch Q9. The buffering currents from AMP1 and AMP2 provide fast, low impedance critically damped switching to Q6 and Q9 greatly reducing ON-OFF transition time and switching losses. Regulated 18-volt power from sub-circuit CPA (FIG. 1A) pin CP2+ is connected to amplifier buffer sub-circuit AMP1 pin GA+, amplifier buffer sub-circuit AMP2 pin GA+ and sub-circuit PPG pin PPG+. Drain of transistor Q6 is connected to snubber network sub-circuit SNB pin SNB1 and to non-saturating center tapped primary magnetic element sub-circuit PPT1 pin P2H. Drain of transistor Q9 is connected to snubber network sub-circuit SNA (FIG. 31) pin SNA1 and sub-circuit PPT1 pin P2L. Source of transistor Q6 is connected to snubber network sub-circuit SNB pin SNB2, transistor Q9 source, sub-circuit SNA pin SNA2 and to. return node BR+. Isolated output of NSME sub-circuit PPT1 pin SH connects to Pin C7B of rectifier sub-circuit OUTA (FIG. 25A), pin SL connects to sub-circuit OUTA C8B. Center tap of PPT1 pin SCT is the output return or negative node OUT− it connects to sub-circuit OUTA pin OUT− and sub-circuit IFB (FIG. 40B) pin OUT− and RLOAD. Converter positive output from sub-circuit OUTA pin OUT+ is connected to RLOAD and sub-circuit IFB pin OUT+. FIG. 1 elements LL1, BR, PFA, AMP, Q1, IPFFB, IFB and PFT1 (input stage) perform power factor corrected AC to DC conversion. The regulated high voltage output of this converter supplies the efficient fixed frequency/duty-cycle push-pull stage comprising PPG, AMP1, AMP2, Q6, Q9, PPT1 and OUTA (FIG. 1A). Magnetic element sub-circuit PPT1 provides galvanic isolation and minimal voltage overshoot and ripple in the secondary thus minimizing filtering requirements of the rectifier sub-circuit OUTA. Five volt reference output from sub-circuit PFA pin PFA2 connects to pin 15 then to FIG. 1A sub-circuit IPFFB pin FBC and to sub-circuit IFB pin FBC. Pulse width control input from sub-circuit PFA pin PF1 connects to pin 14 then to FIG. 1A sub-circuit IPFFB pin FBE and to sub-circuit IFB pin FBE. Sub-circuit IFB provides high-speed feedback to the AC DC converter, the speed of the boost stage provides precise output voltage regulation and active ripple rejection. In the event of sudden line or load changes, sub-circuit IPFFB corrects the internal boost to maintain regulation at the isolated output. Remote load sensing and other feedback schemes known in the art may be implemented with sub-circuit IPFFB. This configuration provides power factor corrected input transient protection, rapid line-load response, excellent regulation, isolated output and quiet efficient operation at high temperatures.

Figure 2:
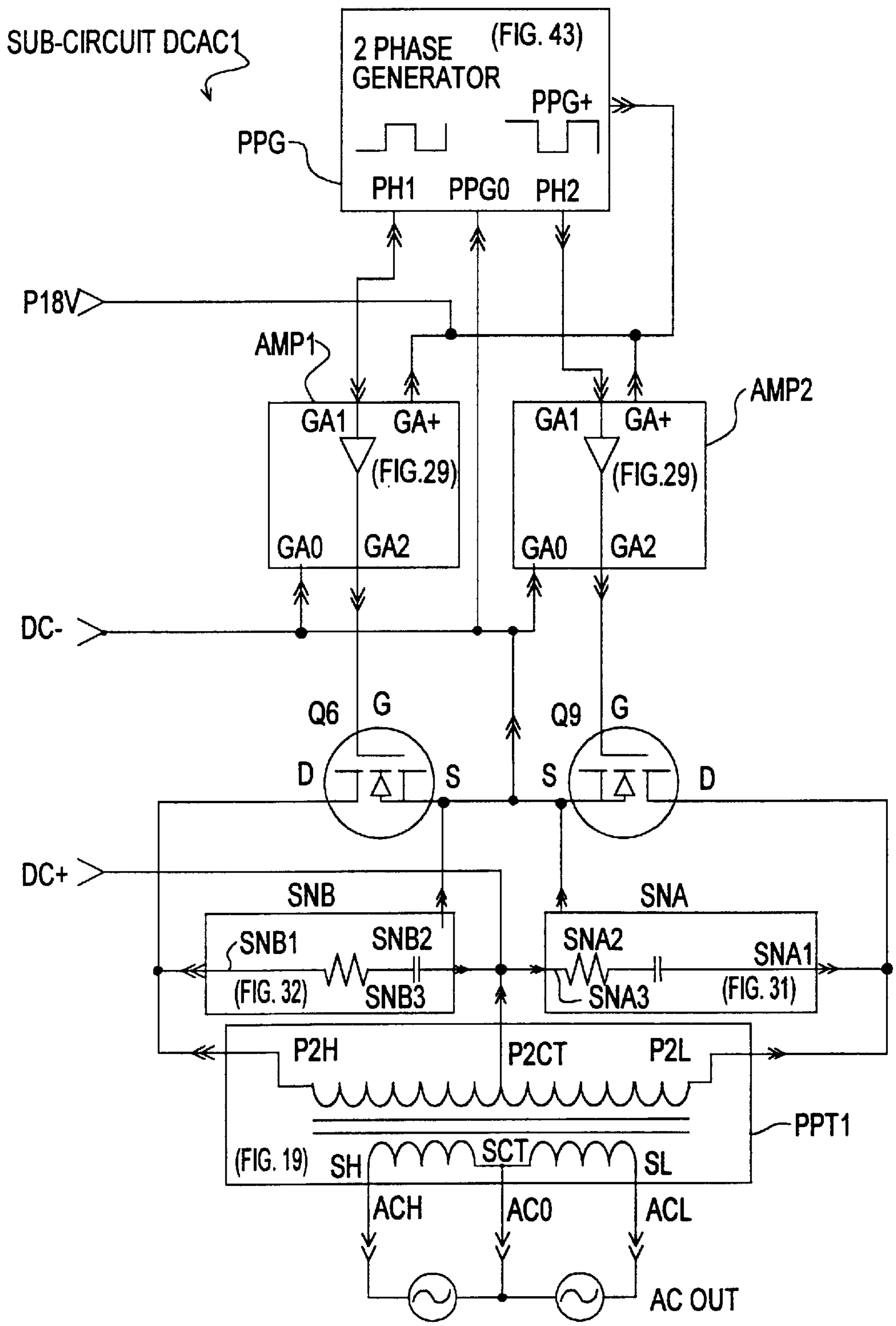
FIG. 2 is a schematic diagram of a single stage DC to AC converter embodiment with isolated output sub-circuit DCAC1.

FIG. 2 is a schematic diagram of an embodiment of a DC to AC converter. The invention DCAC1 is an efficient push-pull converter. Comprised of sub-circuits PPG (FIG. 43), AMP1 (FIG. 29), AMP2 (FIG. 29), SNB (FIG. 32), SNA (FIG. 31), PPT1.(FIG. 19) and OUTA (FIG. 25), switches Q6 and Q9.

| FIG. 2 Element | Table Value/part number |
|---|---|
| Q6 | FS 14SM-18A |
| Q9 | FS 14SM-18A |

Converter ACDC1 accepts variable DC voltage and efficiently converts it to a variable AC voltage output at a fixed frequency. Variable frequency operation may be achieved by simple changes to PPG. In this embodiment fixed frequency operation is required. The magnetic element comprises non-saturating magnetics. A graph of B-H hysteresis for the non-saturating magnetics is set forth in FIG. 15. Variable DC voltage is applied to pin DC+. The pin DC+ connects to the following, sub-circuit PPT1 (FIG. 19) pin P2CT, snubber sub-circuit SNA (FIG. 31) pin SNA3, and snubber SNB (FIG. 32) pin SNB3. Constant frequency non-overlapping two-phase generator sub-circuit PPG (FIG. 43) generates the drive for the push-pull output switches. Phase one output pin PH1 is connected to sub-circuit AMP1 pin GA1, the second phase output pin PH2 is connected to sub-circuit AMP2 pin GA1. Output of amplifier buffer sub-circuit AMP1 pin GAP2 connects to gate of push-pull output switch Q6. Output of amplifier buffer sub-circuit AMP2 pin GAP2 connects to gate of push-pull output switch Q9. The buffering provided by AMP1 and AMP2 shortens switch Q1 ON and OFF times greatly reducing switching losses (See FIGS. 13 and 14). External regulated 18-volt power from pin P18V connected to amplifier buffer sub-circuit AMP1 pin GA+, amplifier buffer sub-circuit AMP2 pin GA+ and sub-circuit PPG pin PPG+. Drain of transistor Q6 is connected to snubber network sub-circuit SNB pin SNB1 and to non-saturating center tapped primary magnetic element sub-circuit PPT1 pin P2H. Drain of transistor Q9 is connected to snubber network sub-circuit SNA (FIG. 31) pin SNA1 and sub-circuit PPT1 pin P2L. Source of transistor Q6 is connected to snubber network sub-circuit SNB pin SNB2, transistor Q9 source, sub-circuit SNA pin SNA2, sub-circuit AMP1 pin GA0, sub-circuit AMP2 pin GA0, sub-circuit PPG pin PPG0, and to return pin DC−. AC output of NSME sub-circuit PPT1 pin SH connects to Pin ACH, pin SL connects to pin ACL. Center tap of PPT1 pin SCT is connected to pin AC0. Magnetic element sub-circuit PPT1 provides galvanic isolation and minimal voltage overshoot in the secondary thus minimizing filtering requirements if a rectifier assembly is attached. Sub-circuit DCAC1 may be used as a stand-alone converter or as a fast quiet efficient stage in a multi stage converter system. Sub-circuit DCAC1 achieves isolated output, quiet operation, efficient conversion, and operation at high and low temperatures.

Figure 3:
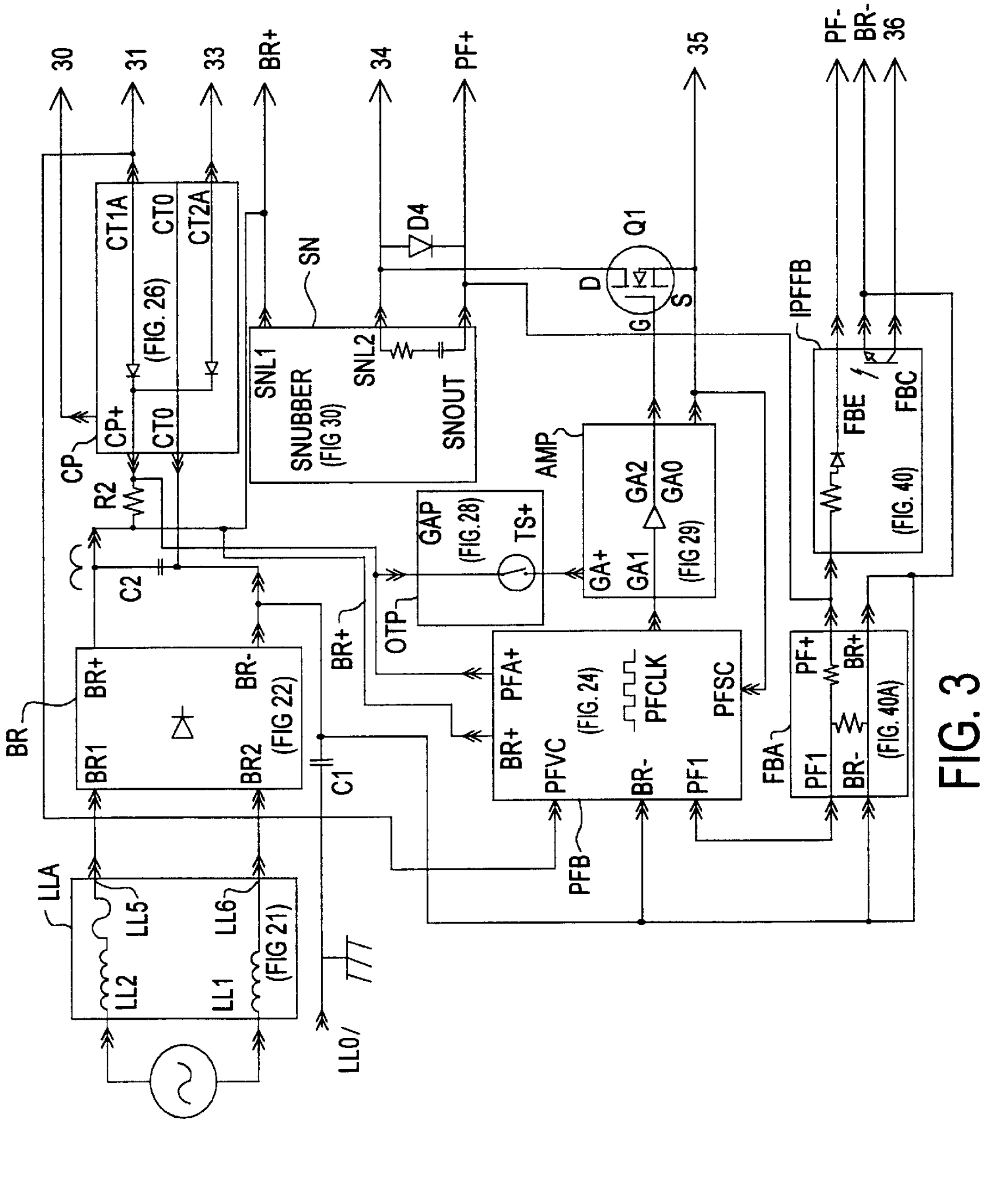
FIGS. 3 and 3A is a schematic diagram of a three stage AC to DC isolated output converter embodiment of the invention.
Figure 3A:
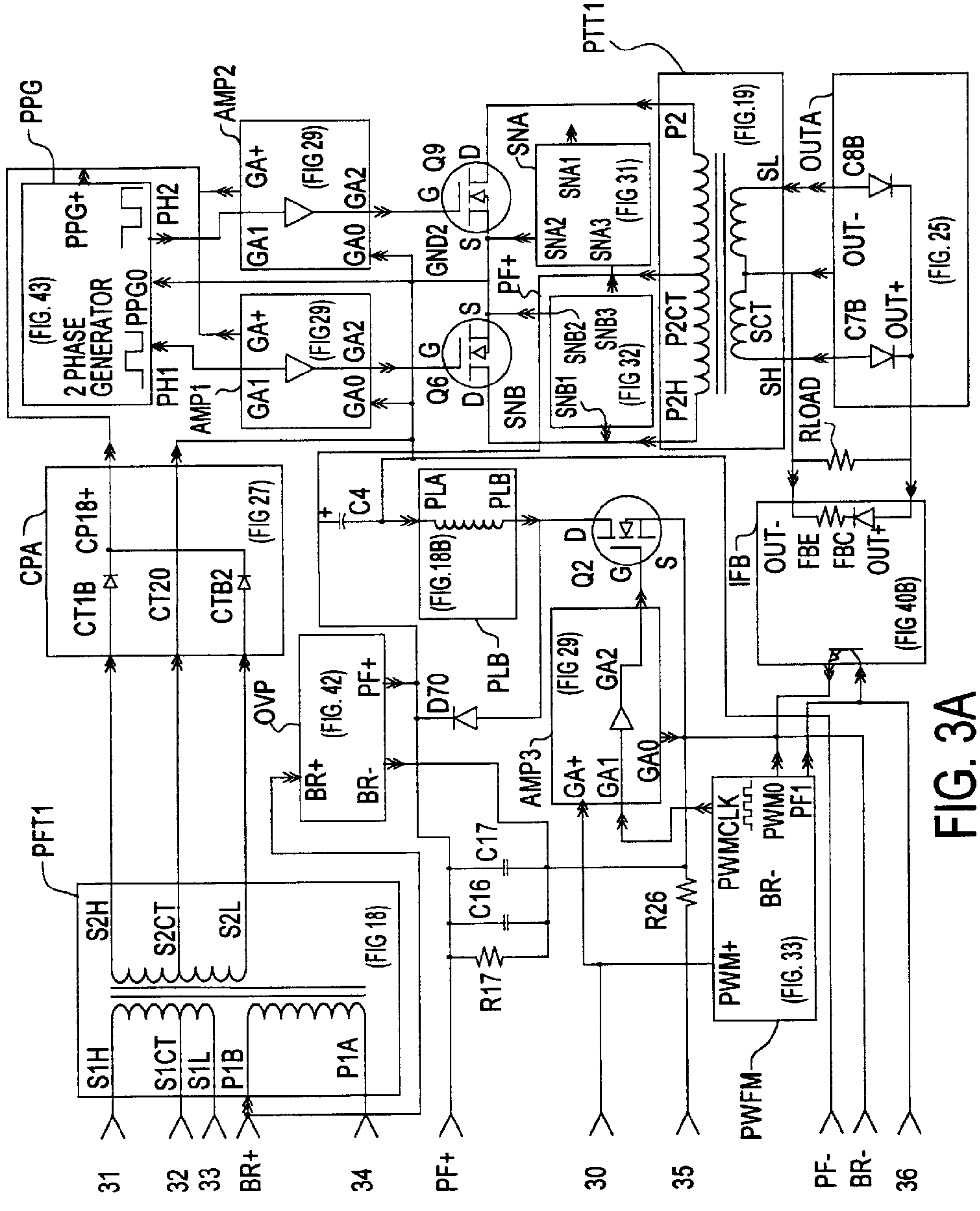

FIGS. 3 and 3A is a three-stage version of the present invention. The arrangement is comprised of an AC-DC or DC-DC boost converter stage, DC-DC forward converter stage, and a push-pull stage. This system reduces losses by combining low current buck regulation, buffered switching, rectified snubbering, and NSME in each stage. A power factor corrected boost stage is used to assure that any load connected to the converter looks like a resistive load to the AC line, eliminating undesirable harmonic and displacement currents in the AC power line. NSME having a lower permeability compared to the prior art are used to minimize magnetizing losses, improve coupling efficiency, minimize magnetic element heating, eliminate saturated core current spikes/gap leakage, reduce parts count, reduce thermal deterioration, and increase MTBF (mean time before failure). The invention also uses an emitter follower circuit with a high speed switching FET to slew the main FET gate rapidly. The use of non-saturating magnetics allows operation at higher voltages, which proportionally lowers current further reducing switch, magnetic element, and conductor losses due to $I^2R$ heating. High voltage FET switches have the added benefit of lower gate capacitance, which translates to faster switching. At turn on, the n-channel gate drive FET quickly charges the main FET gate. At turn off, a PNP Darlington transistor switch quickly discharges the main FET gate. The flyback effect in the PFC stage is managed by use of rectifying RC networks positioned across the output diode with an additional capacitor coupled diode across the switched magnetic element to decouple and further dampen the inductive flyback.

FIG. 3 and FIG. 3A is a schematic diagram of a three stage AC to DC converter. FIGS. 3 and 3A is a three-stage version of the present invention. The arrangement is comprised of an AC-DC or DC-DC boost converter stage, DC-DC forward converter stage, and a push-pull stage. This system reduces losses by combining low current buck regulation, buffered switching, rectified snubbering, and NSME in each stage. A power factor corrected boost stage is used to assure that any load connected to the converter looks like a resistive load to the AC line, eliminating undesirable harmonic and displacement currents in the AC power line. NSME having a lower permeability compared to the prior art are used to minimize magnetizing losses, improve coupling efficiency, minimize magnetic element heating, eliminate saturated core current spikes/gap leakage, reduce parts count, reduce thermal deterioration, and increase MTBF (mean time before failure). The invention also uses an emitter follower circuit with a high speed switching FET to slew the main FET gate rapidly. The use of non-saturating magnetics allows operation at higher voltages, which proportionally lowers current further reducing switch, magnetic element, and conductor losses due to $I^2R$ heating. High voltage FET switches have the added benefit of lower gate capacitance, which translates to faster switching. At turn on, the n-channel gate drive FET quickly charges the main FET gate. At turn off, a PNP Darlington transistor switch quickly discharges the main FET gate. The flyback effect in the PFC stage is managed by use of rectifying RC networks positioned across the output diode with an additional capacitor coupled diode across the switched magnetic element to decouple and further dampen the inductive flyback. The invention is comprised of a power factor corrected regulating boost stage with line protection filter sub-circuit LL1 (FIG. 21) and full-wave rectifier sub-circuit BR (FIG. 22) and capacitors C1 and C2. Sub-circuits PFB (FIG. 24), resistor R2, rectifier CP (FIG. 26), magnetic element PFT1 (FIG. 18), over temperature protection OTP (FIG. 28) snubber SN (FIG. 30) gate buffer. AMP (FIG. 29), switch transistors Q1, flyback diode D4, holdup capacitors C17 and C16, bleed resistor R17, and voltage feedback sub-circuit FBA (FIG. 40A). An efficient second pre-regulating buck stage with sub-circuits PWFM (FIG. 33), current sense resistor R26, rectifier CPA (FIG. 27), magnetic element BL1 (FIG. 18B), over voltage protection OVP (FIG. 42), IPFFB (FIG. 40) gate buffer AMP3 (FIG. 29), switch transistor Q2, flyback diode D70, storage capacitor C4, and voltage feedback sub-circuit IFB (FIG. 40B).

An efficient third push-pull isolation stage with sub-circuits CPA (FIG. 27), two-phase generator PPG (FIG. 43), gate buffers AMP1 (FIG. 29) and AMP2 (FIG. 29), switch transistors Q6, and Q9, snubbers SNA (FIG. 31) and SNB (FIG. 32), magnetic element PPT1 (FIG. 19) and rectifier OUTA (FIG. 25).

| FIG. 3 3A Element | Table Value/part number |
|---|---|
| C1 | .01 uf |
| C2 | 1.8 uf |
| R2 | 100k ohms |
| D4 | STA1206 DI |
| R17 | 375k ohms |
| Q1 | IRFP460 |
| C16 | 100 uf |
| C17 | 100 uf |
| R26 | .05 ohms |
| D70 | STA1206 DI |
| Q2 | IRFP460 |
| C4 | 10 uf |
| Q6 | FS14Sm-18A |
| Q9 | FS14Sm-18A |

AC line is connected to sub-circuit LLA (FIG. 21) between pins LL1 and LL2. AC/earth ground is connected to node LL0. The filtered and voltage limited AC line appears on node/pin LL5 of sub-circuit LLA and connected to node BR1 of bridge rectifier sub-circuit BR. The neutral/AC return leg of the filtered and voltage limited AC appears on pin LL6 of sub-circuit LL is connected to input pin BR2 of BR. The line voltage is full-wave rectified and is converted to a positive haversine appearing on node BR+ of sub-circuit BR. Start up resistor R2 connects BR+ to sub-circuit CP pin CP+. Node CP+ connects to pins PFA+ of control element sub-circuit PFB and over temperature switch sub-circuit OTP pin GAP. Resistor R2 provides start up power to the control element until the regulator CP is at full output. Node S1H from PFT1 is connected to pin 31 (FIG. 3) then to pin CT1A of sub-circuit CP and pin PFVC of sub-circuit PFB. The zero crossing of the core bias are sensed when the voltage at S1H is at zero relative to BR−. The core zero crossings are used to reset the PFC and start a new cycle. The positive node of the DC side of bridge BR+ is connected through capacitor C2 to BR−. Capacitor C2 is selected for various line and load conditions to de-couple switching current from the line improving power factor. Sub-circuit BR pin BR+ connects to pin SNL1 of snubber sub-circuit SN, sub-circuit PFB pin BR+ and pin BR+ (FIG. 3A) then to primary of NSME sub-circuit PFT1 pin P1B and to sub-circuit OVP pin BR+. The return line for the rectified AC power is connected to the following pins; BR− of sub-circuit BR, sub-circuit PFT1 pin S1CT, PFC sub-circuit PFB pin BR−, sub-circuit FBA pin BR−, capacitor C2, sub-circuit CP pin CT0, sub-circuit IPFFB pin FBE, and through EMI filter capacitor C1 to earth ground node LL0. Node BR− continues to FIG. 3A connecting to R26, capacitors [C16||C17||R17], sub-circuit OVP pin BR−, sub-circuit PWFM pin PWFM0, sub-circuit AMP3 pin GA0, switch Q2 source. Floating ground node PF− is connected to magnetic element sub-circuit PFT1 pin S2CT, rectifier sub-circuit CPA pin CT20, generator sub-circuit PPG (FIG. 43) pin PPG0, sub-circuit AMP1 pin GA0, sub-circuit AMP2 pin GA0, capacitor C4, magnetic element BL1 pin, transistor Q6 source, transistor Q9 source, sub-circuit SNA pin SNA2 sub-circuit SNB pin SNB2, pin PF-FIG. 3 then to sub-circuit IPFFB pin PF−. Drain of output switch Q1 is connected to diode D4 anode, sub-circuit SN pin SNL2, then to pin 34 of FIG. 3A then to sub-circuit PFT1 pin P1A. Snubber SN reduces the high voltage stress to Q1 until flyback diode D4 begins conduction. Additional rectification efficiency and protection is achieved by adding sub-circuit DSN (FIG. 30A) across flyback diode D4. Feedback corrected boost output voltage of the power factor corrected AC to DC converter stage appears across nodes PF+ and PF−. The regulated 385-volt boost output node PF+ connects to the following; sub-circuit SN pin SNOUT, diode D4 cathode, sub-circuit IPFFB (FIG. 40) pin PF+, sub-circuit FBA pin PF+, then to pin PF+ of FIG. 3A, capacitors [C16||C17||R17], magnetic element sub-circuit PTT1 (FIG. 19) pin P2CT, snubber sub-circuit SNA (FIG. 31) pin SNA3, and snubber SNB (FIG. 32) pin SNB3, sub-circuit OVP pin PF+, capacitor C4 and diode D70 cathode. Magnetic element winding node S1H of sub-circuit PFT1 is connected to pin 31 FIG. 3 then to sub-circuit CP pin CT1A and pin PFVC of sub-circuit PFB. Magnetic element winding node S1L of sub-circuit PFT1 is connected to pin 33 FIG. 3 then to sub-circuit CP pin CT2A. Magnetic element winding node S2H of sub-circuit PFT1 is connected to CPA pin CT1B. Magnetic element winding node S2L of sub-circuit PFT1 is connected to CP pin CT2B. Sub-circuit PFB using feedback from the phase of the AC line, Q1 switch current, magnetic bias first stage and output voltage feedback generates a command pulse on pin PFCLK. Pin PFCLK of sub-circuit PFB (FIG. 24) is connected to the input of buffer AMP amplifier pin GA1 of sub-circuit AMP1. Buffered high-speed low impedance gate drive output pin GA2 of sub-circuit AMP is connected to gate of switch FET Q1. The buffering provided by AMP shortens switch Q1 "ON" and "OFF" times greatly reducing switch losses (See FIGS. 13 and 14). The source of Q1 is connected to sub-circuit AMP pin GA0, pin 35 of FIG. 3A then to current sense resistor R26 connected to return node BR−. The voltage developed across R26 is fed back to PFB pin PFSC. This signal is used to protect the switch by reducing the pulse width in response to a low line or high load induced over current fault. The return line of sub-circuit FBA pin BR− is connected to node BR− and to pin BR− of sub-circuit PFB. This feedback is non-isolated; network values are selected for the first stage to develop a 385-Volt output at PF+. Sub-circuit feedback network FBA (FIG. 40A) pin PF1 is connected to sub-circuit PFB pin PF1. Controller PFB modulates PFCLK signal to maintain a substantially constant 385-voltage at PF+ independent of line and load conditions. In the event of a component failure in sub-circuit FBA the PBF may command the converter to very high voltages. Sub-circuit OVP monitors the first stage boost in the event it exceeds 405-volts OVP will clamp the output of sub-circuit BR causing fuse F1 in sub-circuit LLA to open. An alternate over voltage network OVP1 (FIG. 42A) may replace OVP clamping the 18-volt control power stopping the boost action of the converter without opening the fuse. Sampled converter output at node from sub-circuit FBA pin PF1 is connected to sub-circuit PFB pin PF1. The haversine on BR+ is used with an internal multiplier by PFB to generate variable width control pulses on pin PFCLK. The high frequency modulation of switch Q1 makes the load/converter appear resistive to the AC line. Over temperature protection sub-circuit OTP pin TS+ is connected to sub-circuit AMP pin GA+. Thermal switch THS1 is connected to Q1. In the event Q1 reaches approximately 105C THS1 opens removing power to sub-circuit AMP, safely shutting down the first stage. Normal operation resumes after the temperature decreases 20–30C closing THS1. The second stage is configured as a buck stage. It accepts the 385-Volt output of the first stage. By employing a second floating reference node PF− energy storage element capacitor C4 the voltage to the final push-pull stage may be regulated with minimal loss. Power from sub-circuit CP pin CP18V+ is connected to pin 30 of FIG. 3A then to sub-circuit PWFM (FIG. 33) pin PWM+ and AMP3 pin GA+. Feedback current from sub-circuit IPFFB pin FBC is connected to pin 36 FIG. 3A then to sub-circuit IFB pin FBC and sub-circuit PWFM pin PF1. Sub-circuit IPFFB only shunts current from this node if the output of the second stage is greater than 200-volts. When the converter reaches its designed output voltage, IFB shunts current from PWFM pin PF1 signaling PWFM to reduce the pulse width on pin PWMCLK. Sub-circuit AMP3 input pin is connected to sub-circuit PWFM pin PWMCLK. Output of AMP3 buffer pin GA2 is connected to gate of switch Q2. Drain of Q2 is connected to anode of D70 and non-saturating magnetic sub-circuit BL1 pin P2B (FIG. 18B). Turning on switch Q2 charges C4 also storing energy in magnetic element BL1. Releasing switch Q2 allows energy stored in magnetic element BL1 to charge C4 through flyback diode D70. Larger pulse widths charge C4 to larger voltages thus efficiently blocking part of the first stage voltage to the final push-pull stage. This action provides regulated voltage to the final converter stage. The third and final push-pull (transformer) converter stage provides the galvanic isolation, filtering and typically converts the internal high voltage bus to a lower regulated output voltage. The efficient push-pull stage produces alternating magnetizing currents in the NSME for maximum load over core mass. Constant frequency non-overlapping two-phase generator sub-circuit PPG (FIG. 43) generates the drive for the push-pull output stage. Phase one output pin PH1 is connected to sub-circuit AMP1 pin GA1, output pin PH2 is connected to sub-circuit AMP2 pin GA1. Output of amplifier buffer sub-circuit AMP1 pin GAP2 connects to gate of push-pull output switch Q6. Output of amplifier buffer sub-circuit AMP2 pin GAP2 connects to gate of push-pull output switch Q9. The buffering provided by AMP1 and AMP2 shortens switch Q1 ON and OFF times greatly reducing switching losses. (See FIGS. 13 and 14) Regulated 18-volt power from sub-circuit CPA pin CP18+ is connected to amplifier buffer sub-circuit AMP1 pin GA+, amplifier buffer sub-circuit AMP2 pin GA+ and sub-circuit PPG pin PPG+. Drain of transistor Q6 is connected to snubber network sub-circuit SNB pin SNB1 and to non-saturating center tapped primary magnetic element sub-circuit PPT1 pin P2H. Drain of transistor Q9 is connected to snubber network sub-circuit SNA (FIG. 31) pin SNA1 and sub-circuit PPT1 pin P2L. Return node PF− connects source of transistor Q6 to snubber network sub-circuit SNB pin SNB3, transistor Q9 source, sub-circuit SNA pin SNA3 and to return node GND2. Output of NSME sub-circuit PPT1 pin SH connects to pin C7B of rectifier sub-circuit OUTA (FIG. 25), pin SL connects to C8B. Center tap of PPT1 pin SCT is the output return or negative node OUT− it connects to sub-circuit pin OUT− and sub-circuit IFB pin OUT− and RLOAD. Supply positive output from sub-circuit OUTA pin OUT+ is connected to RLOAD and sub-circuit IFB pin OUT+. Elements LL1, BR, PFA, AMP, Q1, IPFFB, IFB and PFT1 provide power factor corrected AC to DC conversion and DC output regulation. The regulated high voltage output of this converter is used to power the efficient fixed frequency push-pull stages PPG, AMP1, AMP2, Q6, Q9, PPT1 and OUTA. Magnetic element sub-circuit PPT1 provides galvanic isolation and minimal voltage overshoot in the secondary thus minimizing filtering requirements of the rectifier sub-circuit OUTA. Sub-circuit IFB provides high-speed feedback to the AC DC converter, the speed of the boost stage provides precise output voltage regulation and active ripple rejection. In the event of a sudden line or load changes sub-circuit IPFFB compensates the internal boost. This system reduces losses by focusing output control in the middle (low current) stage of the converter and by using non-saturating magnetics, buffered switching, and rectifying snubbers throughout each stage. The combined improvements translate to higher system efficiencies, higher power densities, lower operating temperatures, and, improved thermal tolerance thereby reducing or eliminating the need for forced air-cooling per unit output. The non-saturating magnetic properties are relatively insensitive to temperature (see FIG. 17), thus allowing the converter to operate over a greater temperature range. In. practice, the operating temperature for the Kool Mu NSME is limited to 200C by wire/core insulation; the non-saturating magnetic material remains operable to near its Curie temperature of 500C. This configuration provides power factor corrected input transient protection, rapid line-load and ripple compensation, excellent output regulation, output isolation and quiet efficient operation at high temperatures.

Figure 4:
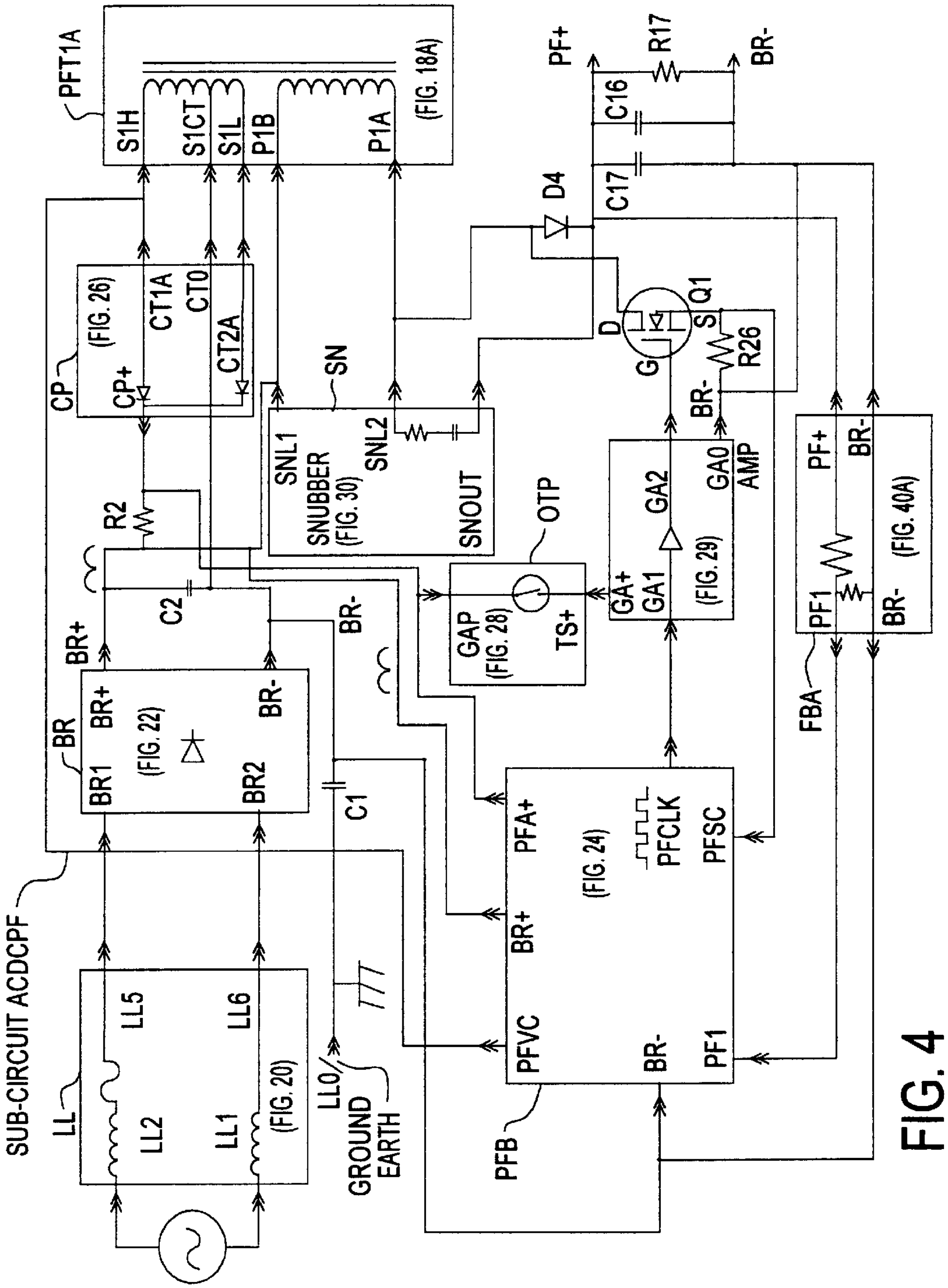
FIG. 4 is a schematic diagram of a power factor corrected single stage AC to DC converter sub-circuit ACDFPF.

FIG. 4 is a schematic diagram sub-circuit ACDCPF.

FIG. 4 is a schematic diagram of a power factor corrected single stage AC to DC converter sub-circuit ACDCPF. The invention is comprised of line protection filter sub-circuit LL (FIG. 20) and full-wave rectifier sub-circuit BR (FIG. 22). A power factor corrected regulated boost stage with sub-circuits PFB (FIG. 24), snubber sub-circuit SN (FIG. 30), magnetic element sub-circuit PFT1A (FIG. 18A), sub-circuit CP (FIG. 26), buffer sub-circuit AMP (FIG. 29), over temperature sub-circuit OTP (FIG. 28), and voltage feedback sub-circuit FBA (FIG. 40A). Start up resistor R2, filter capacitor C1, PFC capacitor C2, flyback diode D4, switch transistor Q1, hold up capacitors C17 and C16, and resistor R17.

| FIG. 4 Element | Table Value/part number |
|---|---|
| C1 | .01 uf |
| C2 | 1.8 uf |
| R2 | 100k ohms |
| R26 | 0.05 ohms |
| Q1 | IRFP 460 |
| D4 | STA1206 DI |
| C17 | 100 uf |
| C16 | 100 uf |
| R17 | 375k ohms |

AC line is connected to sub-circuit LL (FIG. 20) between pins LL1 and LL2. AC/earth ground is connected to node LL0. The filtered and voltage limited AC line appears on node/pin LL5 of sub-circuit LL1 and connected to node BR1 of bridge rectifier sub-circuit BR (FIG. 22). The neutral/AC return leg of the filtered and voltage limited AC appears on pin LL6 of sub-circuit LL is connected to input pin BR2 of BR. The line voltage is full-wave rectified and is converted to a positive haversine appearing on node BR+ of sub-circuit BR (FIG. 22). Start up resistor R2 connects. BR+ to sub-circuit CP pin CP+. Node CP+ connects to pins PFA+ of power factor controller sub-circuit PFA (FIG. 24) and over temperature switch sub-circuit OTP (FIG. 28) pin GAP. Resistor R2 provides start up power to the control element until the rectifier and regulator CP is at full output. Node S1H from PFT1A is connected to node PFVC sub-circuit PFB. The zero crossing of the core bias are sensed when the voltage at S1H is at zero. The core zero crossings are used to reset the PFC and start a new cycle. The positive node of the DC side of bridge BR+ is connected through capacitor C2 to BR−. C2 is selected for various line and load conditions to de-couple switching current from the line improving power factor. Primary of NSME sub-circuit PFT1A (FIG. 18A) pin P1B connects to pin SNL1 of snubber sub-circuit SN (FIG. 30), sub-circuit PFB pin BR+ and connects to node BR+. The return line for the rectified AC power BR− is connected to the following pins; BR− of sub-circuit BR, sub-circuit PFB pin BR−, sub-circuit AMP pin GA0, sense resistor R26, capacitor [C16||C17|| resistor R17], capacitor C2, sub-circuit CP pin CT0, sub-circuit PFT1A pin S1CT and through EMI filter capacitor C1 to earth ground node LL0. Drain of output switch Q1 is connected to diode D4 anode, sub-circuit PFT1A pin P1A and snubber sub-circuit SN pin SNL2. Additional rectification efficiency and protection is achieved by adding sub-circuit DSN (FIG. 30A) in parallel flyback diode D4. Sub-circuit provides reduces the high voltage stress to Q1 until flyback diode D4 begins conduction. Line coupled, power factor corrected boost regulated output voltage of the AC to DC converter stage (FIG. 1) appears on node PF+. The regulated boost output PF+ connects to the following; sub-circuit SN pin SNOUT, diode D4 cathode, capacitor [C16||C17||R17], and snubber DSN (FIG. 30A) pin SNOUT. Magnetic element winding node S1H of sub-circuit PFT1A is connected to CP pin CT1A and pin PFVC of sub-circuit PFB. Magnetic element winding node S1L of sub-circuit PFT1A is connected to CP pin CT2A. Sub-circuit PFB using the phase of the AC line, and load voltage generates a command pulse PFCLK. Pin PFCLK of sub-circuit PFB (FIG. 24) is connected to the input of buffer amplifier pin GA1 of sub-circuit AMP1 (FIG.

29). Buffered high-speed gate drive output pin GA2 of sub-circuit AMP is connected to gate of switch FET Q1. The buffering provided by AMP shortens switch Q1 ON and OFF times greatly reducing switch losses. The source of Q1 is connected to current sense resistor R26, pin PFSC of sub-circuit PFB, connected then to return node BR−. The voltage developed across R26 is feedback to PFB pin PFSC. This signal is used to protect the switch in the event of an over current fault. Thermal switch THS1 is connected to Q1. In the event Q1 reaches approximately 105C THS1 opens removing power to sub-circuit AMP, safely shutting down the first stage. Normal operation resumes after the switch temperature drops 20–30C closing THS1. Sub-circuit feedback network FBA (FIG. 40A) pin PF1 is connected to sub-circuit PFB pin PF1. Converter output at node PF+ (the junction of C17||C16 and D4) is connected to sub-circuit FBA pin PF+. The return line of sub-circuit FBA pin BR− is connected to pin BR− of sub-circuit PFB. This feed back is non-isolated; network values are selected for a substantially constant 385-Volt output at PF+ relative to BR−. The high-voltage haversine from the rectifier section BR pin BR+ is connected to sub-circuit PFB pin BR+. The haversine is used with an internal multiplier by PFB to make the converter ACDCPF appear resistive to the AC line. Sub-circuits LL1, BR, PFB, AMP, Q1, OTP, FBA, IFB and PFT1A perform power factor corrected AC to DC conversion. The regulated high voltage output of this converter may be used use to power one or more external converters connected to the PF+ and BR− nodes. The NSME sub-circuit PPT1A provides efficient boost action at high power levels in a very small form factor. Sub-circuit FBA provides high-speed feedback to the converter the speed of the boost stage provides precise output voltage regulation and active ripple rejection. This configuration provides power factor corrected input transient protection, rapid line-load response, excellent regulation, and quiet efficient operation at high temperatures.

Figure 5:
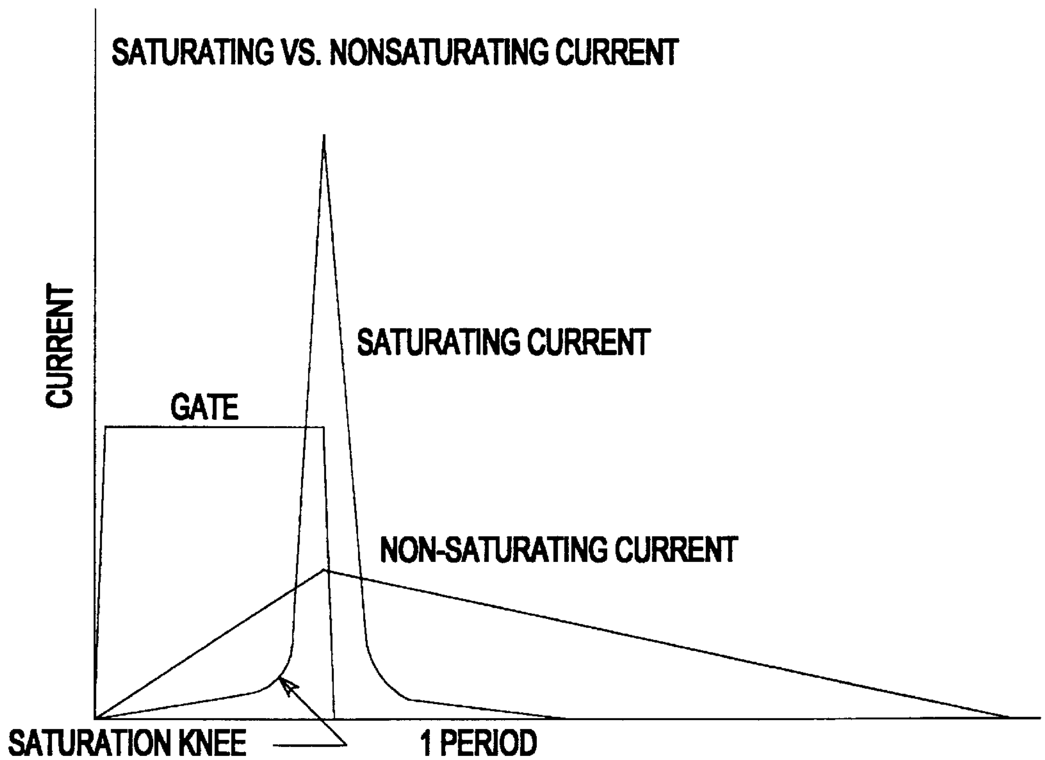
FIG. 5 is a graph comparing typical winding currents in saturating and non-saturating magnetics of equal inductance.

FIG. 5 is a graph comparing typical currents in saturating and non-saturating magnetic elements. As the inductance does not radically change at high temperatures and currents in the NSME, the large current spikes due to the rapid reduction of inductance common in saturating magnetics is not seen. As a result, destructive current levels, excessive gap leakage, magnetizing losses, and magnetic element heating are avoided in NSME.

Figure 6:
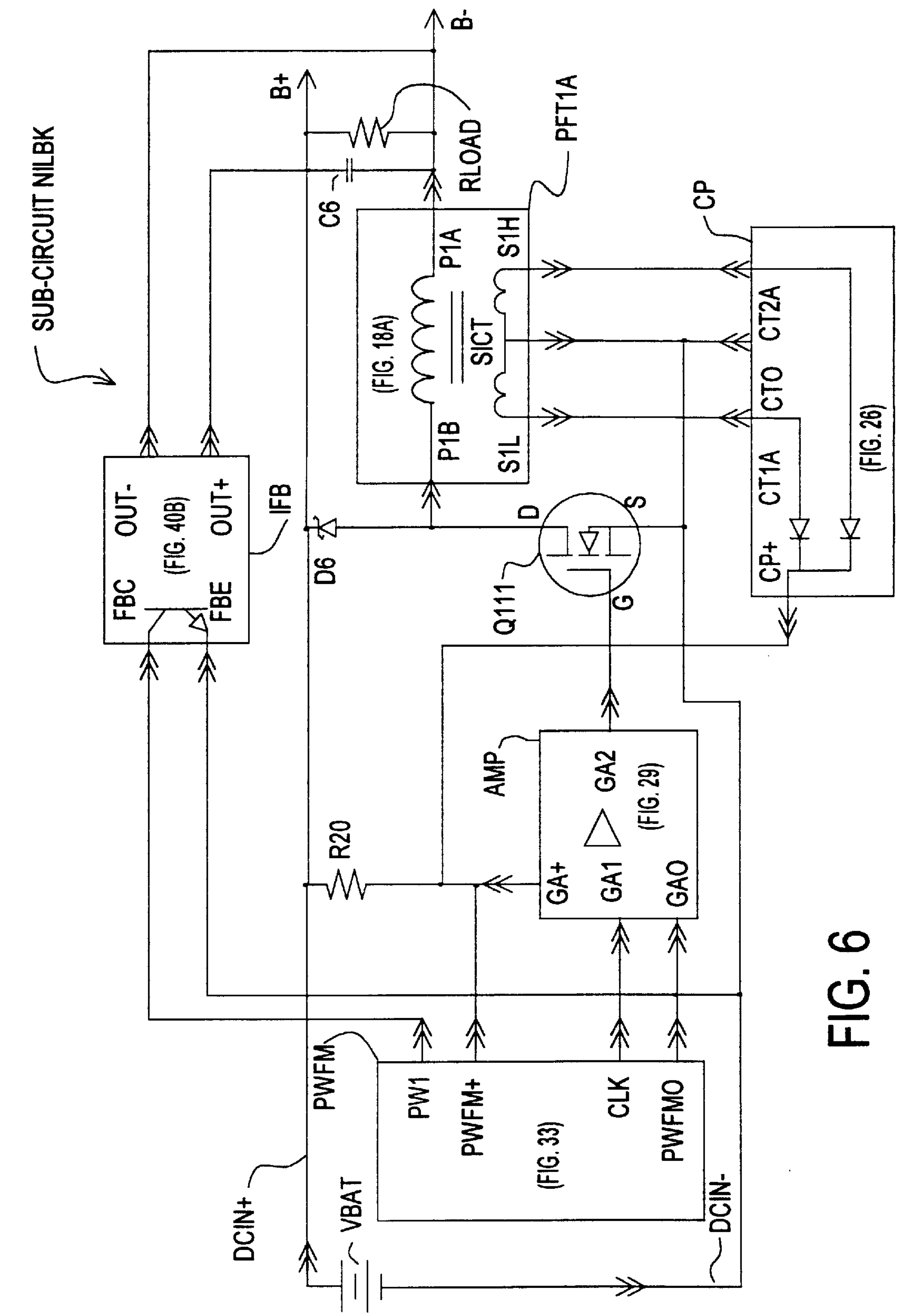
FIG. 6 is a schematic for a non-isolated low side switch buck converter sub-circuit NILBK.

FIG. 6 is a schematic for non-isolated low side switch buck converter sub-circuit NILBK. Sub-circuit NILBK consists of resistor R20, diode D6, capacitor C6, FET transistor Q111, sub-circuit CP (FIG. 26), sub-circuit PFT1A (FIG. 18A) sub-circuit IFB (FIG. 40B), sub-circuit AMP (FIG. 29) and sub-circuit PWFM (FIG. 33).

| FIG. 6 Element | Table Value/part number |
|---|---|
| R20 | 100k ohms |
| R20 | STA1206 DI |
| Q111 | IRFP460 |
| C6 | 10 uf |

External power source VBAT connects to pins DCIN+ and DCIN−. From DCIN+ through resistor R20 connects to sub-circuit CP pin CP+, sub-circuit AMP pin GA+ and to sub-circuit PWFM pin PWFM+. Resistor R20 provides startup power to the converter before regulator sub-circuit CP reaches it full 18-volt output. VBAT negative is connected to pin DCIN−connects to sub-circuit PWFM pin PWFM0, sub-circuit AMP pin GA0, Q111 source, sub-circuit IFB pin FBE, sub-circuit CP pin CT0, and sub-circuit PFT1 pin S1CT. Magnetic element winding node S1H of sub-circuit PFT1A is connected to CP pin CT1A. Magnetic element winding node S1CT of sub-circuit PFT1 is connected to CP pin CT0. Magnetic element winding node S1H of sub-circuit PFT1A is connected to CP pin CT2A. The regulated 18 volts from sub-circuit CP+ is connected to R20, sub-circuit AMP pin GA+ and to sub-circuit PWFM pin PWFM+. Sub-circuit PWFM is designed for variable pulse width operation. PWFM is configured for maximum pulse width 90–95% with no feedback current from sub-circuit IFB pin FBC. Increasing the feedback current reduces the pulse-width and output voltage from converter NILBK. Sub-circuit PWFM clock/PWM output pin CLK is connected to the input pin GA1 of buffer sub-circuit AMP. The output of sub-circuit AMP pin GA2 is connected to the gate of Q111. Input node DCIN+ connects to the cathode of flyback diode D6, sub-circuit IFB pin OUT+, resistor RLOAD, capacitor C6 and pin B+. The drain of Q111 is connected to sub-circuit PFT1 pin P1B and the anode of D6. Pin P1A of sub-circuit PFT1A is connected to capacitor C6, RLOAD, sub-circuit IFB pin OUT−and to node B−. With sub-circuit PWFM pin CLK high buffer AMP output pin GA2 charges the gate of transistor switch Q111. Switch Q111 conducts charging capacitor C10 through NSME PFT1A from source VBAT and storing energy in PFT1A. Feedback output pin FBC from sub-circuit IFB is connected to sub-circuit PWFM pulse-width adjustment pin PW1. Sub-circuit IFB removes current from PW1 commanding PWFM to reduce the pulse-width or on time of signal CLK. After sub-circuit PWFM reaches the commanded pulse-width PWFM switches output pin CLK low turning "off" Q111 stopping the current into PFT1A. The energy not transferred into regulator sub-circuit CP load is released from NSME PFT1A into the now forward biased diode D6 charging capacitor C6. By modulating the "on" time of switch Q111 the converter buck voltage is regulated. Regulated voltage is developed across Nodes B− and B+. Sub-circuit IFB provides the isolated feedback voltage to the sub-circuit PWFM. When sub-circuit IFB senses the converter output (nodes B+ and B−) is at the designed voltage, current from REF is removed from PM1. Sinking current from PM1 commands the PWFM to a shorter pulse-width thus reducing the converter output voltage. In the event the feedback signal from IFB commands the PWFM to minimum output. Gate drive to switch Q111 is removed stopping all buck activity capacitor C6 discharges through RLOAD. Input current from VBAT is sinusoidal making the converter very quiet. In addition the switch Q111 is not exposed to large flyback voltage. Placing less stress on the switches thereby increasing the MTBF. Sub-circuit NILBK takes advantage of the desirable properties of the NSME in this converter topology. Adjusting the NSME 100 (FIG. 18A) primary inductance and component values in sub-circuit IFB determines the output buck voltage.

Figure 8:
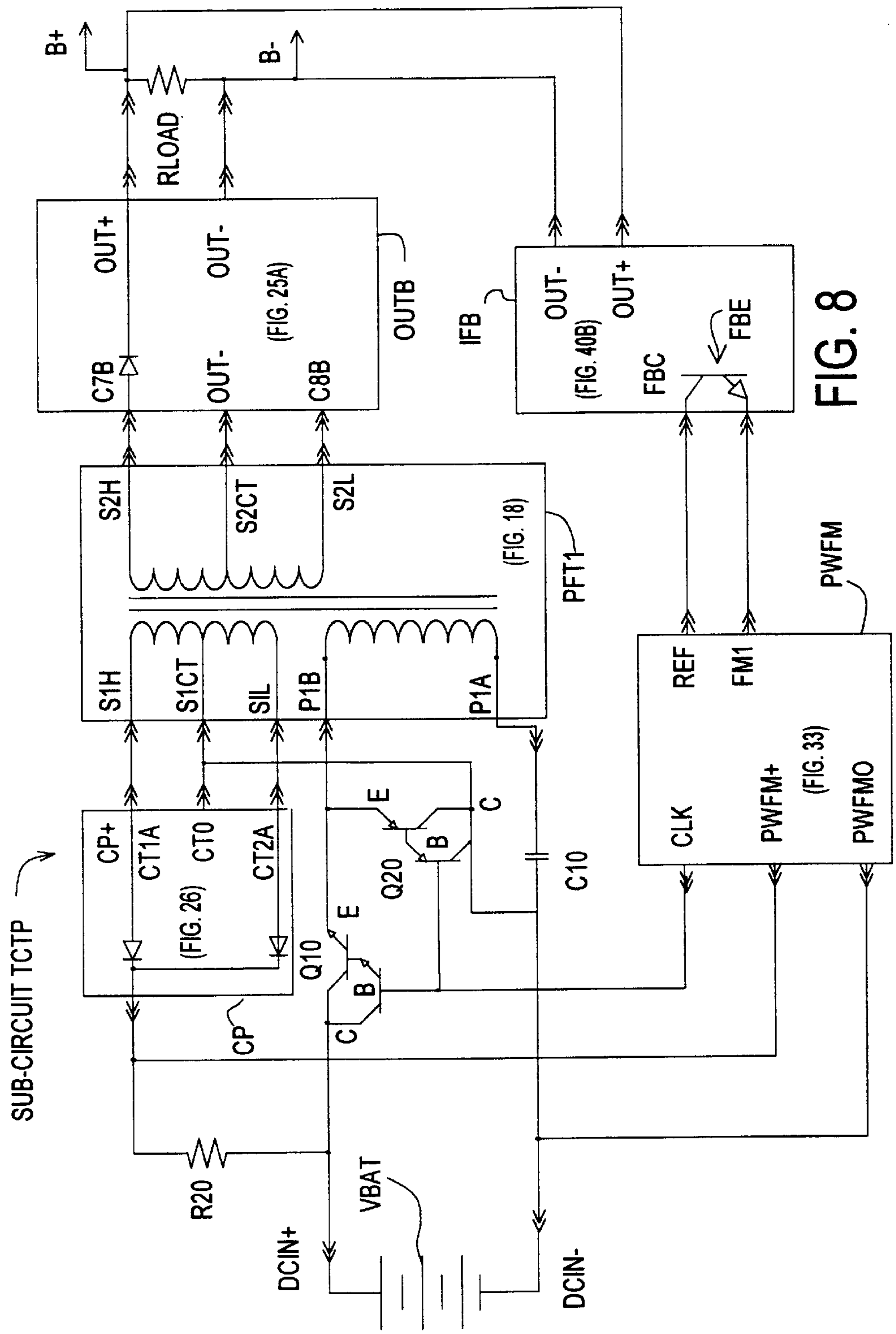
FIG. 8 is a schematic for a tank coupled totem pole converter sub-circuit TCTP.

FIG. 8 is a schematic for a tank coupled single stage converter sub-circuit TCTP. Sub-circuit TCTP consists of resistor R20 and RLOAD, capacitor C10, Darlington transistors Q10 and Q20, sub-circuit CP (FIG. 26), sub-circuit PFT1 (FIG. 18), sub-circuit OUTB (FIG. 25A), sub-circuit IFB (FIG. 40B) and sub-circuit PWFM (FIG. 33).

| FIG. 8 Element | Table Value/part number |
|---|---|
| R20 | 5k ohms |
| Q10 | TST541 |
| Q20 | IRFP460 |
| C10 | 1.8 uf |

Figure 35:
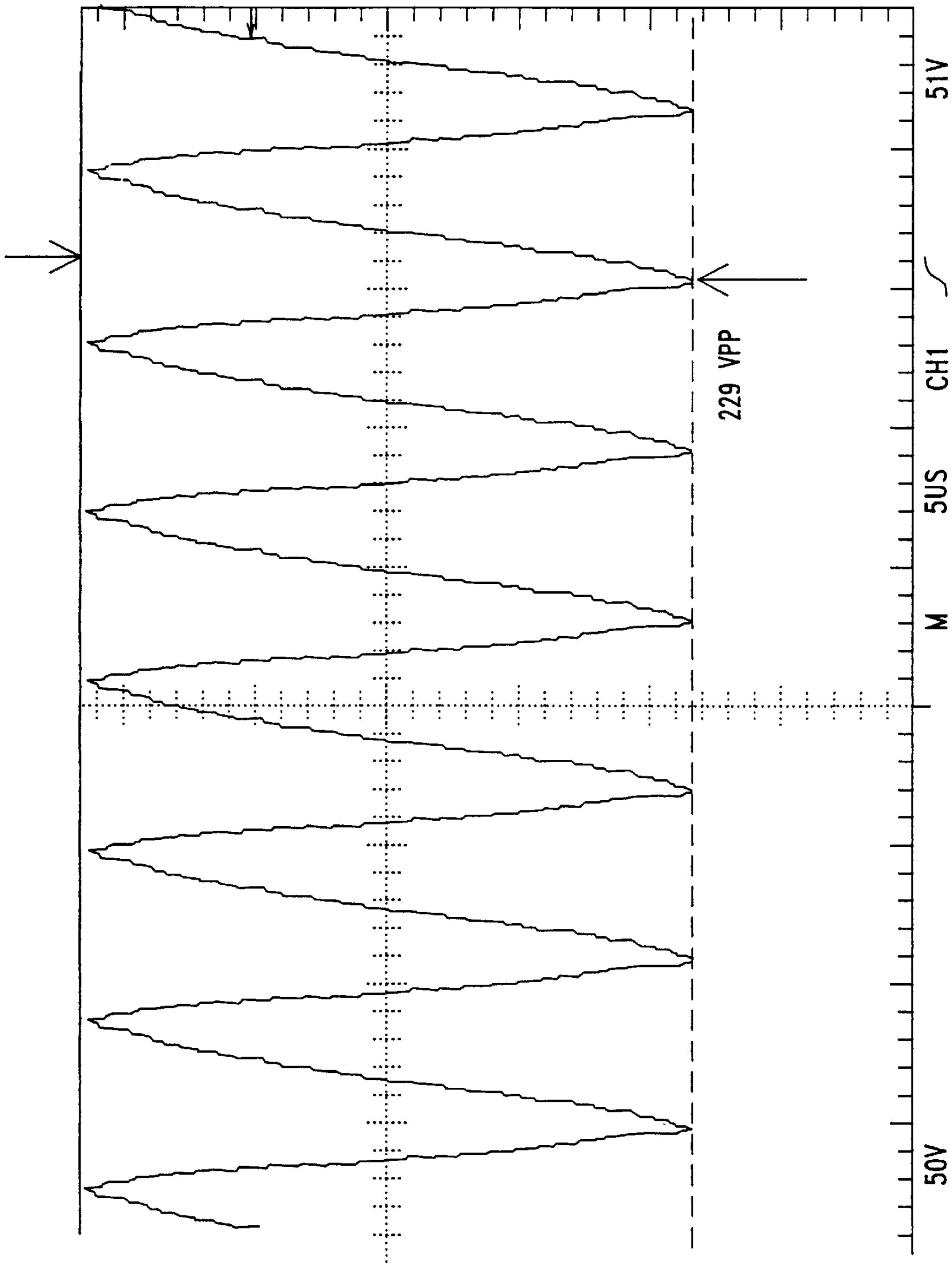
FIG. 35 is an oscillograph of the primary tank voltage measured during operation of sub-circuit TCTP (FIG. 8).

External power source VBAT connects to pins DCIN+ and DCIN−. From DCIN+ connects to Q10 collector then through resistor R20 connects to sub-circuit CP pin CP+ and to sub-circuit PWFM pin PWFM+. Resistor R20 provides startup power to the converter before regulator sub-circuit CP reaches it full 18-volt output. VBAT negative is connected to pin DCIN− ground/return node GND. Node GND connects to sub-circuit PWFM0 pin PWFM0, Q20 collector, C10, sub-circuit CP pin CT0 and sub-circuit PFT1 pin S1CT. Magnetic element winding node S1H of sub-circuit PFT1 is connected to CP CT1A. Magnetic element winding node S1L of sub-circuit PFT1 is connected to CP CT2A. Magnetic element winding node S1CT of sub-circuit PFT1 is connected to CP pin CT0. Magnetic element winding node S2H of sub-circuit PFT1 is connected to CP pin CT2A. The regulated 18 volts from sub-circuit CP+ is connected to R20 and to sub-circuit PWFM pin PWFM+. Sub-circuit PWFM is designed for a constant 50% duty cycle variable frequency generator. Sub-circuit PWFM clock output pin CLK is connected to the base of Q10 and Q20. The emitters of Q10 and Q20 are connected to sub-circuit PFT1 pin P1B. This forms an emitter follower configuration. Pin P1A of sub-circuit PFT1 is connected through tank capacitor C10 to node GND. With PWFM CLK pin high forward biased transistor Q10 supplies current to the tank from BAT1 charging capacitor C10 through NSME PFT1 and transferring energy into PFT1. Sub-circuit PWFM switches CLK low turning "off" Q10 stopping the current into PFT1. Energy not transferred into the load is released from NSME PFT1 into the now forward biased PNP transistor Q20 back into capacitor C10. Thus any energy not used by the secondary loads is transferred back to the primary tank to be used next cycle. When the switching occurs at the resonant frequency large circulating currents develop in the tank. Also C10 is charged and discharged to very large voltages. Oscillograph in FIG. 35 is the actual voltage developed across capacitor C10 with VBAT equal to 18 volts. A very large 229-Volts peak to peak was developed across the nodes P1A and P1A of NSME PFT1. The large primary voltage generates large biases in the NSME PFT1 to be flux harvested by the windings 102 and 103 (FIG. 18) and transferred to a load or rectifier sub-circuit OUTB. Magnetic element winding node S2L of sub-circuit PFT1 is connected to OUTB C8*b*. Magnetic element winding node S2H of sub-circuit PFT1 is connected to C7B of sub-circuit OUTB node OUT−. Node OUT− is connected to RLOAD, pin B− and to sub-circuit IFB pin OUT−. Rectified power is delivered to pin OUT+ of OUTB and is connected to RLOAD, pin B+ and to sub-circuit IFB pin OUT+. Sub-circuit IFB provides the isolated feedback signal to the sub-circuit PWFM. Frequency control pin FM1 of sub-circuit PWFM is connected to sub-circuit IFB pin FBE. Internal reference pin REF of sub-circuit PWFM is connected to sub-circuit IFB pin FBC. PWFM is designed to operate at the resonate frequency of the tank. When sub-circuit IFB senses the converter output is at the designed voltage, current from REF is injected into FM1. Injecting current into FM1 commands PWFM to a lower frequency. Operating below resonance reduces the amount of energy added to the primary tank thus reducing the converter output voltage. In the event the feedback signal from IFB commands the PWFM to 0 Hz all primary activity stops. Input current from VBAT is sinusoidal making the converter very quiet. In addition the switches Q10 and Q20 are never exposed to the large circulating voltage (FIG. 35). Placing less stress on the switches thereby increasing the MTBF. Sub-circuit TCTP takes advantage of the desirable properties of the NSME in this converter topology. Adjusting secondary turns allows TCTP to generate very large AC or DC output voltages as well as low-voltage high current outputs.

Figure 9:
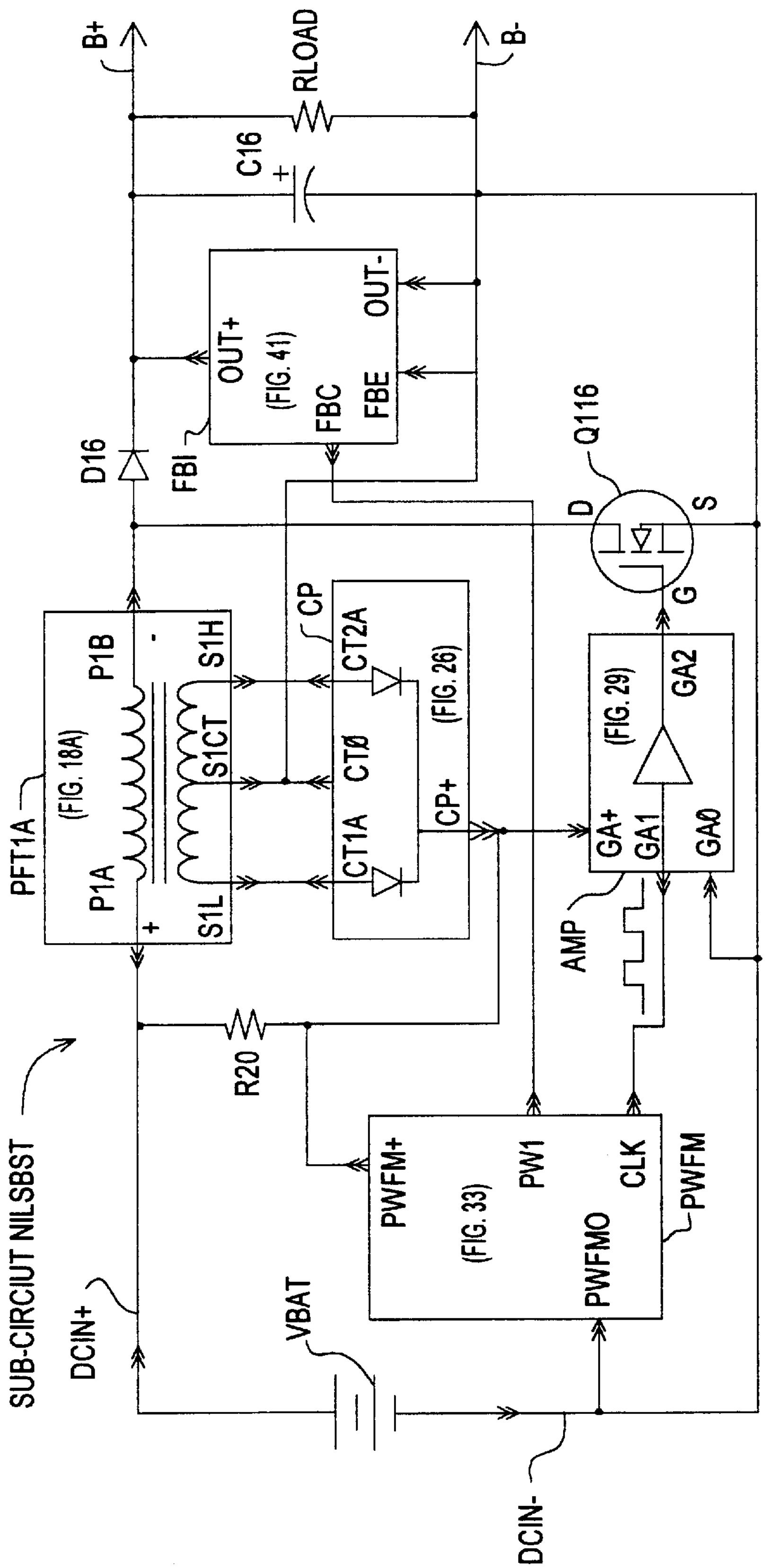
FIG. 9 is a block diagram for a single stage non-isolated DC to DC boost converter NILSBST.

FIG. 9 is a schematic for non-isolated low side switch boost converter sub-circuit NILSBST. Sub-circuit NILSBST consists of resistor R20 and RLOAD, diode D6, capacitor C6, FET transistor Q111, sub-circuit CP (FIG. 26), sub-circuit PFT1A (FIG. 18A) sub-circuit FBI (FIG. 41), sub-circuit AMP (FIG. 29) and sub-circuit PWFM (FIG. 33).

| FIG. 9 Element | Table Value/part number |
|---|---|
| R20 | 100k ohms |
| Q111 | IRFP460 |
| D6 | STA1206 DI |
| C6 | 200 uf |

External power source VBAT connects to pins DCIN+ and DCIN−. From DCIN+ Resistor R20 connects to sub-circuit CP pin CP+, sub-circuit AMP pin GA+ and to sub-circuit PWFM pin PWFM+. Resistor R20 provides startup power to the converter before regulator sub-circuit CP reaches it full 18-volt output. VBAT negative is connected to pin DCIN− and ground return node GND. Node GND connects to sub-circuit PWFM pin PWFM0, sub-circuit AMP pin GA0, Q111 source, sub-circuit FBA pin BR−, sub-circuit FBA pin FBA, sub-circuit CP pin CT0, capacitor C6, resistor RLOAD, transistor Q111 source, and sub-circuit PFT1 pin S1CT. Magnetic element winding node S1H of sub-circuit PFT1A is connected to CP pin CT1A. Magnetic element winding node S1CT of sub-circuit PFT1 is connected to CP pin CT0. Magnetic element winding node S2H of sub-circuit PFT1A is connected to CP pin CT2A. The regulated 18 volts from sub-circuit CP+ is connected to R20, sub-circuit AMP pin GA+ and to sub-circuit PWFM pin PWFM+. Sub-circuit PWFM is designed for variable pulse width operation. PWFM is configured for maximum pulse width 90–95% (maximum boost voltage) with no feedback current from sub-circuit FBI. Increasing the feedback current reduces the pulse-width reducing the boost voltage and reducing the output from converter NILSBST. Sub-circuit PWFM clock/PWM output pin CLK is connected to the input pin GA1 of buffer sub-circuit AMP. The output of sub-circuit AMP pin GA2 is connected to the gate of Q111. Input node DCIN+ connects to the NSME PFT1A pin P1A. The drain of Q11 is connected to sub-circuit PFT1A pin P1B and the anode of D6. Cathode of diode D6 is connected to sub-circuit FBA pin PF+, resistor RLOAD, C6 and pin BK+. With sub-circuit PWFM pin CLK high buffer AMP output pin GA2 charges the gate of transistor switch Q111. Switch Q111 conducts reverse biasing diode D6 capacitor C10 stops charging through NSME PFT1A from source VBAT. During the time Q111 is conducting, energy is stored in NSME sub-circuit PFT1A. Feedback output pin FBC from sub-circuit FBI is connected to sub-circuit PWFM pulse-width adjustment pin PW1. Sub-circuit FBI removes current from PW1 commanding PWFM to reduce the pulse-width or on time of signal CLK. After sub-circuit PWFM reaches the commanded pulse-width PFFM switches CLK low turning "off" Q111 stopping the current into PFT1A. The energy not transferred into regulator sub-circuit CP load is released from NSME PFT1A into the now forward biased diode D6 charging capacitor C6. By modulating the "on" time of switch Q111 the converter boost voltage is regulated. Regulated voltage is developed across Nodes B− and B+. Sub-circuit IFB provides the feedback current to the sub-circuit PWFM. When sub-circuit IFB senses the converter output (nodes B+ and B−) is at or greater than the designed voltage, current is removed from PM1. Sinking current from PM1 commands the PWFM to a shorter pulse-width thus reducing the converter output voltage. In the event the feedback signal from IFB commands the PWFM to minimum output. Gate drive to switch Q111 is removed stopping all boost activity capacitor C6 charges to VBAT. Input current from VBAT is sinusoidal making the converter very quiet. In addition the switch Q111 is not exposed to large flyback voltage. Placing less stress on the switches thereby increasing the MTBF. Sub-circuit NILBK takes advantage of the desirable properties of the NSME in this converter topology. Adjusting the NSME 100 (FIG. 18A) primary inductance and component values in sub-circuit IFB determines the output boost voltage.

Figure 10:
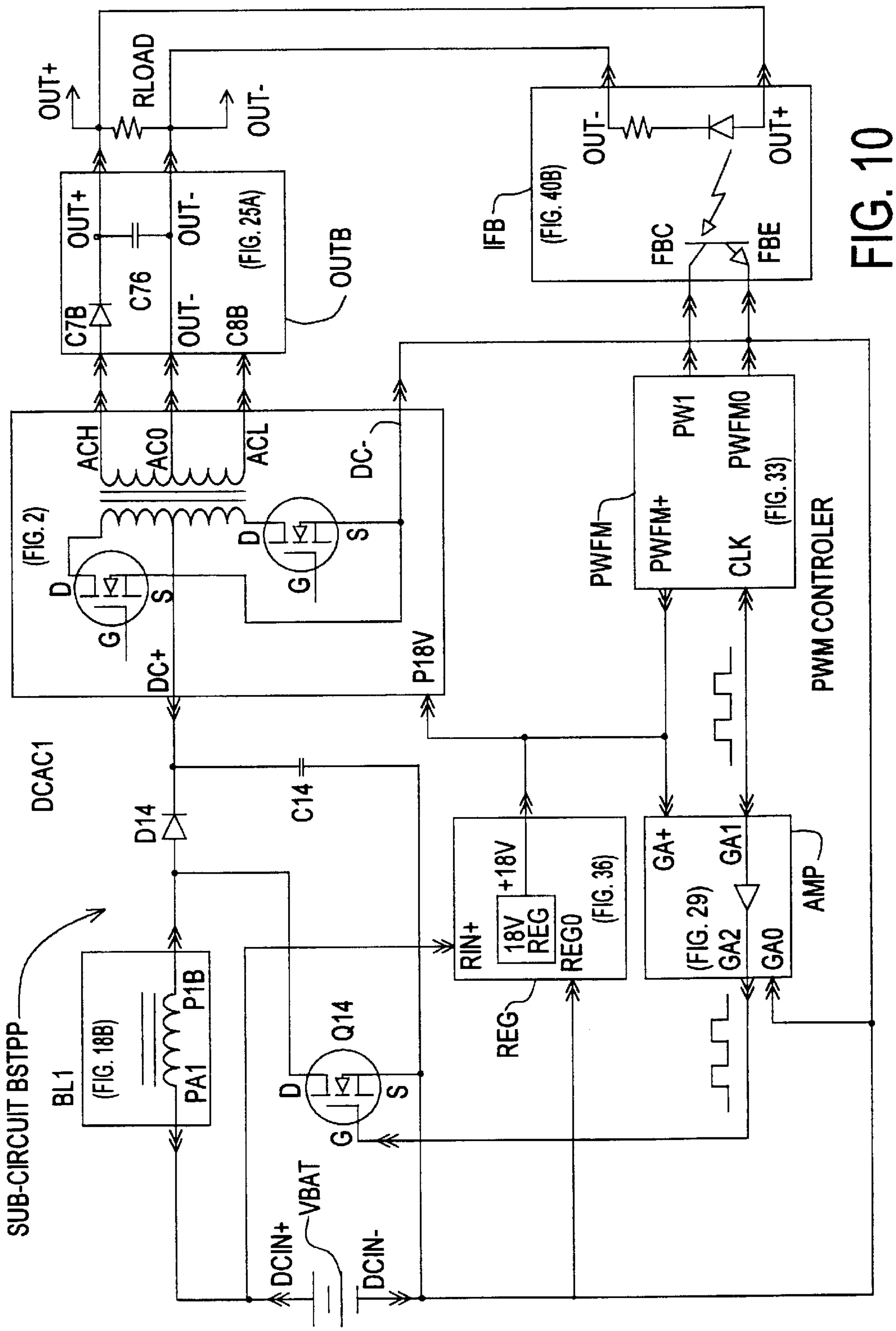
FIG. 10 is a schematic for a two stage isolated DC to DC boost controlled push-pull converter BSTPP.

FIG. 10 is a schematic for a two stage isolated DC to DC boost controlled push-pull converter BSTPP. Sub-circuit BSTPP consists of diode D14, capacitor C14, FET transistor Q14, sub-circuit REG (FIG. 36), sub-circuit BL1 (FIG. 18B), sub-circuit IFB (FIG. 40B), sub-circuit AMP (FIG. 29), sub-circuit DCAC1, and sub-circuit PWFM (FIG. 33). External power source VBAT connects to pins DCIN+ and DCIN−.

| FIG. 10 Element | Table Value/part number |
|---|---|
| Q31 | IRFP460 |
| D14 | STA1206 DI |
| C14 | 10 uf |

Figure 19:
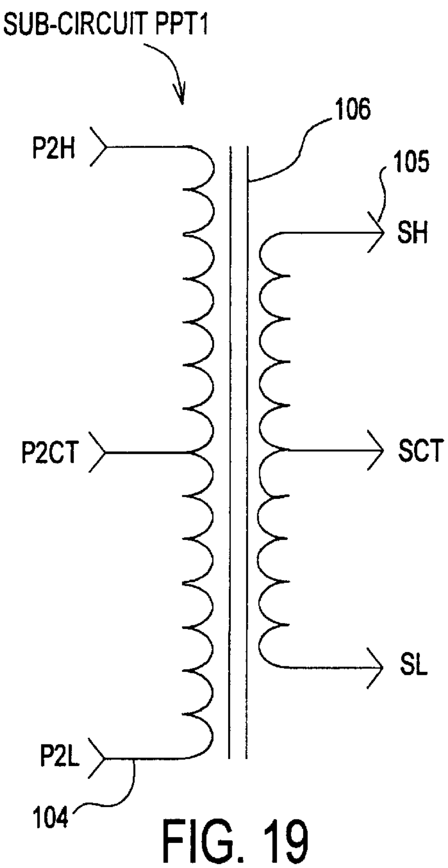
FIG. 19 is a schematic representation of the push-pull NSME sub-circuit PPT1.

From pin DCIN+ connects to sub-circuit REG pin RIN+ and sub-circuit BL1 pin P1A. Voltage regulator sub-circuit output pin +18V connects to sub-circuit AMP pin GA+ and to sub-circuit PWFM pin PWFM+. Sub-circuit REG provides regulated low voltage power to the controller and to the main switch buffers. VBAT negative is connected to pin DCIN− and ground return node GND. Node GND connects to sub-circuit PWFM pin PWFM0, sub-circuit AMP pin GA0, Q14 source, capacitor C14, sub-circuit IFB pin FBE, sub-circuit REG pin REG0, sub-circuit DCAC1 pin DC−. Sub-circuit PWFM (FIG. 33) is designed for variable pulse width operation. The nominal frequency is between 20–600 Khz PWFM is configured for maximum pulse width 90% (maximum boost voltage) with no feedback current from sub-circuit FBI. Increasing the feedback current reduces the pulse-width reducing the boost voltage and reducing the output from converter BSTPP. Sub-circuit PWFM clock/PWM output pin CLK is connected to the input pin GA1 of buffer sub-circuit AMP (FIG. 29). The output of switch speed up buffer sub-circuit AMP pin GA2 is connected to the gate of Q14. Input node DCIN+ connects to the NSME BL1 pin P1A. The drain of Q14 is connected to sub-circuit BL1 pin P1B and the anode of D14. Cathode of flyback diode D14 is connected to sub-circuit DCAC1 pin DC+ and C14. With sub-circuit PWFM pin CLK high buffer AMP output pin GA2 charges the gate of transistor switch Q14. Switch Q14 conducts reverse biasing diode D14 capacitor C14 stops charging through NSME BL1 from source VBAT. During the time Q14 is conducting, energy is stored in NSME sub-circuit BL1. Feedback output pin FBC from sub-circuit IFB is connected to sub-circuit PWFM pulse-width adjustment pin PW1. Sub-circuit IFB removes current from PW1 commanding PWFM to reduce the pulse-width or "on" time of signal CLK. After sub-circuit PWFM reaches the commanded pulse-width PFFM switches CLK low turning "off" Q14 stopping the current into BL1. The energy is released from NSME BL1 into the now forward biased flyback diode D14 charging capacitor C14. By modulating the "on" time of switch Q14 the converter boost voltage is regulated. Regulated voltage is developed across C14 Nodes DC+ and GND is provided to the isolated constant frequency push-pull DC to AC converter sub-circuit DCAC1 (FIG. 2). Sub-circuit DCAC1 provides efficient conversion of the regulated boost voltage to a higher or lower voltage set by the magnetic element-winding ratio. The center tap of the push-pull output magnetic is connected to, sub-circuit OUTB pin OUT−, RLOAD, sub-circuit IFB pin OUT− and the pin OUT− forming the return line for the load and feedback network. Output of sub-circuit DCAC1 pin ACH is connected to sub-circuit OUTB pin C7*b*. Output of sub-circuit DCAC1 pin ACL is connected to sub-circuit OUTB pin C8*b*. Sub-circuit OUTB provides rectification of the AC power generated by sub-circuit DCAC1. Since the non-saturating magnetic converter has low output ripple, minimal filtering is required by OUTB. This further reduces cost and improves efficiency as losses to filter components are minimized. Sub-circuit IFB provides the isolated feedback current to the sub-circuit PWFM. When sub-circuit IFB senses the converter output (nodes OUT+ and OUT−) is greater than the designed/desired voltage, current is removed from node PM1. Sinking current from PM1 commands the PWFM to a shorter pulse-width thus reducing the converter output voltage. In the event the feedback signal from IFB commands the PWFM to minimum output. Gate drive to switch Q14 is removed stopping all boost activity capacitor C14 charges to VBAT. As the non-saturating does not saturate the destructive noisy current "spikes" common to prior art are absent. Input current from VBAT to charge C14 is sinusoidal making the converter very quiet. In addition the switch Q14 is not exposed a potentially destructive current spike. Placing less stress on the switches thereby increasing the MTBF. Sub-circuit BSTPP takes advantage of the desirable properties of the NSME. Adjusting the NSME BL1 (FIG. 18B) sets the amount of boost voltage available to the final push-pull isolation stage. Greater efficiencies are achieved at higher voltages. The final output voltage is set by the feedback set point and the turns ratio of the push-pull element PPT1 (FIG. 19).

Figure 11:
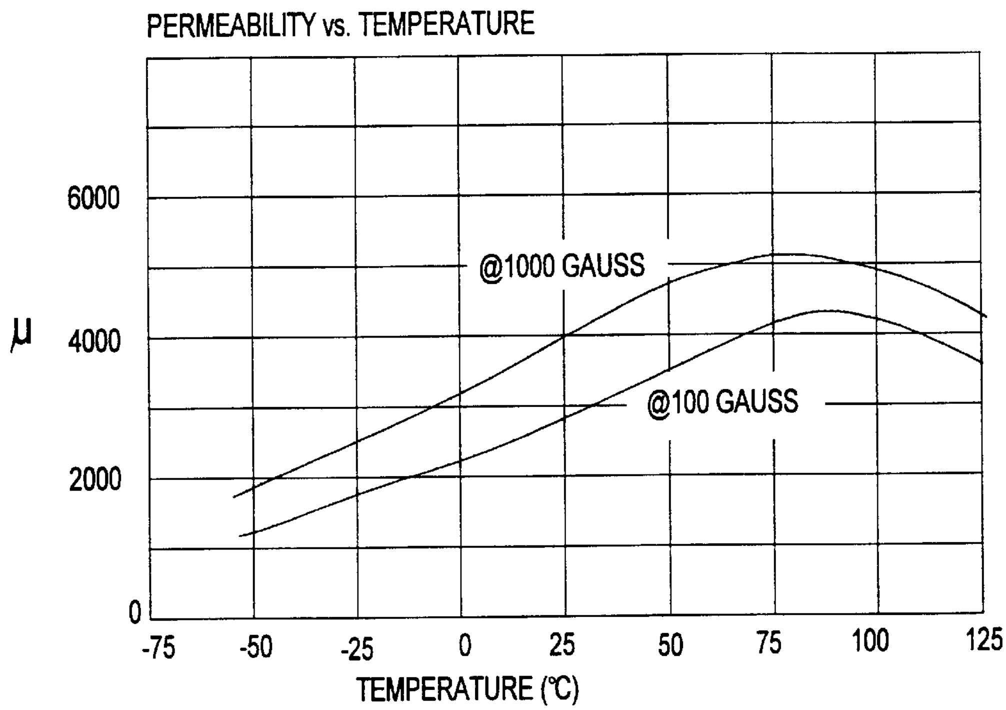
FIG. 11 is a graph of permeability as a function of temperature for typical prior art magnetic element material.

FIG. 11 is a graph of permeability as a function of temperature for typical prior art magnetic element material. The high permeability material in FIG. 11 exhibits large changes in permeability of almost 100% over a 100C range as compared to the less than 5% change for the material in FIG. 17. The increase in permeability at high temperatures of the prior art material increases the flux density resulting in core saturation for a constant power level. (See FIG. 12) Thus the prior art core must be derated at least 100% to operate over extended temperatures. The instant invention takes advantage of the desirable properties of the NSME. Eliminating the need to derated the magnetic element. As the magnetic element performs better at high temperatures, currently limited by melting wire insulation.

Figure 12:
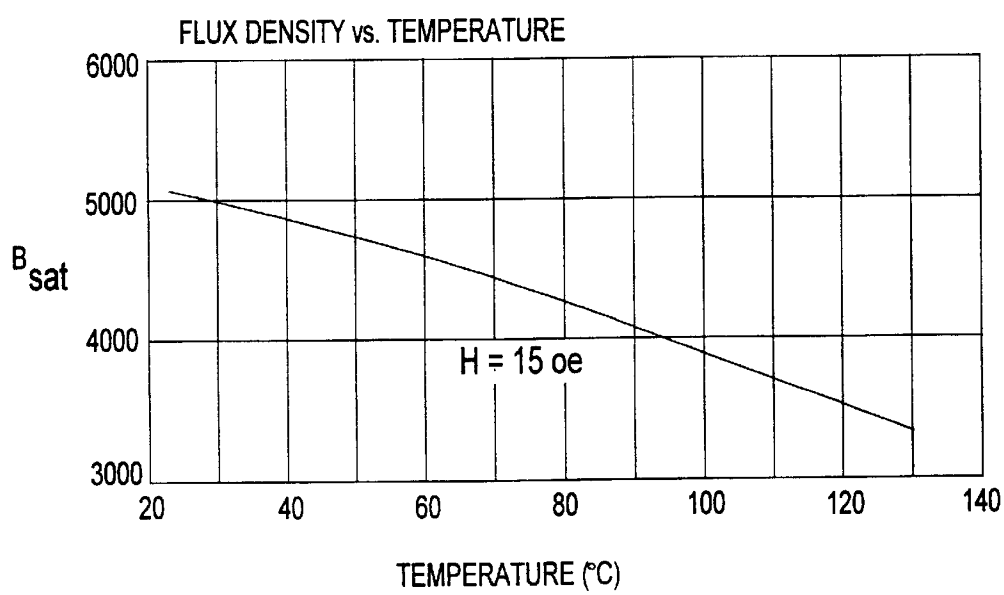
FIG. 12 is a graph of flux density as a function of temperature for typical prior art magnetic element material.

FIG. 12 is a graph of flux density as a function of temperature for typical prior art magnetic element material. The reduction of maximum flux density with temperature is typical of the saturating magnetic element prior art material. Thus the prior art core is commonly derated at least 100% to operate over extended temperatures. Resulting in a larger more expensive design, and or the requirement to cool the core.

Figure 12A:
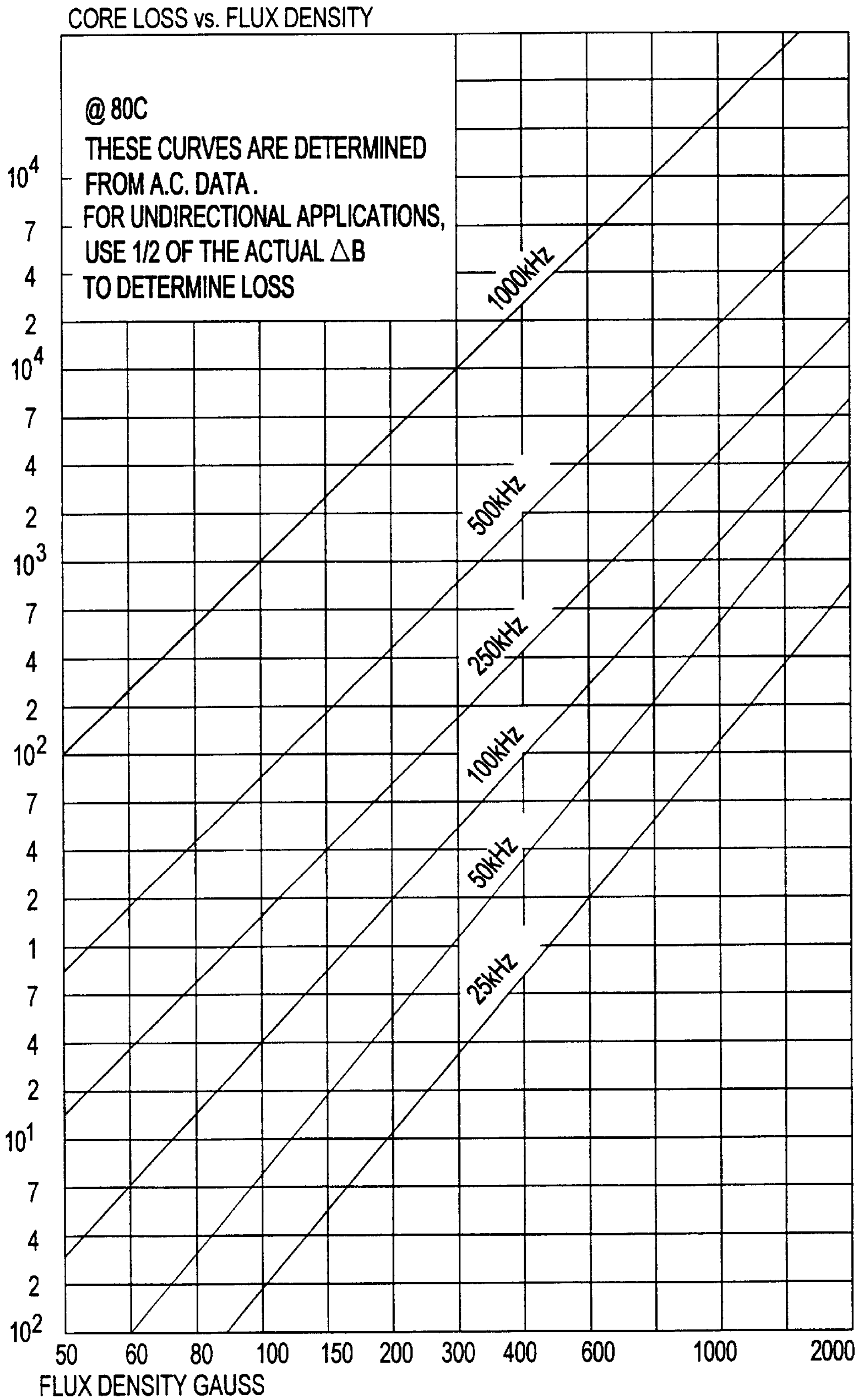
FIG. 12A is a graph of magnetic element losses for various flux densities and operating frequencies typical of prior art magnetic element material.

FIG. 12A is a graph of magnetic element losses for various flux densities and operating frequencies typical of prior art magnetic element material.

Figure 13:
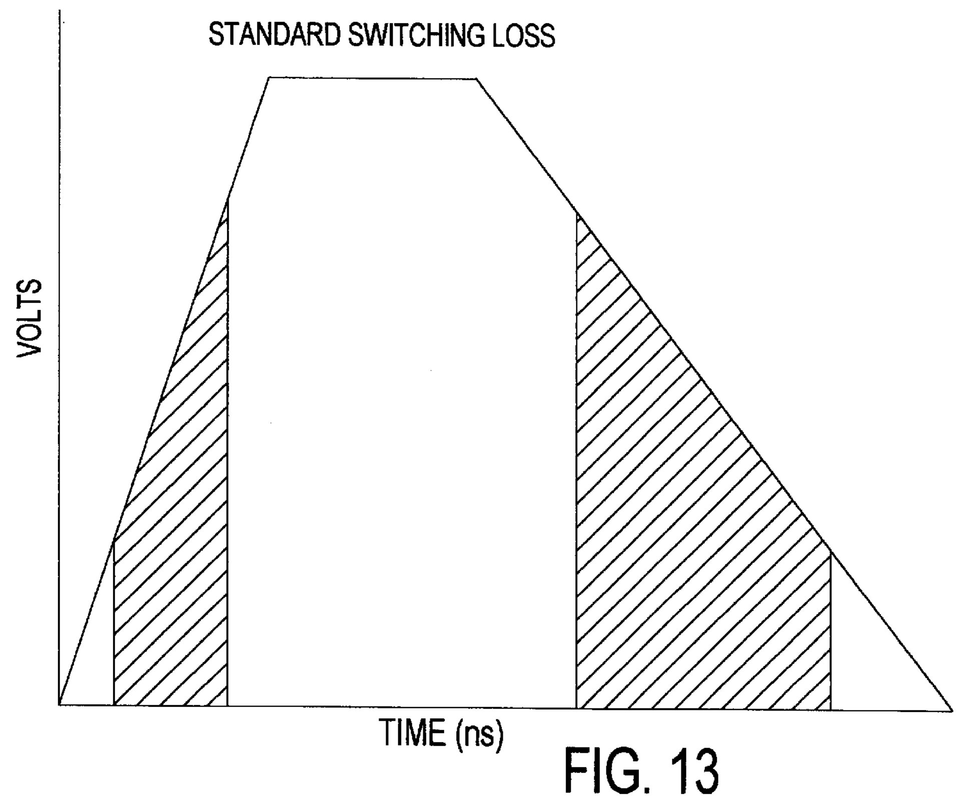
FIG. 13 is a graph showing standard switching losses.

FIG. 13 is a graph showing standard switching losses. The hashed area represents the time when the switch is in a resistive state. The hashed area is proportional to the amount of energy lost each time the output switch operates. Total power lost is the product of the loss per switch times the switching frequency.

Figure 14:
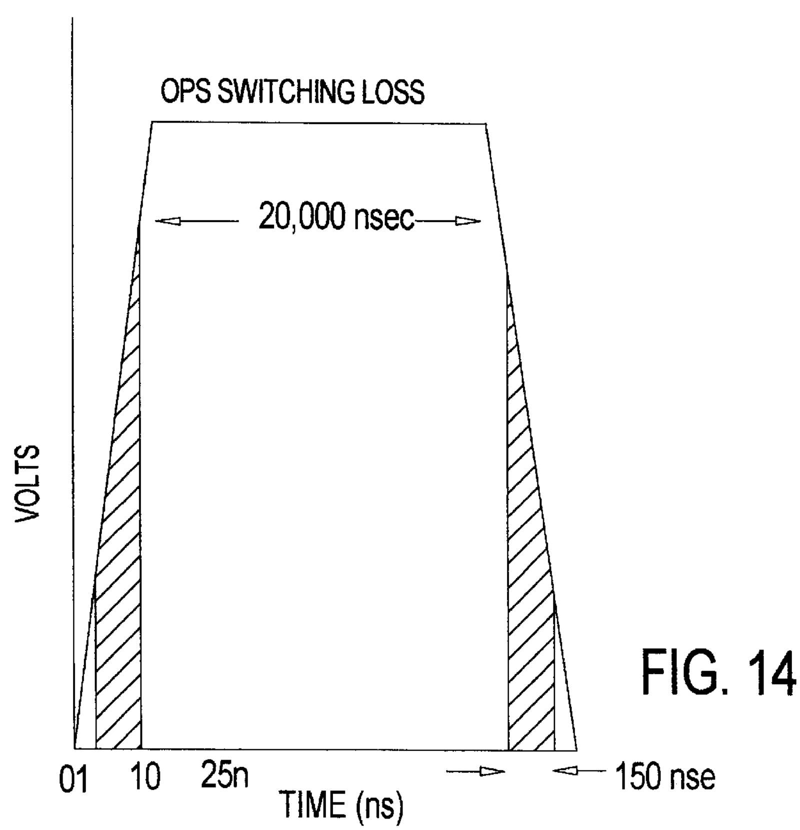
FIG. 14 is a graph showing lower switching losses of the invention.
Figure 15:
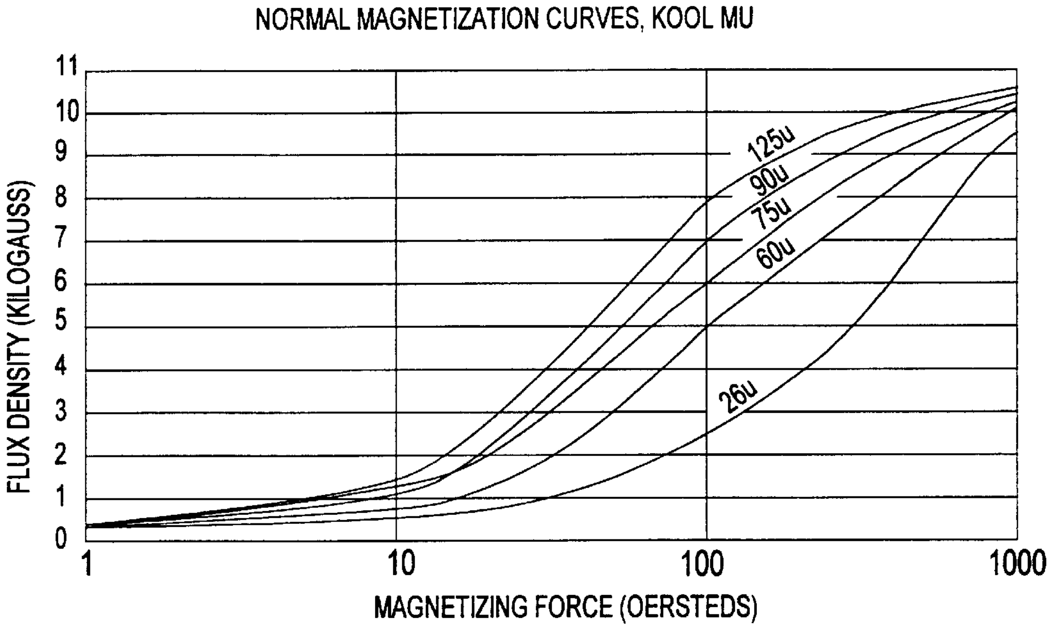
FIG. 15 is a graph showing the magnetizing curve (BH) for the NSME material.

FIG. 14 is a graph showing the inventions switching losses. The hashed area represents the time when the switch is in a resistive state. The smaller hashed area is due to the action of the buffer in FIG. 29 and the snubber isolation diode D805 in FIG. 30. Generally the NSME has a wider usable frequency band and can be magnetized from higher primary voltages. Higher operating voltages have proportionally smaller currents for a given power level thus proportionally lower losses. Switching losses more closely resemble $I^2R$ losses. Most switching loss occurs during turn "on" and turn "off" transitions; total switching losses are reduced proportionally by the lower switching frequencies and faster transition times characteristic of the disclosed NSME converters. In addition the properties of the NSME allow operation at temperature extremes beyond the tolerance of standard prior art magnetics and their geometry's. The combined contributions of the above yields a converter that requires little or no forced air-cooling. (See FIGS. 15, 16, and 17) FIG. 15 is a graph of the NSME magnetization curves for Kool Mu material. The invention makes advantageous use of the available saturation range of the NSME.

Figure 16:
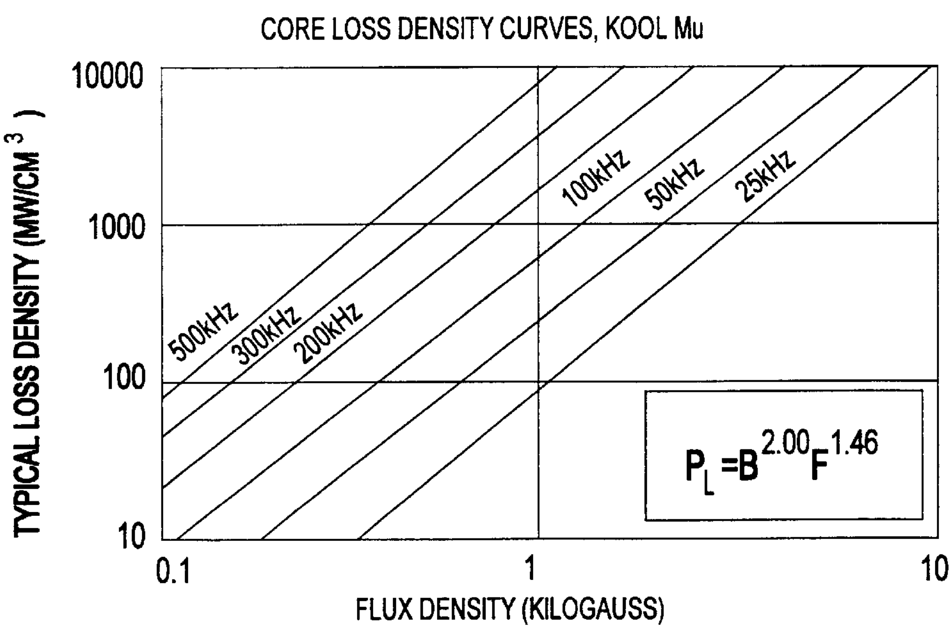
FIG. 16 is a graph of magnetic element losses for various flux densities and operating frequencies of the NSME material.

FIG. 16 is a graph of the Kool Mu NSME losses for various flux densities and operating frequencies. It can be seen from the data that much higher flux densities are available per unit losses over the prior art.

Figure 17:
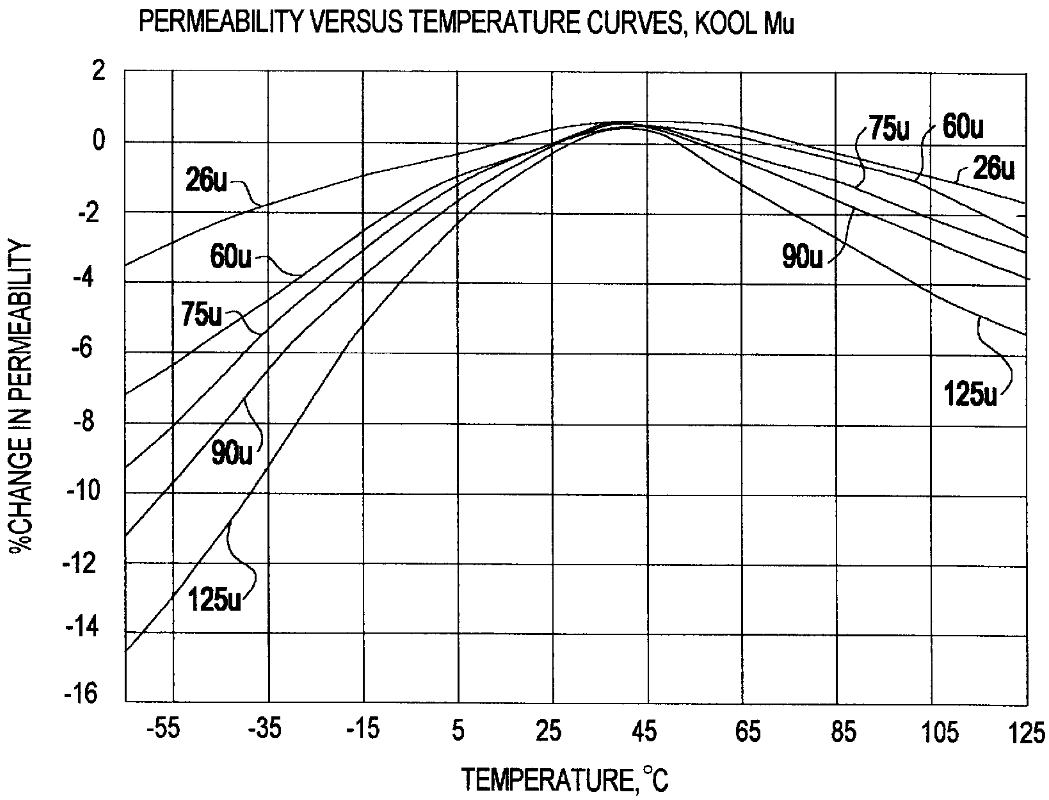
FIG. 17 is a graph of permeability as a function of temperature for the NSME.

FIG. 17 is a plot of permeability vs. temperature for several Kool Mu materials. This data demonstrates the usefulness and stability of the magnetic properties over temperature.

FIG. 18 is a schematic representation of the non-saturating magnetic boost element PFT1. Sub-circuit PFT1 consists of a primary winding 100 around a NSME 101 with two center-tapped windings 102 and 103.

| FIG. 18 Element | Table Value/part number |
|---|---|
| 100 | 55 turns 203 uh |
| 101 | 2 × 77932-A7 |
| 102 | 14 turns |
| 102 | 14 turns |

The primary winding 100 has nodes P1B and P1A for connections to external AC source. Secondary 102 winding has center-tapped node S1CT and node S1H and S1L connections to the upper and lower halves respectively. Secondary 103 winding has center-tapped node S2CT and node S2H and S2L connections to the upper and lower halves respectively. Both 102 and 103 are connected to external full-wave rectifier assemblies. Magnetic element magnetic element 101 comprises a non-saturating, low permeability magnetic material. The permeability is on the order of 26 u with a range of 1 u to 550 u, as compared to the prior art, which ranges from 1500 to 5000 u. Flyback management is of concern when using NSME in a boost converter because the magnetic element generates high drain source voltages across the primary switch during the reverse recovery time of the flyback (output) diode. The magnitude per cycle of flyback current from NSME is greater for a given input magnetizing force relative to the prior art. (See FIG. 5) For example, Kool Mu torroids (Materials from Magnetics) are suitable for this application. This material is not identified by way of limitation. The material comprises, by weight, 85% iron, 6% aluminum, and 9% silicon. Further, the magnetic element may be air, (permeablity=1); a molypermalloy powder, (MPP) a high flux MPP, a powder, a gapped ferrite, a tape wound, a cut magnetic element, a laminated, or an amorphous magnetic element. Unlike the prior art, the NSME is temperature tolerant in that the critical parameters of permeability and saturability remain substantially unaffected during extreme thermal operation over time. Some materials such as air also exhibit little or no change in permeability or saturation levels over time, temperature, and conditions. The prior art uses high permeability saturable materials often greater than 2000 u permeability. These magnetics exhibit undesirable changes in permeability and saturation during operation at or near rated output making operation at high power levels and temperature difficult. See the permeability vs. temperature FIG. 11. This deficiency is overcome by the use of expensive oversized magnetic elements or output current sharing with multiple supplies. (See the graph $b_{sat}$ VS. temperature FIG. 12) This invention takes advantage of the desirable properties of NSME. See the permeability vs. temperature FIG. 17. Prior art saturating magnetic element commonly is operating at frequencies greater than 500 KHz to achieve greater power levels. As a result practitioners experience exponentially greater core losses (see FIG. 12A) at high frequencies. NSME support operation at lower frequencies 20–600 KHz further reducing switching losses and magnetic element losses allowing operation at even higher temperatures. See the loss density vs. flux density FIG. 16. Unlike the prior art, the instant invention uses voltage mode control with over-current shutdown. Material selection is also based upon mass and efficiency. By increasing the mass of the magnetic element, more energy is coupled more efficiently. Since there are reduced losses, the dissipation profile follows I2R/copper losses. The magnetic element is operated at duty cycles of 0%+ to 90%, which, when used to control the primary side push-pull voltage, results in efficiencies on the order of 90%. FIG. 18A is a schematic representation of the NSME PFT1A Sub-circuit transformer PFT1A consists of a primary winding 100 around a NSME 101 with a center-tapped winding 102.

| FIG. 18A Element | Table Value/part number |
|---|---|
| 100 | 55 turns 230 uh |
| 101 | 2 × 77932-A7 |
| 102 | 14 turns |

The primary winding 100 has nodes P1B and P1A for connections to external AC source. Secondary 102 winding has center-tapped node S1CT and node S1H and S1L connections to the upper and lower halves respectively. Winding 102 are typically connected to external full-wave rectifier assemblies. Magnetic element 101 comprises a non-saturating, low permeability magnetic material. The permeability is on the order of 26 u with a range of 1 u to 550 u, as compared to the prior art, which is on the order of 2500 u.

Flyback management is of concern when using such a magnetic element because the magnetic element generates high drain source voltages across the primary switch during the reverse recovery time of the flyback diode. Flyback current is available for longer periods after the primary switch opens. (See FIG. 5) For example, Kool Mu (Materials from Magnetics are suitable for this application. This material is not identified by way of limitation. The material comprises, by weight: 85% iron, 6% aluminum, and 9% silicon. Further, the magnetic element may be air; (air magnetic element permeablity=1); a molypermalloy powder (MPP) magnetic element; a high flux MPP magnetic element; a powder magnetic element; a gapped ferrite magnetic element; a tape wound magnetic element; a cut magnetic element; a laminated magnetic element; or an amorphous magnetic element. During operation the temperature of the NSME rises, the permeability slowly decreases, thereby increasing the saturation point. Some materials such as air exhibit no or very small changes in permeability or saturation levels. Unlike prior art using high permeability materials greater than 2000 u permeability rapidly increases at high temperatures. See the permeability vs. temperature FIG. 11. Prior art also suffers from reduced magnetic element saturation levels at high temperatures, making operation at high power levels and temperature difficult and may require the use of expensive oversized magnetic elements. See the graph $b_{sat}$ vs. temperature FIG. 12 this invention takes advantage of the desirable NSME properties. See the permeability vs. temperature FIG. 17. Operation at lower frequencies 20–600 KHz reduces switching losses and magnetic element losses allowing operation at higher temperatures. See the loss density vs. flux density FIG. 16. Unlike the prior art, the instant invention uses voltage mode control with over-current shutdown. Material selection is also based upon mass and efficiency. By increasing the mass of the magnetic element, more energy is coupled more efficiently. Since there are reduced losses, the dissipation profile follows I2R/copper losses. The magnetic element is operated at duty cycles of 0%+ to 90%, which, when used to control the primary side push-pull voltage, results in efficiencies on the order of 90%. FIG. 18B is a schematic representation of the NSME BL1 Sub-circuit BL1 consists of a winding 100 around a NSME 101.

| FIG. 18 Element | Table Value/part number |
|---|---|
| 107 | 40 turns 50 uh |
| 101 | 2 × 77932-A7 |

Magnetic element BL1 may also be constructed from one or more magnetic elements in series or parallel. Assuming minimal mutual coupling the total inductance is the arithmetic sum of the individual inductances. For elements in parallel the (assuming minimal mutual coupling) the total inductance is the reciprocal of the arithmetical sum of the reciprocal of the individual inductances. In this way multiple magnetic elements may be arranged to meet packaging, manufacturing, and power requirements. The primary winding 100 has nodes P2B and P2A for connections to external AC source. Magnetic element 101 comprises a non-saturating, low permeability magnetic material. The permeability is on the order of 26 u with a range of 1 u to 550 u, as compared to the prior art, which is on the order of 2500 to 5000 u. Flyback management is of concern when using such a magnetic element because the magnetic element generates high drain source voltages across the primary switch during the reverse recovery time of the flyback diode. Flyback current is available for longer periods after the primary switch opens. (See FIG. 5) For example, Kool Mu (Materials from Magnetics are suitable for this application. This material is not identified by way of limitation. The material comprises, by weight: 85% iron, 6% aluminum, and 9% silicon. Further, the magnetic element may be air (air magnetic element permeablity=1); a molypermalloy powder (MPP) magnetic element; a high flux MPP magnetic element; a powder magnetic element; a gapped ferrite magnetic element; a tape wound magnetic element; a cut magnetic element; a laminated magnetic element; or an amorphous magnetic element. During operation temperature of the magnetic element rises, the permeability slowly decreases, thereby increasing the saturation point. Some materials such as air exhibit no or very small changes in permeability or saturation levels. Unlike prior art using high permeability materials greater than 2000 u permeability rapidly increases at high temperatures. See the permeability vs. temperature FIG. 11. Prior art also suffers from reduced magnetic element saturation levels at high temperatures, making operation at high power levels and temperature difficult and may require the use of expensive oversized magnetic elements. (See the graph $b_{sat}$ vs. temperature FIG. 12) This invention takes advantage of the desirable NSME properties. (See the permeability vs. temperature FIG. 17.) Prior art often operates at high switching frequencies 100–1000 kHz to avoid the saturation problem. Only to increase switching and core losses. (See FIG. 12A) This inventions use of the desirable NSME properties allows operation at lower frequencies 20–600 KHz further reducing switching losses and magnetic element. See the loss density vs. flux density FIG. 16. Unlike the prior art, the instant invention uses voltage mode control with over-current shutdown. Material selection is also based upon mass and efficiency. By increasing the mass of the magnetic element, more energy is coupled more efficiently. Since there are reduced losses, the dissipation profile follows I2R/copper losses.

FIG. 18C is a schematic representation of a distributed NSME PFT1D. This is shown to exemplify distributed magnetics enable advantageous high voltage converter design variations that support form factor flexibility and multiple parallel secondary outputs from series coupled voltage divided primary windings across multiple NSME. This magnetic strategy is useful in addressing wire insulation, form factor and packaging limitations, circuit complexity and manufacturability. In this example a 500 W converter is required to fit in a low profile package. Sub-circuit PFTD1 consists of three magnetic elements 120, 121 and 124 with series connected primaries.

| FIG. 18C Element | Table Value/part number |
|---|---|
| 113 | 77352-A7 |
| 122 | 23 Turns |
| 123 | 23 Turns |
| 112 | 67 uh (55 turns) |
| 114 | 77352-A7 |
| 116 | 67 uh (55 turns) |
| 117 | 77352-A7 |
| 118 | 67 uh (55 turns) |

AC voltage is applied to 112 pin P1B then from P1C through conductor 115 to 116 pin P1D. Winding 116 pin P1E is connected through conductor 119 to 118 pins P1F then to pin P1A. Original Sub-circuit PFT1 (FIG. 18) consists of a primary winding 100 around a NSME 101 with two center-tapped windings 122 and 123. By way of example sub-circuit PFT1D will be implemented as three magnetic elements. For a 500-watt expression a total inductance of 203 uH is required in winding 100 (FIG. 18). Dividing the primary inductance by the number of elements, in this case three requires elements 112, 116 and 118 have 67 uH of inductance. The energy storage is equally distributed over the magnetic assembly 120, 121 and 124. The 500 watt converter in (FIG. 1) employs two (Kool Mu part number 77932-A7) 0.9 oz (25 gram) NSME to form 101 (FIG. 18). Sub-circuit PFT1 magnetic element 101 (FIG. 18) may be expressed as three 0.5–0.7 oz (14–19 gram) elements. Three 0.5-oz Kool Mu elements (part number 77352-A7) were selected. To realize 67 uH of primary inductance 55 turns are required for elements 112, 116 and 118. The primary circuit has nodes P1B and P1A for connections to external AC source. Secondary 102 winding has center-tapped node S1CT and node S1H and S1L connections to the upper and lower halves respectively. Secondary 123 winding has center-tapped node S2CT and node S2H and S2L connections to the upper and lower halves respectively. Both 122 and 123 are connected to external full-wave rectifier assemblies. Magnetic element magnetic element 120, 121 and 124 comprises a non-saturating, low permeability magnetic material. The permeability is on the order of 26 u with a range of 1 u to 550 u, as compared to the prior art, which is on the order of 2500 u. Flyback management is of concern when using such a magnetic element because the magnetic element generates high drain source voltages across the primary switch during the reverse recovery time of the flyback diode. Flyback current is available for longer periods after the primary switch opens. (See FIG. 5) For example, Kool Mu (Materials from Magnetics are suitable for this application. This material is not identified by way of limitation. The material comprises, by weight: 85% iron, 6% aluminum, and 9% silicon. Further, the magnetic element may be air (air magnetic element permeablity=1) a molypermalloy powder (MPP) magnetic element; a high flux MPP magnetic element; a powder magnetic element; a gapped ferrite magnetic element; a tape wound magnetic element; a cut magnetic element; a laminated magnetic element; or an amorphous magnetic element. During operation the temperature of the NSME, the permeability slowly decreases, thereby increasing the saturation point. Some materials such as air exhibit no or very small changes in permeability or saturation levels. Unlike prior art using high permeability materials greater than 2000 u permeability rapidly increases at high temperatures. See the permeability vs. temperature FIG. 11. Prior art also suffers from reduced magnetic element saturation levels at high temperatures, making operation at high power levels and temperature difficult and may require the use of expensive oversized magnetic elements. (See the graph $b_{sat}$ vs. temperature FIG. 12). This invention takes advantage of the desirable NSME properties. See the permeability vs. temperature FIG. 17. Prior art saturating magnetic element commonly is operating at frequencies greater than 500 KHz to achieve greater power levels. As a result practitioners experience exponentially greater core losses (see FIG. 12A) at high frequencies. NSME allows operation at lower frequencies 20–600 KHz further reduces switching losses and magnetic element losses allowing operation at even higher temperatures. (See the loss density vs. flux density FIG. 16) Unlike the prior art, the instant invention uses voltage mode control with over-current shutdown. Material selection is also based upon mass and efficiency. By increasing the mass of the magnetic element, more energy is coupled more efficiently. Since there are reduced losses, the dissipation profile follows I2R/copper losses. The magnetic element is operated at duty cycles of 0%+ to 90%, which, when used to control the primary side push-pull voltage, results in efficiencies on the order of 90%.

FIG. 19 is a schematic representation of the non-saturating push-pull magnetic element sub-circuit PPT1.

Sub-circuit PPT1 consists of a center-tapped primary winding 104 around a NSME 106 with one secondary center-tapped winding 105.

| FIG. 19 Element | Table Value/part number |
|---|---|
| 106 | 77259-A7 |
| 105 | 10 Turns |
| 104 | 70 Turns |

The primary winding 104 has nodes P2H and P2L for connections to external AC sources, and common center-tap node P2CT. Secondary 105 winding has center-tapped node SCT and nodes SH and SL connections to the upper and lower halves respectively. The invention is not limited to a single output. More secondary windings may be added for additional outputs. Secondary 105 is connected to an external full-wave rectifier assembly (Example FIG. 25 or 26). The magnetic element magnetic element 106 comprises a non-saturating, low permeability magnetic material. The permeability is on the order of 26 u with a range of 1 u to 550 u, as compared to the prior art, which is on the order of 2500 u. Flyback management is of concern when using such a magnetic element as high drain source voltages across the primary switch are generated during the reverse recovery of the flyback diode. The falling flyback current is available for a longer period. (See FIG. 5) For example, Kool Mu (magnetic elements from Magnetics are suitable for this application. This material is not identified by way of limitation. The material comprises, by weight; 85% iron, 6% aluminum, and 9% silicon. Further, the magnetic element may be air (comprise an air magnetic element); a molypermalloy powder (MPP) magnetic element; a high flux MPP magnetic element; a powder magnetic element; a gapped ferrite magnetic element; a tape wound magnetic element; a cut magnetic element; a laminated magnetic element; or an amorphous magnetic element. During operation the temperature of the NSME rises, the permeability slowly decreases, thereby increasing the saturation point. Unlike prior art using high permeability materials greater than 2000 u permeability rapidly increases at high temperatures. See the permeability vs. temperature FIG. 11. Prior art also suffers from reduced magnetic element saturation levels at high temperatures, making operation at high power levels and temperature difficult and may require the use of expensive oversized magnetic elements. (See the bsat vs. temperature FIG. 12) This invention takes advantage of the desirable NSME properties. (See the permeability vs. temperature FIG. 17) Operation at lower frequencies 20–600 KHz reduces switching losses and magnetic element losses allowing operation at higher temperatures. See the loss density vs. flux density FIG. 16. Unlike the prior art, the instant invention uses voltage mode control with overcurrent shutdown. Material selection is also based upon mass and efficiency. By increasing the mass of the magnetic element, more energy is coupled more efficiently. Since there are reduced losses, the dissipation profile follows I2R/copper losses. The magnetic element primary is driven in a push-pull fashion at a duty cycle of 48–49% resulting in efficient use of the magnetic element volume.

Figure 19A:
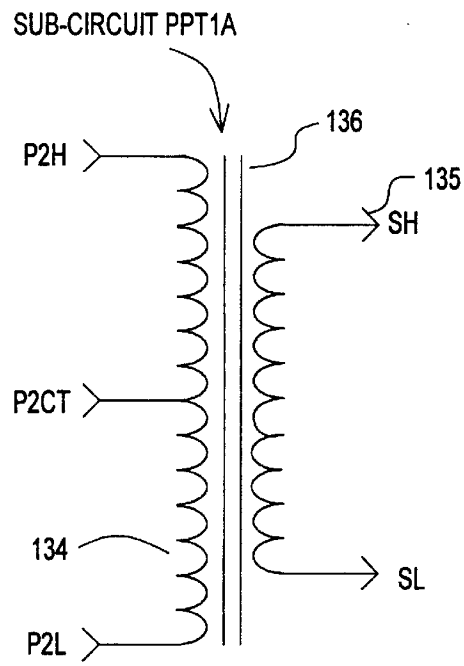
FIG. 19A is a schematic representation of the alternate push-pull NSME sub-circuit PPT1A.

FIG. 19A is a schematic representation of the non-saturating push-pull magnetic element sub-circuit PPT1. Sub-circuit PPT1 consists of a center-tapped primary winding 134 around a NSME 136 with one secondary center-tapped winding 135.

| FIG. 19A Element | Table Value/part number |
|---|---|
| 136 | 77259-A7 |
| 135 | 10 Turns |
| 134 | 70 Turns |

Figure 25B:
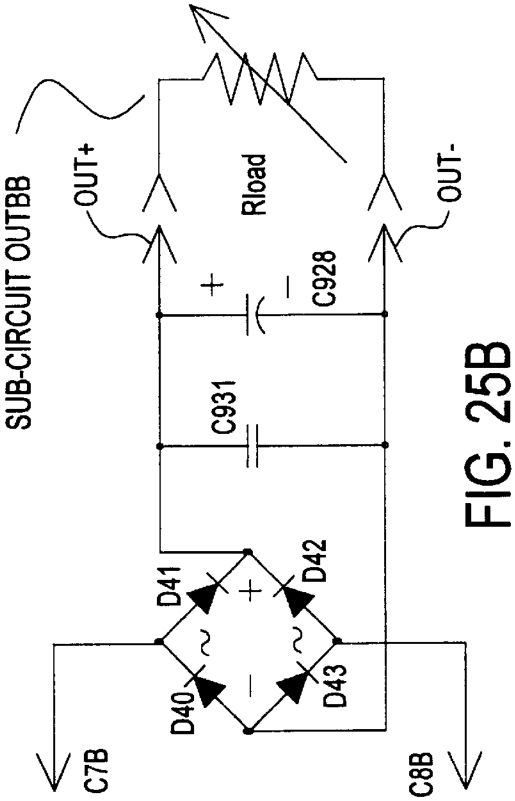
FIG. 25B is a schematic diagram of an alternate final output rectifier and filter sub-circuit OUTBB.

The primary winding 134 has nodes P2H and P2L for connections to external AC sources, and common center-tap node P2CT. Secondary 135 winding has center-tapped node SCT and nodes SH and SL connections to the upper and lower halves respectively. The invention is not limited to a single output winding. More secondary windings may be added for additional outputs. Secondary 135 is connected to an external full-wave rectifier assembly such as OUTA (FIG. 25), OUTB (FIG. 25A) and OUTBB (FIG. 25B). The magnetic element 136 comprises a non-saturating, low permeability magnetic material. The permeability is on the order of 26 u with a range of 1 u to 550 u, as compared to the prior art, which is on the order of 2500 u. Flyback management is of concern when using such a magnetic element as high drain source voltages across the primary switch are generated during the reverse recovery of the flyback diode. The falling flyback current is available for a longer period. (See FIG. 5) For example, Kool Mu (magnetic elements from Magnetics are suitable for this application. This material is not identified by way of limitation. The material comprises, by weight; 85% iron, 6% aluminum, and 9% silicon. Further, the magnetic element may be air (comprise an air magnetic element); a molypermalloy powder (MPP) magnetic element; a high flux MPP magnetic element; a powder magnetic element; a gapped ferrite magnetic element; a tape wound magnetic element; a cut magnetic element; a laminated magnetic element; or an amorphous magnetic element. During operation the temperature of the NSME rises, the permeability slowly decreases, thereby increasing the saturation point. Unlike prior art using high permeability materials greater than 2000 u permeability rapidly increases at high temperatures. See the permeability vs. temperature FIG. 11. Prior art also suffers from reduced magnetic element saturation levels at high temperatures, making operation at high power levels and temperature difficult and may require the use of expensive oversized magnetic elements. (See the bsat vs. temperature FIG. 12.) This invention takes advantage of the desirable NSME properties. (See the permeability vs. temperature FIG. 17) Operation at lower frequencies 20–600 KHz reduces switching losses and magnetic element losses allowing operation at higher temperatures. See the loss density vs. flux density FIG. 16. Unlike the prior art, the instant invention uses voltage mode control with overcurrent shutdown. Material selection is also based upon mass and efficiency. By increasing the mass of the magnetic element, more energy is coupled more efficiently. Since there are reduced losses, the dissipation profile follows I2R/copper losses. The magnetic element primary is driven in a push-pull fashion at a duty cycle of 48–49% resulting in efficient use of the magnetic element volume.

Figure 20:
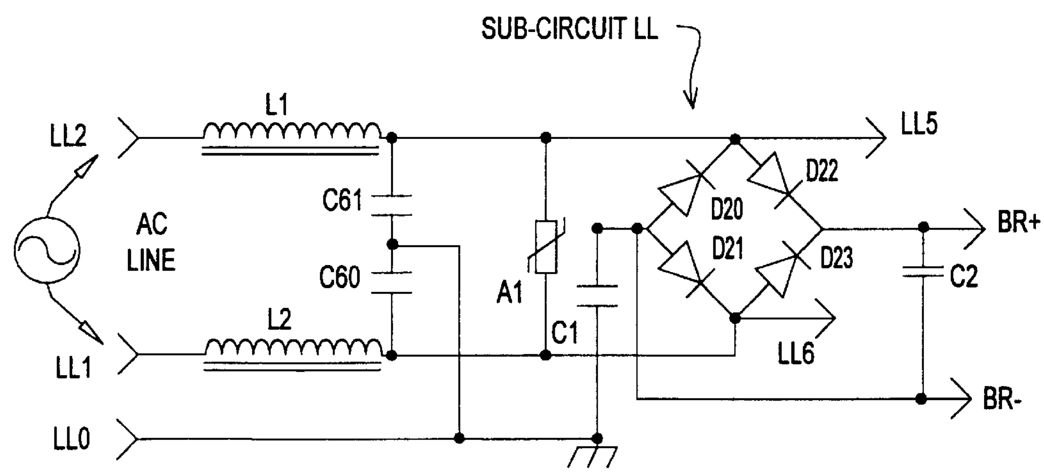
FIG. 20 is a schematic diagram of the NSME input transient protection and line filter sub-circuit LL.

FIG. 20 lightning input protection and filter sub-circuit LL.

FIG. 20 is a schematic showing the inventions filter and lightning input protection circuit for an AC line connected converter. The protection sub-circuit LL comprises a Spark gap A1, diodes D20 and D21, capacitor C1 and magnetic elements L1 and L2.

| FIG. 20 Element | Table Value/part number |
|---|---|
| L1 | 375 uH |
| L2 | 375 uH |
| C61 | 0.01 uF |
| C60 | 0.01 uF |
| A1 | 400 V Spark Gap |
| C1 | 0.1 uF |
| D20 | 1000 V/25 A |
| D21 | 1000 V/25 A |
| D22 | 1000 V/25 A |
| D23 | 1000 V/25 A |
| C2 | 1.8 uf |

The AC line is connected to node LL2. The common input frequencies of DC to 440 Hz may be extended beyond this range with component selection. Node LL2 is connected to NSME L1 then to node LL5, the spark gap A1, anode of diode D22 and the cathode of diode D20. Filter capacitor C60 is connected between node LL0 and LL6. Filter capacitor C61 is connected between node LL0 and LL5. The low side of AC line is connected to node LL1 then to magnetic element L2 the other side L2 is connected to spark gap A1, anode of diode D23 and the cathode of diode D21 and to node LL6. Capacitor C1 is connected to earth ground C1 attenuates noise generated by the converter. The use of non-saturating magnetic allows the input magnetic elements to absorb very large voltages and currents commonly generated by lightning, often without causing spark gap A1 to clamp. During UL testing sixty 16 ms 2000V pulses were applied between LL1 and LL2 without realizing spark gap A1 was missing with out damage. During normal operation the NSME L1 flux density is a few hundred gauss. The 75 u material from the graph of Flux Density v. Magnetizing Force (FIG. 15) will accept flux densities at least 50 times greater with out limitation. This is an example of the magnetic elements ability to perform well at flux densities many times greater than prior art. Elements L1 and L2 will block differential or common mode line transients. In the event of a very large or long duration line to neutral transient, spark gap A1 will clamp the voltage to a safe level of about 400V. The NSME L1 and L2 have the added benefit of reducing conducted noise generated by the converter.

Figure 21:
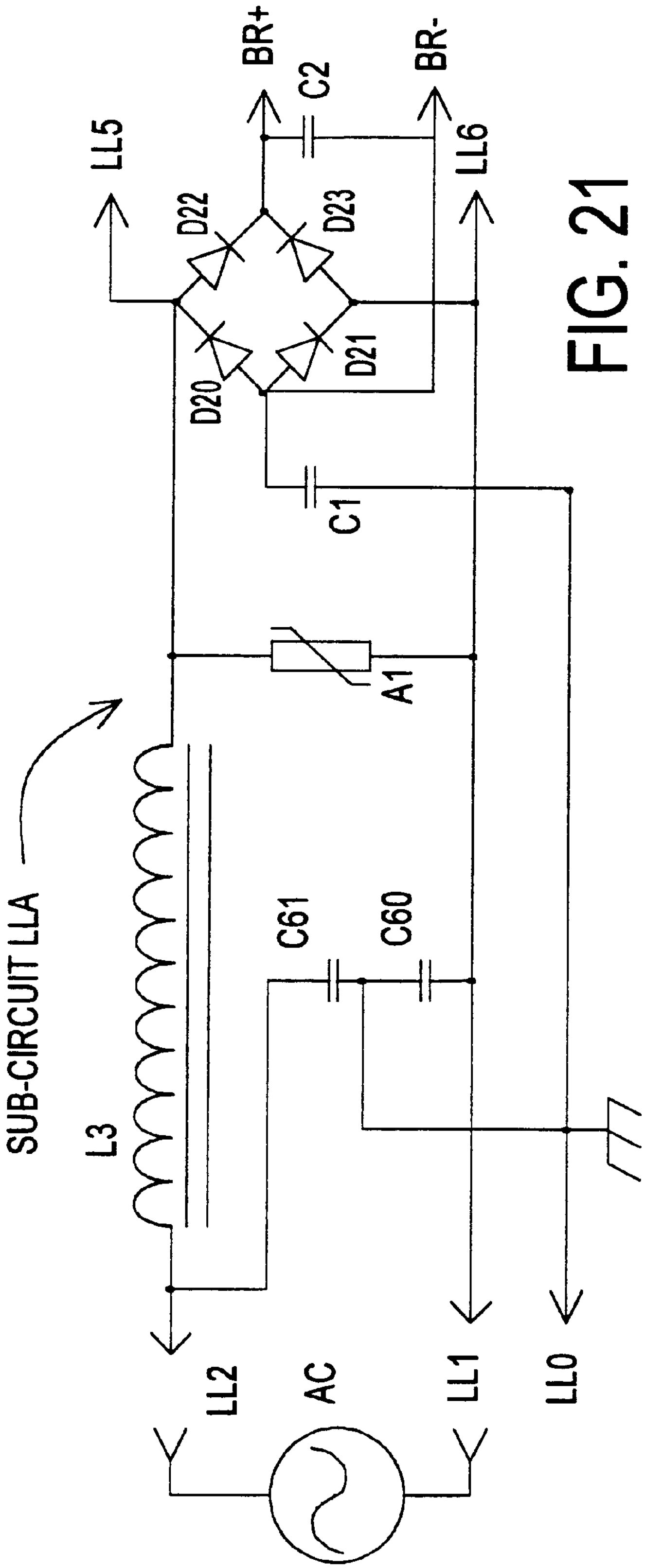
FIG. 21 is a schematic diagram of the alternate NSME input transient protection and line filter sub-circuit LLA.

FIG. 21 alternate lightning input protection sub-circuit LLA.

FIG. 21 is a schematic showing the inventions alternate lightning protection sub-circuit for an AC line connected converter. The protection circuit comprises a fuse F1, Spark gap A1, capacitors C1, C60 and C61 and NSME L3.

| FIG. 21 Element | Table Value/part number |
|---|---|
| L3 | 750 uH |
| C61 | 0.01 uF |
| C60 | 0.01 uF |
| F1 | 10 A |
| A1 | 400 V Spark Gap |
| C1 | 0.1 uF |
| D20 | 1000 V/25 A |
| D21 | 1000 V/25 A |
| D22 | 1000 V/25 A |
| D23 | 1000 V/25 A |
| C2 | 1.8 uf |

High side of AC line is connected to node LL2, fuse F1 the load side of the fuse is connected to NSME L3 and to capacitor C61. The load side L3 is connected to spark gap A1 and the cathode of diode D20 and anode of D22 forming node LL5. The low side of AC line is connected to node LL6, capacitor C60, spark gap A1, and the cathode of diode D21 and anode of D23. The anodes of diodes D20 and D21 are connected to Capacitor C1. Capacitor C1 is connected to earth ground. C1 attenuates radiated noise or EMI generated by the converter. The cathode of diodes D22 and D23 are connected to Capacitor C2. Capacitor C2 decouples high frequency harmonic currents from the line. Capacitors C1, C61 and C60 are connected to earth ground node LL0. The use of non-saturating magnetics allows the input magnetic element to absorb very large voltages and currents commonly generated on the AC line by lightning. A transient on the AC line will be limited by capacitors C60 and C61 and blocked by the non-saturating magnetic L3. In the event of a very large or long duration line to neutral transient, magnetic element L3 will allow the voltage to rise across spark gap A1, the spark gap will clamp the voltage to a safe level protecting the rectifier diodes D20–D23. The NSME L3 has the added benefit of reducing conducted noise generated by the converter. C1 connected to the ground plane is effective in attenuating conducted and radiated EMI.

FIG. 22 AC line rectifier sub-circuit BR.

FIG. 22 is a schematic showing the inventions AC line rectifier. The rectifier sub-circuit BR1 comprises diodes D20, D21, D22 and D23 and capacitor C2.

| FIG. 22 Element | Table Value/part number |
|---|---|
| D20 | 1000 V/25 A |
| D21 | 1000 V/25 A |
| D22 | 1000 V/25 A |
| D23 | 1000 V/25 A |
| C2 | 1.8 uf |

An AC or DC signal from the input filter is connected to bridge rectifier to nodes BR1 and BR2. Node BR1 connects diode D22 anode to D20 cathode. Node BR2 connects diode D23 anode to D21 cathode. Node BR+ connects diode D22 cathode to D23 cathode. Node BR− connects diode D20 anode to D21 anode. The common input frequencies of DC to 440 Hz may be extended beyond this range with component selection. Capacitor C2 is selected to improve power factor for a particular operating frequency and to de couple switching currents from the line. Diodes are selected to reliably block the expected line voltage and current demands of the next converter stage.

Figure 23:
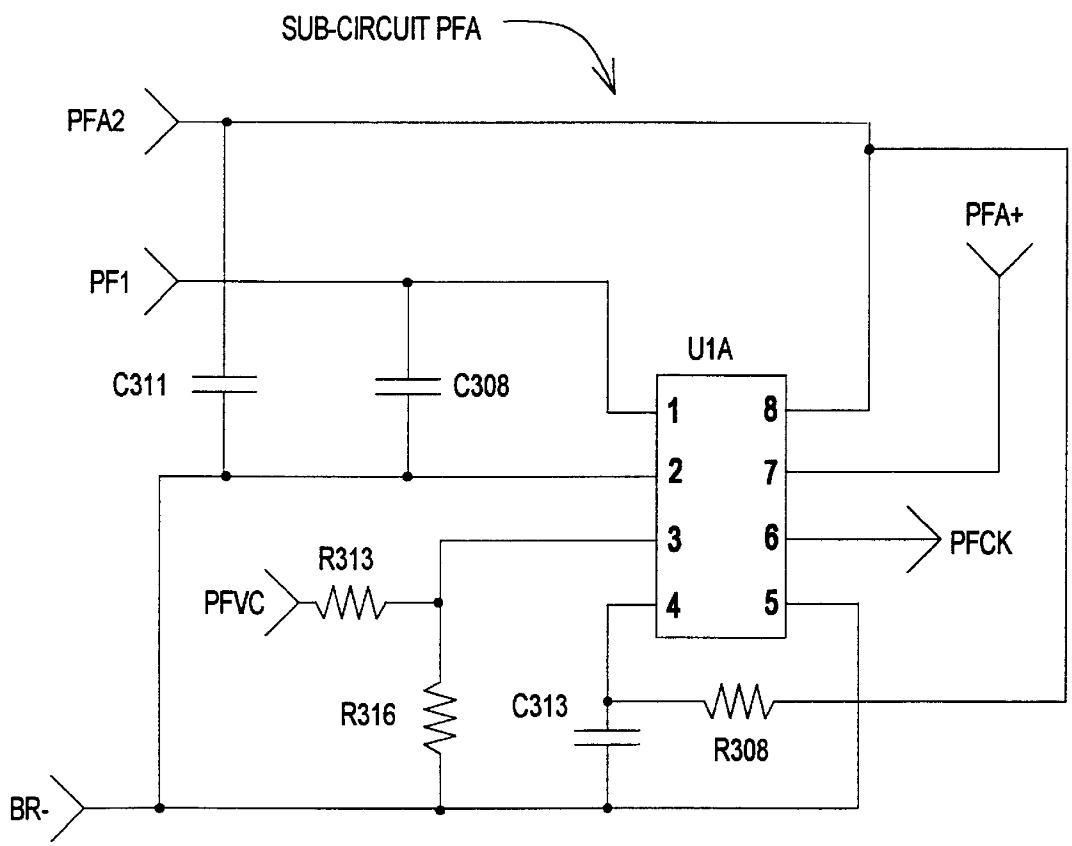
FIG. 23 is a schematic diagram of the power factor controller sub-circuit PFA.

FIG. 23 controller sub-circuit PFA

FIG. 23 is the inventions AC to DC controller sub-circuit. Sub-circuit PFA consists of resistors R313 and R316, capacitors C308, and C313 and PWM controller IC U1A.

| FIG. 23 Element | Table Value/part number |
|---|---|
| C311 | 0.1 uf |
| C308 | .01 uf |
| R313 | 15k ohms |
| R316 | 15k ohms |
| C313 | 4700 pf |
| R308 | 25k ohms |
| U1A | MIC38C43 (Micrel) |

Control element U1A connects to a circuit with the following series connections: from pin 1 to feedback node/pin PF1 then to capacitor C308 then to the pin 2 node of U1A. Internal 5.1-volt reference U1A pin 8 or node PFA2 through resistor R308 to the pin 4 node. U1A pin 4 is connected through capacitor C313 to return node BR−. This arrangement allows the PFC output to be pulse width modulated with application of voltage to PF1. External feedback current applied to U1A pin 1 and node PF1. Node PFVC is connected to resistor R313 to pin 3 of U1A. Resistor R316 is connected to pin 3 then to return node BR−. Power pin 7 is connected to node PFA+. Control element switch drive U1A pin 6 is connected to node PFCLK. Return ground node of U1A pin 5 is connected to return node BR−. In the event of a component failure in the primary feed networks such as IPFFB (FIG. 40), FBA (FIG. 40A), IFB (FIG. 40B) and FB1 (FIG. 41). The output voltage of the boost stage may rapidly increase to destructive levels. Fast over voltage feedback networks IOVFB (FIG. 40C) or OVP2 (FIG. 42B) increases the current into PF1 thereby limiting the output voltage to a safe level. In addition latching type over voltage protection networks such as OVP (FIG. 42), OVP1 (FIG. 42A) and OVP2 (FIG. 42B) maybe used. The latching type kills power to the control circuit thereby stopping the boost action. The latching type networks require power to be cycled to the converter to reset the latch. IFB Input node PFVC is connected to resistor R313 to internal zero crossing detector connected to pin 3 and through R316 to return node BR−. PFVC is connected to a magnetic element winding referenced to BR−. A new conduction cycle is started each time the bias in the magnetic element goes to zero. Power factor corrected is realized by chopping the input at a high frequency. The average pulse width decreases at higher line voltage and increases at lower voltage for a given load. Frequency is lower at line peaks and higher around zero crossings. In this way the converter operates with a high input power factor.

Figure 24:
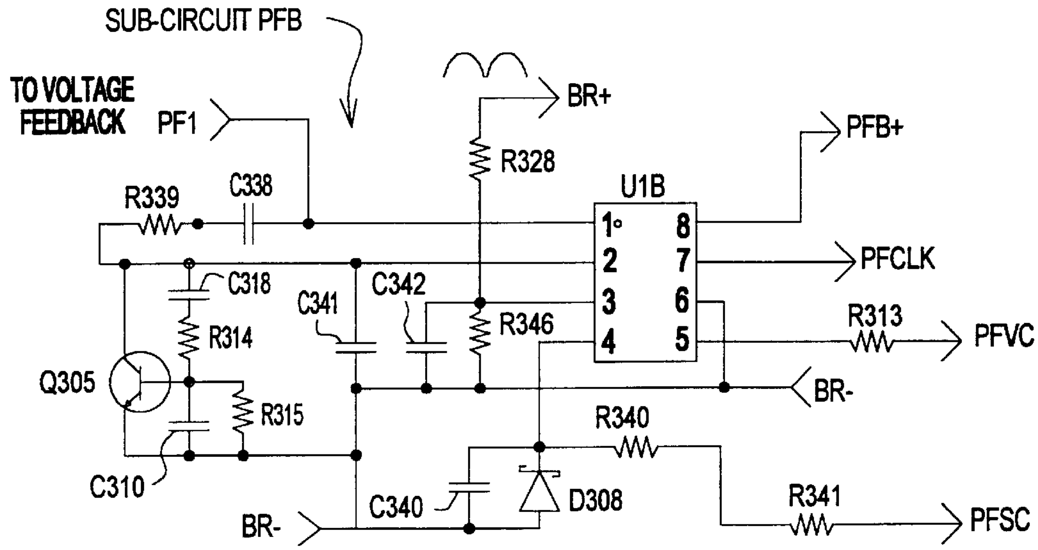
FIG. 24 is a schematic diagram of the alternate power factor correcting boost control element sub-circuit PFB.

FIG. 24 Controller with power factor corrected sub-circuit PFB FIG. 24 is the alternate power factor controller sub-circuit. Sub-circuit PFB consists of resistors R313, R339, R314, R315, R328, R340, R341 and R346, diode D308, capacitors C310, C318, C338, C340, C341 and C342, transistor Q305, and control element IC U1B.

| FIG. 24 Element | Table Value/part number |
|---|---|
| Q305 | BCX70KCT |
| R339 | 432k ohms |
| C338 | 0.22 uf |
| C318 | 0.22 uf |
| R314 | 2.2MEG ohms |
| R315 | 715k ohms |
| C341 | 0.33 uf |
| C342 | 0.01 uf |
| C340 | 0.001 uf |
| R328 | 1MEG ohms |
| R346 | 7.15k ohms |
| D308 | 10BQ040 |
| R340 | 449k ohms |
| R313 | 22k ohms |
| U1B | MC34262 (Motorola) |
| R341 | 499k ohms |

Control element U1B connects to a circuit with the following series connections: from pin 1 to node/pin PF1 to capacitor C338 in series with resistor R339, and then to the pin 2 node of U1B. Pin 1 is the input to an internal error amplifier and connection to external feedback networks. (See FIGS. 40, 40A, 40B, 40C and 41) Increasing the voltage on pin 1 decreases the pulse width of the PFCLK node pin 7. Resistor R328 is connected to the fullwave rectified AC line haversine voltage on node BR+ then to U1B pin 3 and then to resistor R346 in parallel with capacitor C342 to return node BR−. Node PFSC connects to series resistors [R341+R340] which are connected to U1B pin 4 then to diode D308 in parallel with capacitor C340 to return node BR−. Power to PFC controller is applied to node PFB+ and to U1B pin 8. Output clock node PFCLK is connected to U1B pin 7, to external buffer sub-circuit AMP (FIG. 29). Transistor Q305 collector is connected to the pin 2 node of U1B. The base is connected in series through resistor R314 to capacitor C318, then to the pin 2 node of U1B. The base is also connected to [C310||R315], then to return node BR−. Emitter of Q305 is connected to return node BR−. Transistor Q305 provides a soft start compensation ramp to the controller error amp reducing the stress and DC overshoot in the converter at power up. Capacitor C341 is connected from U1 pin 2 to return node BR−. U1B pin 1 is connected to pin PF1, capacitor C338 in series with resistor R339 to transistor Q305 collector and to U1 pin 2. Current switched by PFC power switch Q1 (FIG. 4 & 3) is sensed by R26 (see. FIG. 4). Series resistors [R340+R341] to U1B pin 4 connect voltage developed across R26. This voltage is compared to an internal 1.5-volt reference, comparator output turns off the switch drive pin 7 of U1B during times of high current that occur during startup or during very high load or low line conditions. Capacitor C340 is connected between U1 pin 4 to return node BR−filter high frequency components. Schottky diode D308 connected between U1 pin 4 to return node BR− protects the controller (U1 pin 4) substrate from negative current injection. Maximum switch current value is set by R26 over currents are automatically limited in each cycle by the PFC controller. The rectified fullwave haversine at pin 3 of U1B is multiplied by the error voltage on pin 2. The product is compared to the magnetic element/switch current measured by R26 on pin 4. Gate drive on pin 7 turns off when the sensed magnetic element current increases to the current comparator level. This action has the effect of modulating the switch Q1 "on" time tracking the AC line voltage. External feedback networks are connected to node PF1. In the event of a component failure in the primary feed network such as IPFFB (FIG. 40), FBA (FIG. 40A), IFB (FIG. 40B) and FB1 (FIG. 41). The output voltage of the boost stage may rapidly increase to destructive levels. Fast over voltage feedback networks IOVFB (FIG. 40C) or OVP2 (FIG. 42B) increases the current into PF1 thereby limiting the output voltage to a safe level. In addition latching type over voltage protection networks such as OVP (FIG. 42), OVP1 (FIG. 42A) and OVP2 (FIG. 42B) maybe used. The latching type removes power to the control circuit thereby stopping the boost action. The latching type networks require power to be cycled to the converter to reset the latch. Modulating the voltage at PF1 changes the duty cycle of the PFC and the final output voltage. In this way the PFC may be used as a pre-regulator to additional output stages.

FIG. 25 Output rectifier and filter sub-circuit OUTA.

FIG. 25 is a schematic of a full wave rectified output stage and filter sub-circuit OUTA. The rectifier stage consists of diodes D80 and D90. The filter consists of resistor R21, magnetic element L30 and capacitors C26, C27, C28, C29, C30, C31 and C32.

| FIG. 25 Element | Table Value/part number |
|---|---|
| D80 | 40CTQ150 |
| D90 | 40CTQ150 |
| R21 | 100 ohms |
| C26 | 500 pf |
| C27 | 200 pf |
| C28 | 0.1 uf |
| C29 | 10,000 uf |
| C30 | 10,000 uf |
| C31 | 0.1 uf |
| C32 | 200 pf |
| L30 | 10 uh |

Input node/pin C7B is connected to the high side of external center-tapped magnetic element secondary winding. Node C7B connects to anode of diode D8 and to capacitors C26 and C27 in the following arrangement. Capacitor C27 is connected across diode D80, capacitor C26 is connected in series to R21. Input node/pin C8B is connected to the low side of external center-tapped magnetic element secondary winding. Pin C8B is connected to anode of diode D9 and to resistor R21, capacitor C32 is connected across diode D90. Capacitors C27 and C32 is a small value to reduce high frequency noise generated by rapid switching the high speed rectifier D80 and D90 respectively. Capacitor C26 and resistor R21 are used to further dissipate high frequency energy. Anode of diodes D80 and D90 is connected to parallel capacitors C28||C29 and NSME L30. Capacitors C28 and C31 are solid dielectric types selected for low impedance to high frequency signals. Capacitors C29 and C30 are larger polarized types selected for low impedance at low frequencies and for energy storage. Magnetic element L3 is connected to diode D8 cathode the second terminal of L30 is connected to parallel capacitors C31 and C30 and pin OUT+. Node OUT+ is the output positive and is connected to external feedback sense line to isolated feedback network. The other side of parallel capacitors [C28||C29||C30||C31] is connected to pin OUT− and the center-tap of the magnetic element secondary forming the return node. The combination of capacitors [C28||C29], L30 and capacitors [C30||C31] form a low pass pi type filter. Sub-circuit OUTA performs efficient fullwave rectification and filtering.

Figure 25A:
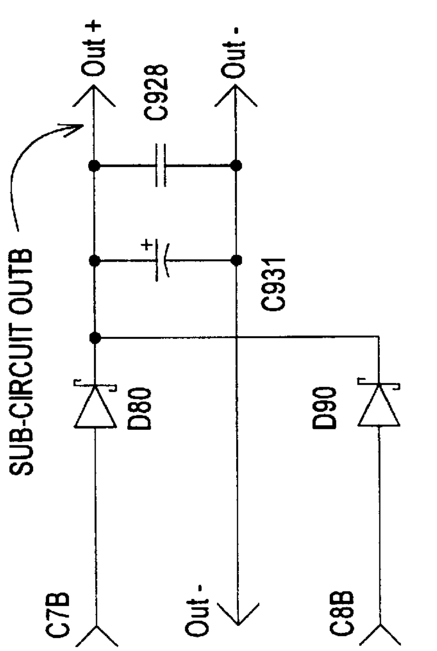
FIG. 25A is a schematic diagram of an alternate rectifier sub-circuit OUTB.

FIG. 25A Output rectifier sub-circuit OUTB.

FIG. 25A is a schematic of a full wave rectified output stage. The rectifier stage consists of diodes D80 and D90 and capacitors C931 and C928.

| FIG. 25A Element | Table Value/part number |
|---|---|
| D80 | 40CTQ150 |
| D90 | 40CTQ150 |
| C928 | .01 uf |
| C931 | 10,000 uf |

Input node/pin C7B is connected to high side of external center-tapped magnetic element secondary winding. Node C7B connects to anode of diode D80. Input node/pin C8B is connected to low side of external center-tapped magnetic element secondary winding is connected to anode of diode D90. Node OUT− is the negative output and return line to the external isolated feedback network and load not shown. Cathodes of diodes D80 and D90 are connected to parallel capacitors C931 and C928. Capacitor C928 is a solid dielectric type selected for low impedance to high frequency signals. Capacitor C931 is a larger polarized selected for low impedance to low frequency signals and for energy storage. Node OUT+ is the output positive and is connected to external feedback sense line to isolated feedback network. The other side of parallel capacitors C928||C931 is connected to the center-tap of the magnetic element secondary forming the node OUT−. The use of the NSME for the push-pull magnetic element requires only minimal filtering after the rectifiers.

FIG. 25B AC rectifier and filter sub-circuit OUTB.

FIG. 25B is a schematic diagram of an alternate final output rectifier and filter sub-circuit OUTB. The rectifier sub-circuit OUTB comprises diodes D40, D41, D42 and D43 and capacitor C931 and C928.

| FIG. 25B Element | Table Value/part number |
|---|---|
| D40 | 40CTQ150 |
| D41 | 40CTQ150 |
| D42 | 40CTQ150 |
| D43 | 40CTQ150 |
| C928 | .01 uf |
| C931 | 10,000 uf |

An AC or DC signal is connected to nodes C7B and C8*b*. Node C7B connects diode D41 anode to D40 cathode. Node C8*b* connects diode D42 anode to D43 cathode. Node OUT+ connects diode D42 cathode to D43 cathode. Node OUT− connects diode D40 anode to D43 anode. Diodes are selected to reliably block the expected line voltage and current demands of the load. For low voltage outputs, Schottky type diodes are used due to their low forward voltage drop. Higher voltages would use high-speed silicon diodes due to their ability to withstand high peak inverse voltage (PIV). The use of the NSME for the push-pull magnetic element requires only minimal filtering after the rectifiers. Capacitor C928 is shown schematically as a single device. Capacitor C931 is a larger polarized selected for low impedance to low frequency signals and for energy storage a typical value may be 200 uF. To increase the capacitance or reduces the output impedance multiple capacitors may be used. C931 is a solid dielectric type and is selected for it's low impedance to high frequencies. As is selected to reduces noise for a particular operating frequency and power level. Capacitor C928 is selected for the operating frequency and power level. Sub-circuit OUTB performs AC to DC rectification and filtering at slightly lower efficiency due to the extra junctions.

Figure 26:
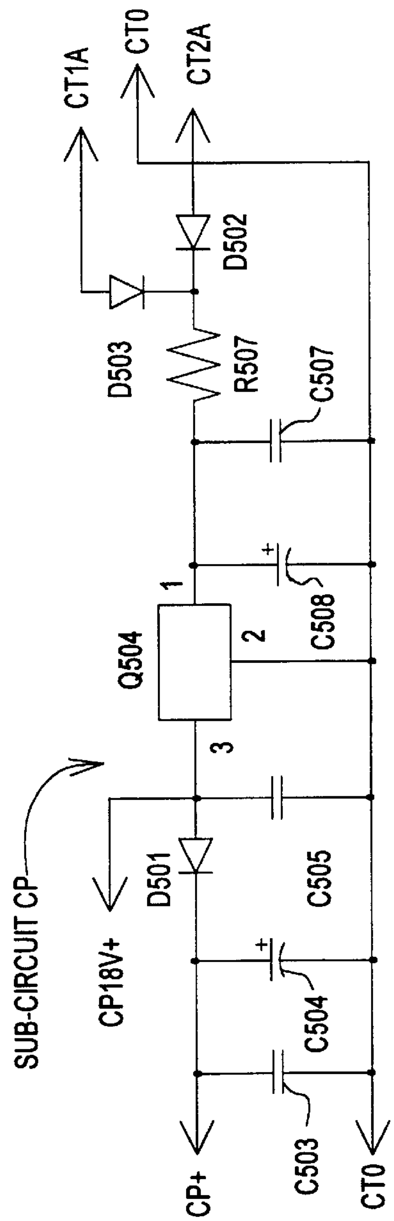
FIG. 26 is a schematic diagram of the floating 18 Volt DC control power sub-circuit CP.

FIG. 26 Floating 18_Volt DC control power sub-circuit CP Sub-circuit CP consists of diodes D501, D502 and D503, resistor R507, regulator Q504, and capacitors C503, C504, C505, C506, and C507.

| FIG. 26 Element | Table Value/part number |
|---|---|
| C503 | .33 uF |
| C504 | 100 uF |
| D501 | MURS120T3 |
| C505 | .33 uf |
| Q504 | LM7818A |
| C508 | 100 uf |
| C507 | 100 uf |
| D503 | MURS130T3 |
| D502 | MURS120T3 |

Figure 27:
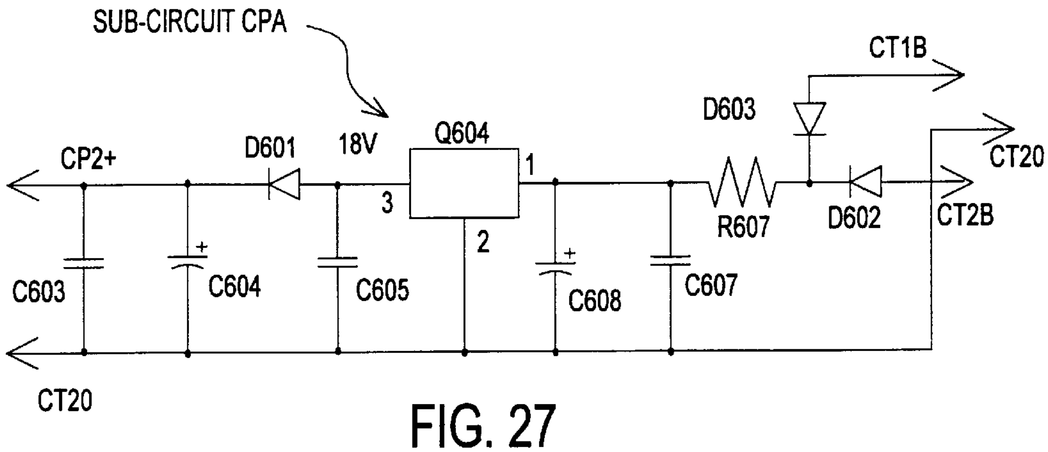
FIG. 27 is a schematic diagram of the alternate floating 18_Volt DC push-pull control power sub-circuit CPA.

Node CT1A connects to anode of D503 and to the upper external center tapped secondary winding. Node CT2A connects to anode of D502 and to the lower external center tapped secondary winding. Node CT0 connects to the external winding center tap. Node CT0 is also the return line and it connects to Q504 pin 2, and capacitors C503, C504, C505, C506, and C507. The cathode of each of diodes D502 and D503 is connected to resistor R507. R507 is then connected to the pin 1 (input) node of voltage regulator Q504. Voltage regulator Q504 Pin 3 is the 18 vdc regulated DC output is connected to the anode of blocking diode D501. Three-pin voltage regulator Q504 is of the type LM7818 a common device made by a number of manufacturers. Capacitors C503, C505, C506 are 0.1 uF solid dielectric type and are used to filter high frequency ripple and to prevent Q504 from oscillating. The junction of C503, C504 and D501 cathode is the output node CP1+. Isolated 18-volt DC is available between nodes CT0 and CP+. Used for regulator circuits and output switch drive during normal operation. FIG. 27 second Floating 18_Volt DC push-pull control power sub-circuit CPA. Sub-circuit CPA consists of diodes D601, D602 and D603, resistor R607, regulator B604 and capacitors C603, C604, C605, C606, C607 and C608.

| FIG. 27 Element | Table Value/part number |
|---|---|
| C603 | .33 uF |
| C604 | 100 uF |
| D601 | MURS12OT3 |
| C605 | .33 uF |
| Q604 | LM7818A |
| C608 | 100 uF |
| C607 | .22 uF |
| R607 | 7.5 ohms |
| D603 | MURS12OT3 |
| D602 | MURS12OT3 |

Note CT1B connects to anode of D603 and to the upper external center tapped secondary winding. Node CT2B connects to anode of D602 and to the lower external center tapped secondary winding. Node CT20 connects to the external winding center tap. Node CT0 is also the return line and it connects to Q604 pin 2, and capacitors C603, C604, C605, C606, and C607. The cathode of each of diodes D602 and D603 is connected to resistor R607. R607 is then connected to the pin 1 (input) node of voltage regulator Q604. Voltage regulator Q604 Pin 3 is the 18 vdc regulated DC output and is connected to the anode of blocking diode D601. Capacitors C603, C605, C606 are solid dielectric type and are used to filter high frequency ripple and to prevent Q604 from oscillating. The junction of C603, C604 and D601 cathode is the output node CP1+. Isolated 18-volt DC is available between nodes CT20 and CP2+. To be used for regulator circuits and output switch drive during normal operation.

Figure 28:
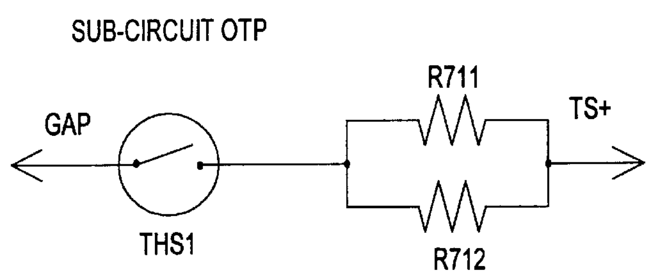
FIG. 28 is a schematic diagram of the over temperature protection sub-circuit OTP.

FIG. 28 over temperature protection sub-circuit OTP.

FIG. 28 is the main switch over temperature protection sub-circuit OTP. The sub-circuit OTP comprises thermal switch and resistors R711 and R712.

| FIG. 28 Element | Table Value/part number |
|---|---|
| THS1 | 67F105 (105C) |
| R711 | 20 ohms |
| R712 | 20 ohms |

Gate drive power is applied to input node GAP and to thermal switch THS1. Maximum FET gate voltage requires the input power voltage be less than 20 volts, the voltage selected was 18 volts. The other side of THS1 is connected to parallel resistors [R711||R712]. A single resistor may represent the resistors. The figure depicts the surface mount arrangement. The other side of [R711||R712] connects to output node TS+. Normally closed thermal switch TS1 is in contact with main switch transistor Q1. In the event of temperature greater than 105C THS1 opens, thus removing power to the buffer sub-circuit AMP1 (FIG. 29) causing switch Q1 to default to a blocking state protecting the boost switch should the optional cooling fan fail or the circuit reach high temperatures. In this instant invention the speed up buffer AMP (FIG. 29) non-saturating magnetics (FIGS. 18, 18A and 19) allows the main switch and to run cooler than prior art for a given power level. When switch temperature returns to normal range THS1 will close, allowing the PFC to resume normal operation. Under normal load and ambient temperatures the thermal switch THS1 should never open.

FIG. 29 PFC Buffer Circuit sub-circuit AMP, AMP1, AMP2, AMP3.

Switch drive command from PFCLK (FIG. 23 and 24) or PWFM (FIG. 33) control elements are connected to a gate buffer circuit. The sub-circuit AMP is comprised of power FET Q702, Darlington pair Q703, capacitors C709 and C715, and resistors R710 and R725.

| FIG. 29 Element | Table Value/part number |
|---|---|
| C715 | 1000 pf |
| C709 | 33 uF |
| Q702 | NOS355NCT |
| Q703 | FZT705CT |
| R710 | 0 ohms |
| R725 | 22.1 k ohms |

DC Power is applied to node GAT+ to transistor Q702 drain and to capacitor C709, which goes to ground. Maximum gate voltage requires the input power voltage must be less than 20 volts, 18-volts was selected. Input node GA1 is connected to the gate of FET Q702 is connected to the base of BJT1 of the Darlington pair Q703 and to capacitor C715. C715 is connected across the Darlington pair from the base, pin 1, to the collectors, pins 2 and 4, Q703 collector node is also connected to ground. The emitter of BJT2 is connected to the gate of FET Q1. The source of FET Q702 is connected through small optional series resistor R710 to the gate of the output switch or node GA2. Some power FET's under certain load may tend to oscillate when driven from a low impedance source such as this buffer. A small resistance of approximately 2 ohms or less may be required with out significant slowing of the switch. In most cases R710 is replaced with a zero ohm jumper. Resistor R725 is connected from node GA0 and source of Q702. The input switching signal to node GAP is in range of 20 kHz to 600 kHz. Very fast "on" times are realized by proving a low impedance to rapidly charge the output switch gate connected to node GA2. Capacitor C709 provides additional current when Q702 switches on. Transistor Q703 provides low impedance to rapidly remove the charge from the gate greatly reducing the "off" time. This particular topology provides output switch rise times on the order of 10 ns, as compared to the industry standard rise time of 250 ns. The corresponding fall time is <10 nS, again as compared to an industry fall time of 200–300 ns (See FIG. 13 and 14). In the event the converter is operated at very high ambient temperatures a thermal switch may be placed in series with input power pin GA+. This allows the switch transistor to be gracefully disabled. Sub-circuit AMP greatly reduces switching losses allowing converter operation in some cases with out the common prior art forced air-cooling.

FIG. 30 snubber sub-circuit SN.

FIG. 30 is a schematic diagram of a snubber sub-circuit of the invention. The snubber sub-circuit SN is comprised of diodes D804 and D805 and resistors R800, R817, R818, and capacitors C814 and C819.

| FIG. 30 Element | Table Value/part number |
|---|---|
| R800 | 12 ohms |
| R817 | 1 mohm |
| R818 | 1 mohm |
| C814 | 33 pF |
| C819 | 560 pF |
| D805 | MUR160 |

Node SNL2 connects to the drain terminal of the external output switch and to flyback side of the inductive load. Input node SNL2 connects to R800 in series with capacitor C819 to node SNOUT. Diode D805 anode is connected to node SNL2 with resistors [R817||R818] in parallel with D805. Resistors R817 and R818 may be combined to a single resistor. The cathode of D805 is connected to capacitor C814 that connects to node/pin SNL1. Node SNL1 connects to the supply side of external load magnetic element. The other leg of external magnetic element is connected to the anode of D805 and the anode side of external flyback diode D4. The one MEG ohm resistors R817 and R818 bleed the charge from C814 resetting it for the next cycle. Capacitor C819 and resistor R800 captures the high frequency event from the transition of external flyback diode D4 and moves part of the energy into the external holdup capacitor connected to node SNOUT. Since external flyback diode D4 and D805 isolate the drain of the output switch, faster switching occurs because the output switch does not have to slew the extra capacitance of a typical drain/source connected snubber circuit. Note that this circuit does not attempt to absorb the flyback in large RC networks that convert useful energy to losses. Nor does it attempt to stuff the flyback to ground, adding capacitance and slowing the output switch and increasing switching losses. This sub-circuit is used with it's mirror SNB (FIG. 32) across the external push-pull switches. This design returns the some of the flyback energy back to the input supply or output load. The "snubbering" action slows the rise of the flyback giving time for the external flyback diode to start conduction. The circuit efficiently manages high frequency flyback pulses.

Figure 30A:
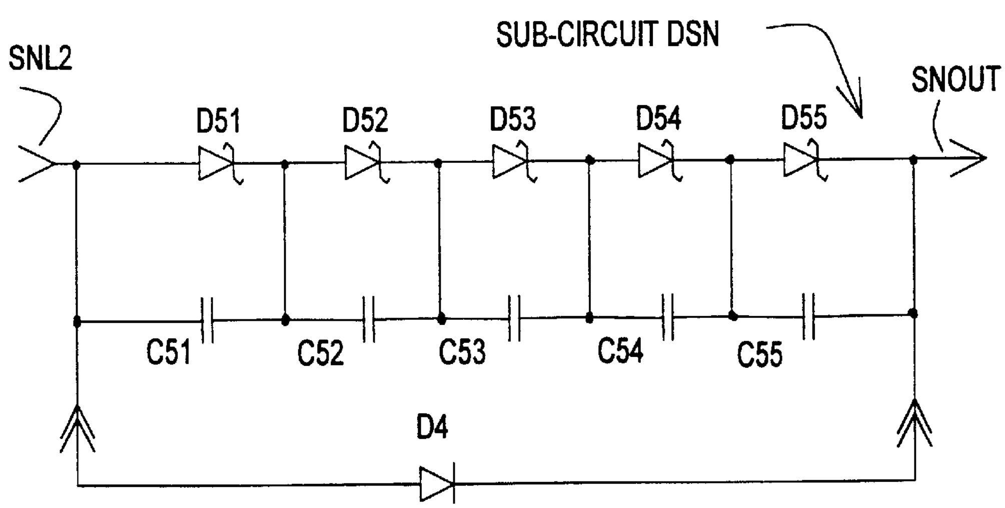
FIG. 30A is a schematic diagram of the main switch rectifying diode snubber sub-circuit DSN.

FIG. 30A diode snubber sub-circuit DSN.

FIG. 30A is a schematic diagram of a diode snubber sub-circuit of the invention. The snubber sub-circuit DSN is comprised of diodes D51, D52, D53, D54 and D55 and capacitors C51, C52, C53, C54 and C55.

| FIG. 30A Element | Table Value/part number |
|---|---|
| C51 | 220 pf 100 v |
| C52 | 220 pf 100 v |
| C53 | 220 pf 100 v |
| C54 | 220 pf 100 v |
| C55 | 220 pf 100 v |
| D51 | Schottky 1-2ns 100 v SMBSR1010MSCT |
| D52 | Schottky 1-2ns 100 v SMBSR1010MSCT |
| D53 | Schottky 1-2ns 100 v SMBSR1010MSCT |
| D54 | Schottky 1-2ns 100 v SMBSR1010MSCT |
| D55 | Schottky 1-2ns 100 v SMBSR1010MSCT |

Pin SNL2 is connected to the anode of D51 the cathode of D51 is connected to the anode of D52 the cathode of D52 is connected to the anode of D53 the cathode of D53 is connected to the anode of D54 the cathode of D54 is connected to the anode of D55 the cathode of D55 is connected to pin SNOUT. Capacitors are connected across each diode forming a series parallel combination of [D51||C51]+[D52||C52]+[D53||C53]+[D54||C54]+[D55||C55]. Node SNL2 connects to the drain terminal of the external output switch and to flyback side of the inductive load. The external fly-back rectifier diode D4 (FIGS. 1, 3 and 4) anode is connected to node SNL2. Node SNOUT connects to the storage capacitors [C16||C17] (FIGS. 1, 3 and 4) and to the cathode of the flyback diode D4. External diode D4 in parallel with DSN forms a hybrid diode. The Schottky diode has the desirable characteristics of fast recovery time (less than 6 nanoseconds (6*10^–9)) and low forward voltage drop (0.4–0.9 Volts) at high currents. The Schottky diode suffers from limited reverse blocking voltage currently 100 V maximum. Each diode will block 100V; the parallel capacitors distribute the reverse voltage equally across the diode string. As the reverse junction capacitance of each diode is less than 10 pf much smaller than the parallel capacitor. Thus the reverse voltage is nearly equally divided across the diodes. To guarantee even voltage division 5% or better capacitor matching is required. High precision is common and inexpensive for small capacitors. Different blocking voltages may be achieved by adjusting the number of diode/capacitor pairs. By way of example not as a limitation 500V was selected. The main fly-back rectifier diode D4 will block high voltages but suffers from long reverse recovery time 50–500 nanoseconds is common in fast recovery diodes. What is needed is a diode with low voltage drop, high blocking voltage and very short recovery time. The snubber DSN in parallel with the main fly-back rectifier comes very close to that ideal diode. The total blocking voltage is achieved by the adding the individual diode blocking voltages. The recovery time is determined by the slowest diode in the string often less than 5 nanoseconds. The low forward voltage drop is achieved when the slower main rectifier begins conduction. Low capacitance is also realized, as the capacitance is ⅕ of the individual capacitors. This hybrid diode begins rectification immediately after the main switch stops conduction and the non-saturating magnetic begins releasing its energy. This effectively limits the high voltage flyback over shoot to less than 40–70 volts. This keeps the switch well inside it's safe operating area (SOA) allowing the switch to be run at higher voltages for higher output power and additional efficiency gain, or to use a less expensive lower voltage switch while keeping the same voltage margins. Since external flyback diode D4 and D805 isolate the drain of output switch, faster switching occurs because the output switch does not have to slew the extra capacitance of the typical snubber circuit. Note that this circuit does not attempt to absorb the flyback in large RC networks that generate additional heat. Nor does it attempt to stuff the flyback to ground, adding capacitance and slowing the output switch, increasing switching losses. Sub-circuit DSN may be used in parallel with any slower rectifier such as flyback diode D4 to assist the main rectifier. This providing additional protection to the switch and rectifying the portion of the flyback pulse before the main rectifier begins condition. That high frequency energy ends up as heat or radiated noise.

Figure 31:
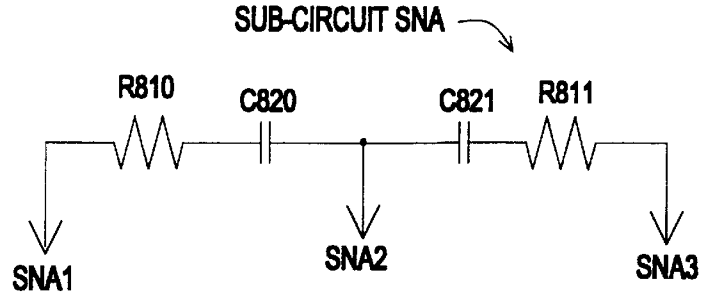
FIG. 31 is a schematic diagram of the alternate snubber sub-circuit SNA.

FIG. 31 snubber sub-circuit SNA.

FIG. 31 is a schematic diagram of a snubber sub-circuit of the invention. The snubber sub-circuit SNA is comprised of resistor R810 and R811 and capacitors C820 and C821.

| FIG. 31 Element | Table Value/part number |
|---|---|
| R810 | 500 pF |
| C811 | 339 pF |
| C820 | 12 ohm |
| C821 | 10 ohm |

Figure 32:
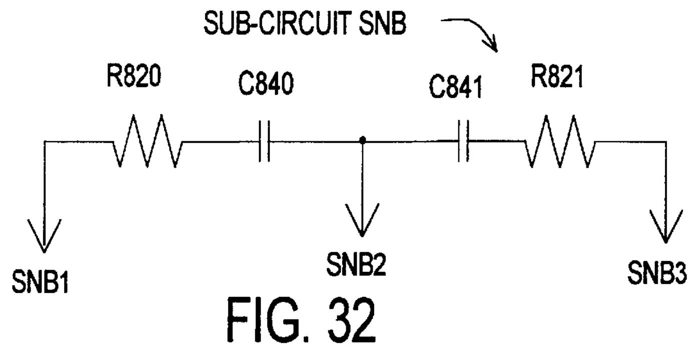
FIG. 32 is a schematic diagram of the mirror snubber sub-circuit SNB.

Node SNA1 connects to series resistor R810 to capacitor C820 to node SNA2 then to capacitor C821 and series resistor R811 to node SNA3. Node SNA1 connects to the external magnetic element center tap. Node SNA2 connects to the drain terminal of the external output switch and to flyback side of the inductive load. Node SNA3 connects to the source terminal of the external output switch. Resistor R810 and C820 attempt to absorb part of the flyback to reduce voltage transients across the switch. Part of the flyback is returned to ground by C821. This sub-circuit is used with it is mirror SNA (FIG. 31) across the external push-pull switches. The "snubbering" action slows the rise of the flyback giving time for the external rectifier diodes D8 and D9 of FIGS. 25 or 25A to start conduction. The circuit efficiently manages high frequency flyback pulses. FIG. 32 snubber sub-circuit SNB FIG. 32 is a schematic diagram of a snubber sub-circuit of the invention. The snubber sub-circuit SNB comprises resistor R820 and R821 and capacitors C840 and C841.

| FIG. 32 Element | Table Value/part number |
|---|---|
| C840 | 500 pF |
| C841 | 330 pF |
| R820 | 12 ohm |
| R821 | 10 ohm |

Node SNB1 connects to series resistor R820 to capacitor C820 to node SNA2 to capacitor C841 and to series resistor R821 to node SNB3. Node SNB1 connects to the external magnetic element center tap. Node SNB2 connects to the drain terminal of the external output switch and to flyback side of the inductive load. Node SNB3 connects to the source terminal of the external output switch. Resistor R820 and C840 attempt to absorb part of the high frequency flyback to reduce voltage transients across the switch. C841 and R821 return part of the flyback to ground. The "snubbering" action slows the rise of the flyback giving time for the external rectifier diodes D8 and D9 of FIG. 25 or 25A to start conduction. The circuit efficiently manages high frequency flyback pulses.

FIG. 33 Pulse/Frequency modulator PWFM.

FIG. 33 is the inventions PWM (pulse width modulator) and FM (frequency modulator) sub-circuit. Sub-circuit PWFM consists of resistors R401, R402, R403, and R404 capacitors C401, C402, C403, C404, C405 and C406, controller IC U400 and diode D401.

| FIG. 33 Element | Table Value/part number |
|---|---|
| R404 | 50 k ohms |
| C406 | 100 uf |
| C401 | 0.22 uF |
| C403 | 0.01 uF |
| C405 | 2200 pF |
| C404 | 470 pF |
| C402 | 0.22 uF |
| R403 | 50 k ohms |
| D401 | RLS139 (low leakage) |
| R401 | 2.2 MEG ohms |
| R402 | 150 k ohms |
| U400 | MIC38C43 |

Control element U400 connects to a circuit with the following series connections: from pin 1 to feedback pin PW1 then to the wiper of adjustable resistor R404 to return node PWFM0. Resistor R404 may be replaced with two fixed resistors. Capacitor C403 is connected from pin 2 to pin 1. Capacitor C403 is used to filter the error amp output. The upper half of resistor R404 is connected to node REF1 pin 8 the 5.0-Volt internal reference. Internal 5.0-volt reference U400 pin 8 or Node REF1 is connected to the upper half of resistor R403 and through capacitor C402 to return node PWFM0. The reference provides current to external feed back networks. Wiper of R403 connects to node FM1 to pin 4, through R402 to pin 3, and through C404 to return node PWFM0. Resistor R403 may be replaced with two fixed resistors. Pulse width timing capacitor C404 connects pin 3 to return node PWFM0. Low leakage diode D401 anode is connected to pin 3 cathode to output pin 6 node CLK. Resistor R404 sets the nominal pulse width of output pin 6 node CLK. The pulse width can be adjusted from 0 (off) to 95%. Resistor R403 and C404 determine the nominal operating frequency. With application of power 20-volts between Nodes PWFM+ and PWFM0 controller U400 generates an internal 5.0 reference voltage to pin 7 node REF1. Output pin 6 node CLK is set high approximately 20-volts (see oscillograph trace G6 segment 60 FIG. 34). C404 starts to charge through R401 until the voltage across C404 at pin 3 reaches the comparator level (see oscillograph trace G1 segment 61 FIG. 34) at resetting the pin 6 low (see oscillograph trace G6 segment 62 FIG. 34). Capacitor C404 rapidly discharges though D401 (see oscillograph trace G1 segment 63 FIG. 34). Pin 3 remains 0.6-volts above PWFM0 node during the period pin 6 is low (see oscillograph trace G1 segment 64 FIG. 34). On the rising edge of pin 6 capacitor C405 begins to rapidly charge until the voltage in pin 4 reaches the internal comparator level (see oscillograph trace G4 segment 65 FIG. 34). The comparator triggers internal transistor to rapidly discharge C404 (see oscillograph trace G4 segment 66 FIG. 34). The cycle repeats with output pin 6 being set high. External feedback current applied to U400 pin 1 and node PW1 (see oscillograph trace G1 segment FIG. 34) follows the actual output voltage. Oscillograph trace G1 segment 67 (FIG. 34) is the period when the output switch conducting storing energy in the NSME. Oscillograph trace G1 segment 68 (FIG. 34) is the period when the output switch is off allowing storing energy in the NSME to be transferred to the storage capacitor. Application of external current source or feed back network to pin 1 or node PW1 allows the pulse width to be modulated. Removing current from PW1 lowers the comparator level causing the comparator to trigger at lower voltages across C404 reducing the pulse width. Introducing current into node PW1 increases pulse width from nominal to maximum of 95%. Resistor R404 and C404 determine the nominal pulse width. This design allows the CLK output to be pulse width modulated. Application of external feed back network to pin 4 or node FW1 allows the frequency to be modulated. Removing current from FW1 slows the charging of C405. Longer charging time lowers the frequency from the nominal setting. This arrangement allows the CLK output to frequency modulated. When used with a resonant controller, R403 and C405 determine the nominal frequency typically equal to the tank resonant frequency. The external feedback is configured to lower the frequency from nominal (maximum output) to zero frequency "off". When used as a pulse-width controller the nominal is set to maximum pulse width of about 90% feedback reduces the pulse-width. Sub-circuit PWFM may be simultaneously frequency and pulse width modulated. This configuration and mode of operation is unique to this instant invention. Feeding back of the output to the error amplifier is a unique mode of operation for control element U400. Sub-circuit PWFM combines large dynamic range, precise control and fast response.

Figure 34:
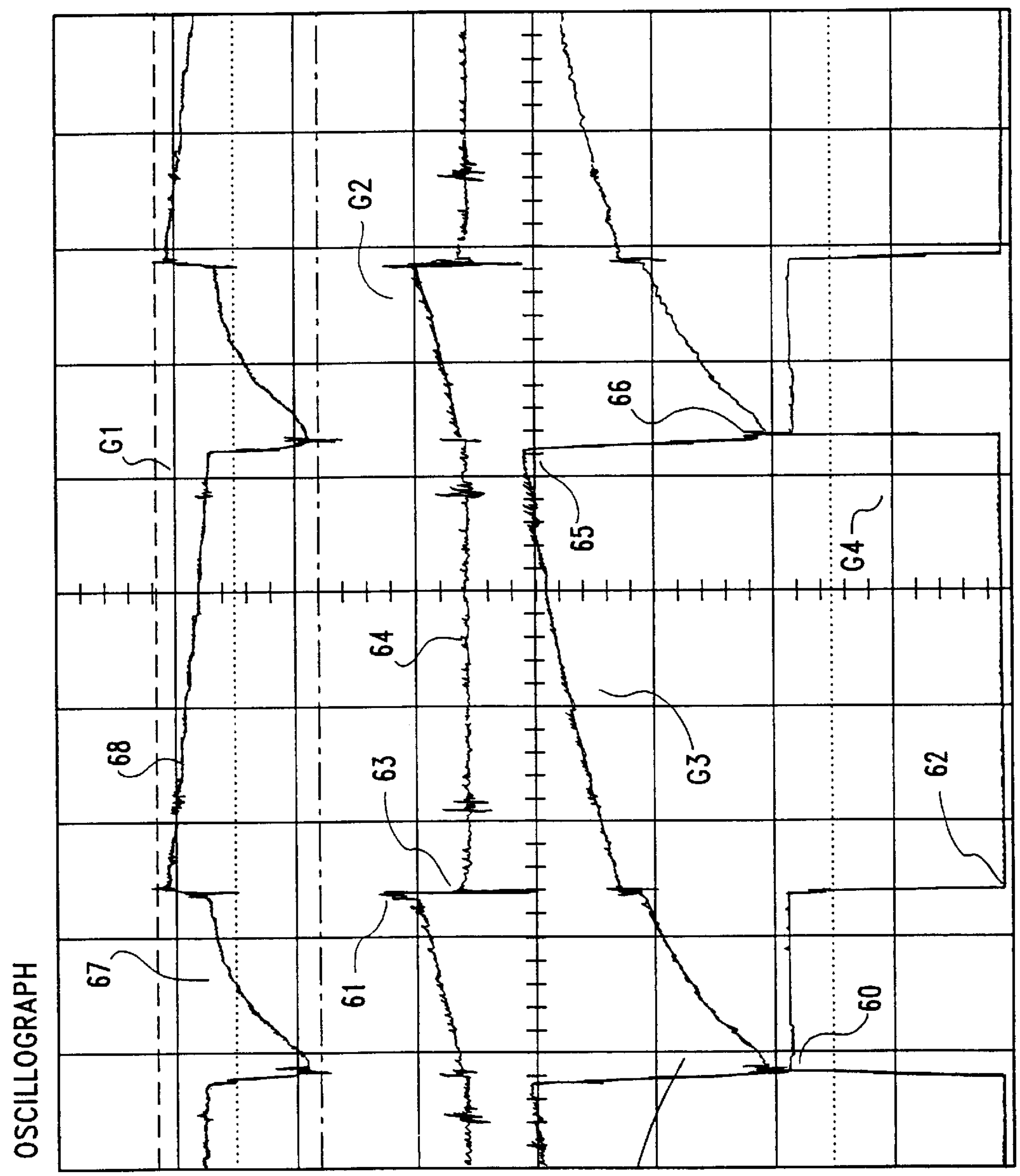
FIG. 34 is an oscillograph of node voltages measured during operation of sub-circuit PWFM (FIG. 33).

FIG. 34 Oscillograph traces of the PWFM (FIG. 33) controller in the pulse-width modulation mode.

FIG. 35 Oscillograph trace of the TCTP (FIG. 8) resonant converter primary voltage. FIG. 35 is an oscillograph trace of the voltage developed across capacitor C10 (FIG. 8). In this embodiment the supply VBAT was only 18-volts.

The primary 100 (FIG. 18) inductance 203 uH was achieved by 55 turns on a 26 u 2.28 oz. KoolMu magnetic element 101. The secondary winding 103 (FIG. 18) is 15 turns on core 101. A 5.5-watt load is connected to winding 103. The NSME primary 100 (FIG. 18) developed an excitation voltage of 229 volts peak more than 10 times VBAT. Tank converters TCTP and TCSSC (FIG. 7) take advantage of the desirable properties of the non-saturating magnetic to develop large flux biases. The useful large flux may harvested into useful power by addition of "flux nets" windings to the magnetic element.

Figure 36:
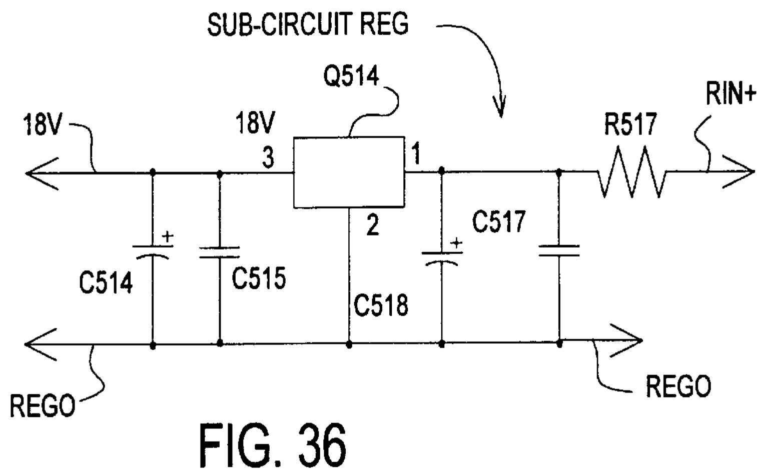
FIG. 36 is a schematic diagram of the non-isolated 18-Volt DC control power sub-circuit REG.

FIG. 36 Regulated 18_Volt DC control power sub-circuit REG Sub-circuit REG consists of resistor R517, regulator Q514 and capacitors C514, C515, C516, C518, and C517.

| FIG. 36 Element | Table Value/part number |
|---|---|
| Q514 | LM7818 |
| C515 | 0.1 uF |
| C517 | 0.1 uF |
| C514 | 10 uF |
| C518 | 10 uF |

Pin REG0 connects to the external power source return. Node REG0 is also the return line it connects to Q514 pin 2, and capacitors C518, C514, C515, and C517. Resistor R517 is connected to the pin 1 (input) node of voltage regulator Q514 and to input pin RIN+. Voltage regulator Q514 Pin 3 is the 18 vdc regulated DC output is connected to the capacitors C515, C514 and output pin 18V. Capacitors C515, C517 are solid dielectric type is used to filter high frequency ripple and to prevent Q514 from oscillating. Sub-circuit REG provides regulated power for control circuits and output switch buffer AMP (FIG. 29).

Figure 37:
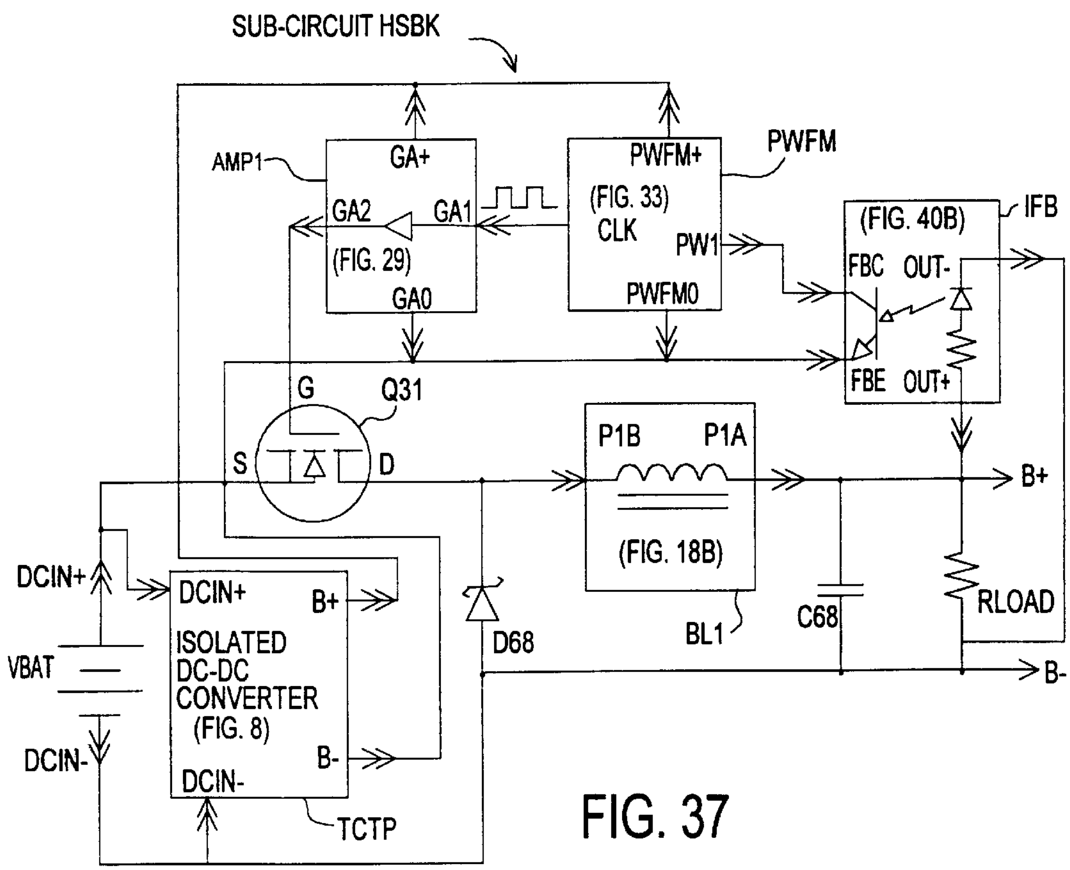
FIG. 37 is a schematic for a non-isolated high-side switch buck converter sub-circuit HSBK.

FIG. 37 is a schematic for a non-isolated high side switch buck converter sub-circuit HSBK. FIG. 37 is a non-isolated high side switch buck converter sub-circuit HSBK. This converter topology consists of a non-isolated high efficiency buck stage, which provides regulated power to an efficient push-pull isolation stage. Sub-circuit HSBK consists of diode D8, capacitor C8, FET transistor Q31, sub-circuit TCTP (FIG. 8), sub-circuit BL1 (FIG. 18B), sub-circuit IFB (FIG. 40B), sub-circuit AMP (FIG. 29) and sub-circuit PWFM (FIG. 33).

| FIG. 37 Element | Table Value/part number |
|---|---|
| C68 | 250 uf |
| D68 | MUR820 |
| Q31 | IRF540N |

External power source VBAT connects to pins DCIN+ and DCIN−. Pin DCIN+ connects to transistor Q31 source, sub-circuit PWFM pin PWFM0, sub-circuit AMP pin GA0, and sub-circuit IFB pin FBE, sub-circuit TCTP pins DCIN+ and B−. Regulated 18-volt output from sub-circuit TCTP pin B+ connects to sub-circuit AMP pin GA+ and to sub-circuit PWFM pin PWFM+. This provides the positive gate drive relative to the source of Q31. Power source VBAT return is connected to pin DCIN−, sub-circuit TCTP pin DCIN−, diode D68 anode, capacitor C68, RLOAD, sub-circuit IFB pin OUT−, output pin B− and ground/return node GND. Sub-circuit PWFM is designed for adjustable pulse-width operation from 0 to 90%, maximum pulse width occurs with no feedback current to pin PW1. Increasing the feedback current reduces the pulse-width and output voltage from converter HSBK. Sub-circuit PWFM clock/PWM output pin CLK is connected to the input pin GA1 of buffer sub-circuit AMP. The output of sub-circuit AMP pin GA2 is connected to the gate of Q31. The drain of Q31 is connected to sub-circuit BL1 pin P1B and the cathode of D68. Pin P1A of sub-circuit BL1 is connected to capacitor C8, sub-circuit IFB pin OUT− and RLOAD. With sub-circuit PWFM pin CLK high buffer AMP output pin GA2 charges the gate of transistor switch Q31. Switch Q31 conducts charging capacitor C68 through NSME BL1 from source VBAT and storing energy in BL1. Feedback output pin FBC from sub-circuit IFB is connected to sub-circuit PWFM pulse-width adjustment pin PW1. As the output voltage reaches the designed level sub-circuit IFB removes current from PW1 commanding PWFM to reduce the pulse-width or on time of signal CLK. After sub-circuit PWFM reaches the commanded pulse-width PWFM switches output pin CLK low turning off Q31 stopping the current into BL1. The stored energy is released from NSME BL1 into the now forward biased diode D68 charging capacitor C68. By modulating the on time of switch Q31 the converter "bucks" applied voltage and efficiently regulates to a lower voltage. Regulated voltage is developed across Nodes B− and B+. Sub-circuit IFB provides the isolated feedback voltage to the sub-circuit PWFM. When sub-circuit IFB senses the converter output (nodes B+ and B−) is at the designed voltage more current is conducted by the phototransistor. Sinking current from PM1 commands the PWFM to a shorter pulse-width thus reducing the converter output voltage. In the event the feedback signal from IFB commands the PWFM to minimum output. Gate drive to switch Q31 is removed stopping all buck activity capacitor C68 discharges through RLOAD. Input current from VBAT is sinusoidal making the converter very quiet. As such the switch Q31 is not exposed to large current spikes common to saturating magnetic prior art. Thus placing less stress on the switches thereby increasing the MTBF. Sub-circuit HSBK takes advantage of the desirable properties of the NSME in this converter topology.

Figure 38:
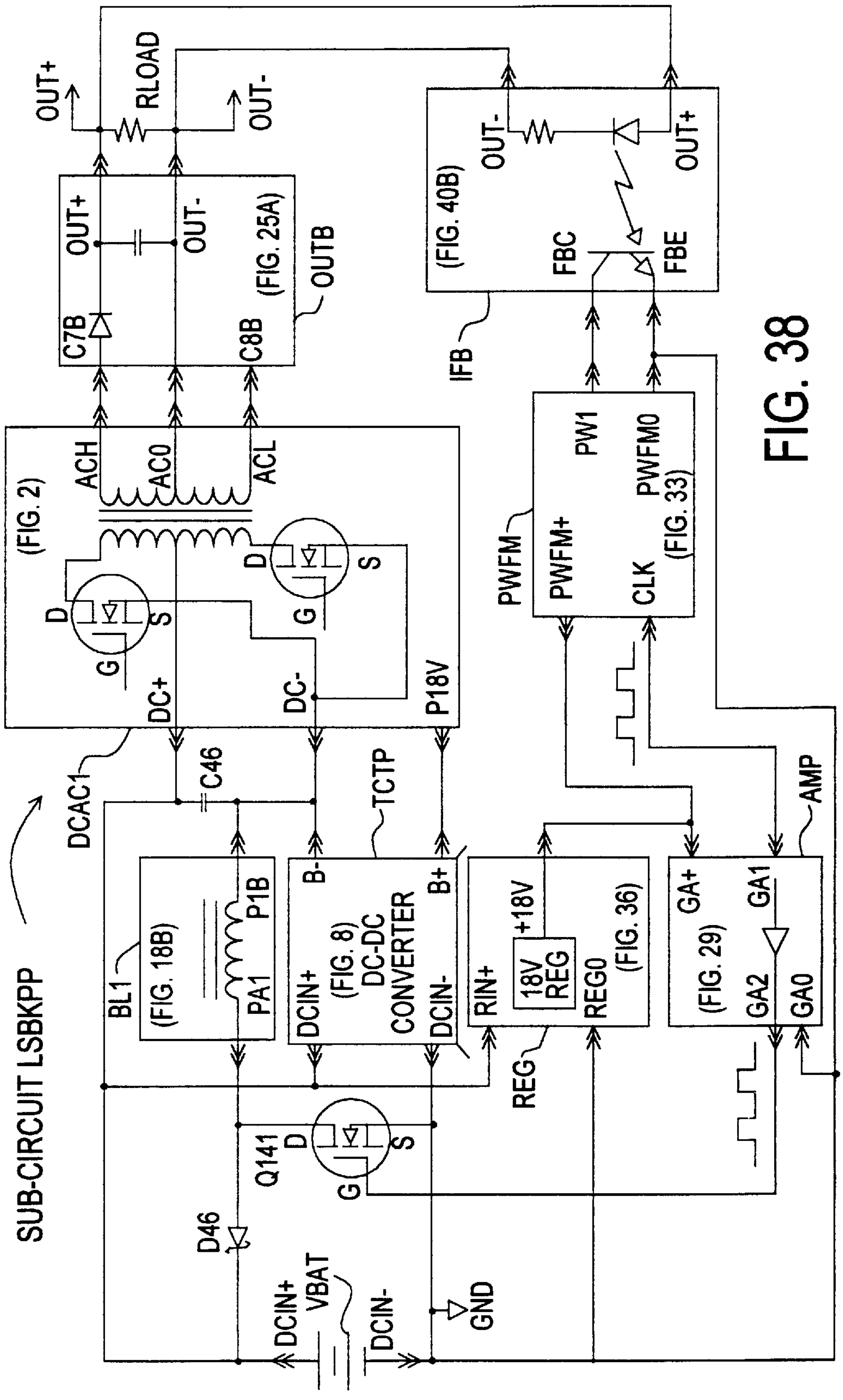
FIG. 38 is a schematic for the low-side buck regulated two-stage converter embodiment with isolated push-pull output sub-circuit LSBKPP.

FIG. 38 is a schematic for an isolated two-stage low side switch buck converter sub-circuit LSBKPP. This converter topology consists of a high efficiency low-side switch buck stage, which provides regulated power to an efficient push-pull isolation stage. An efficient center-tap fullwave rectifier provides rectification. Sub-circuit LSBKPP consists of diode D46, capacitor C46, FET transistor Q141, sub-circuit REG (FIG. 36), sub-circuit OUTB (FIG. 25A), sub-circuit BL1 (FIG. 18B), sub-circuit TCTP (FIG. 8), sub-circuit IFB (FIG. 40B), sub-circuit AMP (FIG. 29) sub-circuit DCAC1, and sub-circuit PWFM (FIG. 33).

| FIG. 38 Element | Table Value/part number |
|---|---|
| C46 | 250 uf |
| D46 | MUR820 |
| Q141 | IRF540N |

External power source VBAT connects to pins DCIN+ and DCIN−. From pin DCIN+ connects to sub-circuit REG pin RIN+, D46 cathode, capacitor C46, sub-circuit TCTP (FIG. 8) pin DCIN+, and sub-circuit DCAC1 pin DC+. Voltage regulator sub-circuit REG output pin +18V connects to sub-circuit AMP pin GA+ and to sub-circuit PWFM pin PWFM+. Sub-circuit REG provides regulated low voltage power to the controller and to the main switch buffer. VBAT negative is connected to pin DCIN− and ground return node GND. Node GND connects to sub-circuit PWFM pin PWFM0, sub-circuit AMP pin GA0, Q141 source, sub-circuit IFB pin FBE, sub-circuit REG pin REG0 and sub-circuit TCTP pin DCIN−. Sub-circuit PWFM (FIG. 33) is designed for variable pulse width operation. The nominal frequency is between 20–600 Khz PWFM is configured for maximum pulse width 90% (maximum buck voltage) with no feedback current from sub-circuit IFB. Increasing the feedback current reduces the Q111 on time reducing the voltage to the push-pull stage and the output from converter LSBKPP. Sub-circuit PWFM clock output pin CLK is connected to the input pin GA1 of buffer sub-circuit AMP (FIG. 29). The output of switch speed up buffer sub-circuit AMP pin GA2 is connected to the gate of Q141. Floating isolated 18-volt power from sub-circuit TCTP pin B+ connects to sub-circuit DCAC1 pin P18V. The drain of Q141 is connected to sub-circuit BL1 pin P1A and the anode of D46. The return line of sub-circuit DCAC1 pin DC− connects to sub-circuit BL1 pin P1B, sub-circuit TCTP pin B− and C46. With sub-circuit PWFM pin CLK high buffer AMP output pin GA2 charges the gate of transistor switch Q141. Switch Q141 conducts reverse biasing diode D46; capacitor C46 starts charging through NSME BL1 from source VBAT. During the time Q141 is conducting, energy is stored in NSME sub-circuit BL1. Charging C46 provides power to final push-pull converter stage DCAC1. The output of the output rectifier sub-circuit OUTB is connected to feedback sub-circuit IFB output pin FBC from sub-circuit IFB is connected to sub-circuit PWFM pulse-width adjustment pin PW1. Sub-circuit IFB removes current from PW1 commanding PWFM to reduce the pulse-width or on time of signal CLK. After sub-circuit PWFM reaches the commanded pulse-width PFFM switches CLK low turning off Q141 stopping the current into BL1. The energy is released from NSME BL1 into the now forward biased flyback diode D46 charging capacitor C46. By modulating the on time of switch Q141 the converter voltage is regulated. Regulated voltage is developed across C46 Nodes DC+ and GND. Providing energy to the isolated constant frequency push-pull DC to AC converter sub-circuit DCAC1 (FIG. 2). Sub-circuit DCAC1 provides efficient conversion of the regulated buck voltage to a higher or lower voltage set by the magnetic element winding sub-circuit PPT1 (FIG. 19) ratio. The center tap of the push-pull output magnetic is connected to, sub-circuit OUTB pin OUT−, RLOAD, sub-circuit IFB pin OUT− and the pin OUT− forming the return line for the load and feedback network. Output of sub-circuit DCAC1 pin ACH is connected to sub-circuit OUTB pin C7B. Output of sub-circuit DCAC1 pin ACL is connected to sub-circuit OUTB pin C8B. Sub-circuit OUTB provides rectification of the AC power generated by sub-circuit DCAC1. As the non-saturation magnetic converter is very quite minimal filtering is required by OUTB. This further reduces cost and improves efficiency as losses to filter components are minimized. Sub-circuit IFB provides the isolated feedback current to the sub-circuit PWFM. When sub-circuit IFB senses the converter output (nodes OUT+ and OUT−) is greater than the designed/desired voltage, current is removed from node PM1. Sinking current from PM1 commands the PWFM to a shorter pulse-width thus increasing the buck action and reducing the first stage converter output voltage. In the event the feedback signal from IFB commands the PWFM to minimum output. Gate drive to switch Q141 is removed stopping all buck activity capacitor discharging C46. Input current from VBAT to charge C46 is sinusoidal making the converter very quiet. In addition the switch Q141 is not exposed a potentially destructive current spike. Placing less stress on the switches thereby increasing the MTBF. Sub-circuit LSBKPP takes advantage of the desirable properties of the NSME in this converter topology. Adjusting the NSME BL1 (FIG. 18B) sets the amount of buck voltage available to the final push-pull isolation stage. Greater efficiencies are achieved at higher voltages. The final output voltage is set by the turns ratio of the push-pull element PPT1 (FIG. 19). Converter LSBKPP provides efficient conversion from high voltage sources into high current isolated output.

Figure 39:
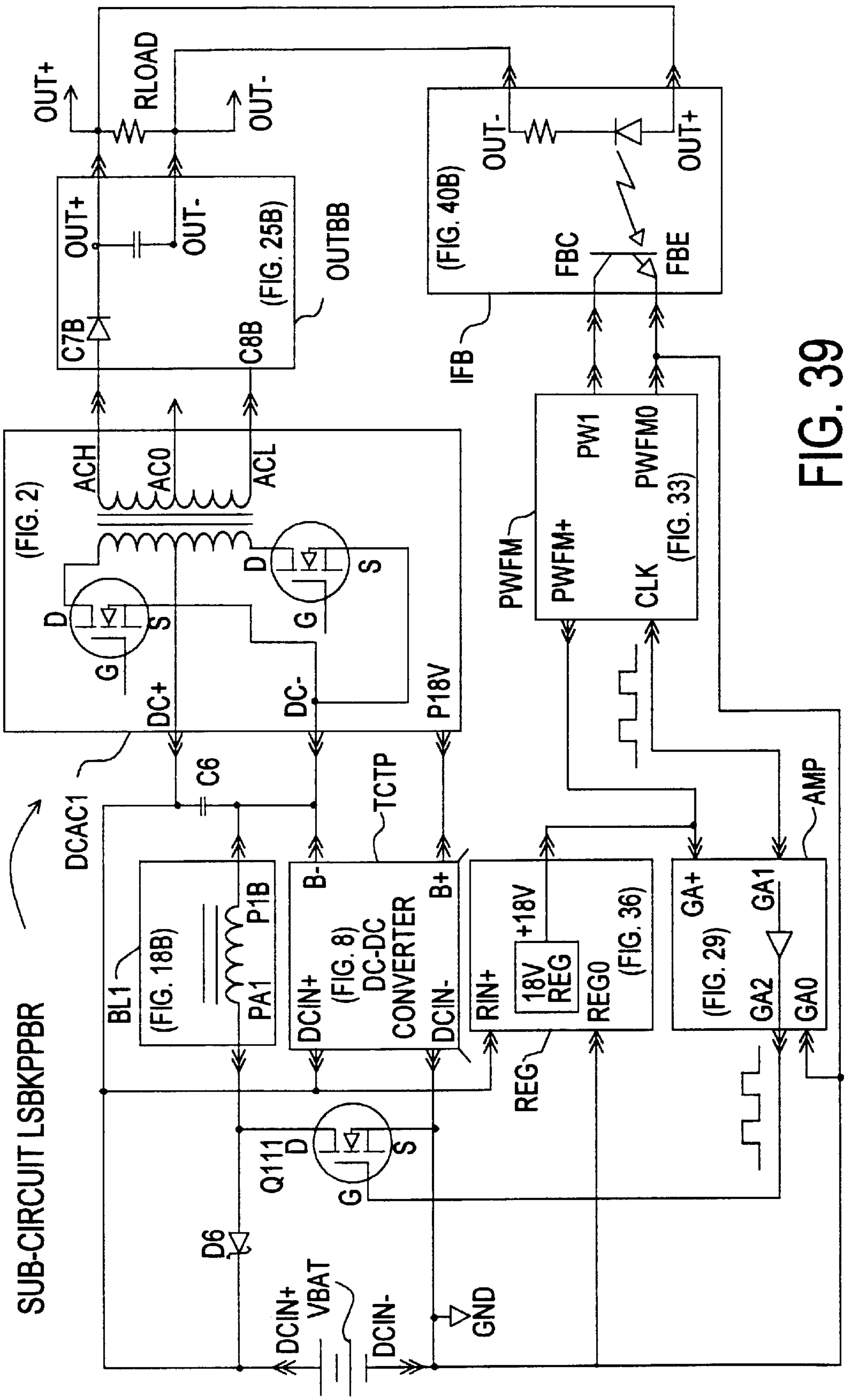
FIG. 39 is a schematic for an alternate isolated two-stage low-side switch buck converter sub-circuit LSBKPPBR.

FIG. 39 is a schematic for an isolated two-stage low side switch buck converter sub-circuit LSBKPPBR. This converter topology consists of a non-isolated high efficiency low-side switch buck stage, which provides regulated power to an efficient push-pull isolation stage. A fullwave bridge rectifier provides rectification. Sub-circuit LSBKPPBR consists of diode D6, capacitor C6, FET transistor Q111, sub-circuit REG (FIG. 36), sub-circuit OUTBB (FIG. 25B), sub-circuit BL1 (FIG. 18B), sub-circuit TCTP (FIG. 8), sub-circuit IFB (FIG. 40B), sub-circuit AMP (FIG. 29), sub-circuit DCAC1 (FIG. 2), and sub-circuit PWFM (FIG. 33).

| FIG. 39 Element | Table Value/part number |
|---|---|
| C6 | 250 uf |
| D6 | MUR820 |
| Q111 | IRFP |

External power source VBAT connects to pins DCIN+ and DCIN−. From pin DCIN+ connects to sub-circuit REG pin RIN+, D6 cathode, capacitor C6, sub-circuit TCTP (FIG. 8) pin DCIN+, and sub-circuit DCAC1 pin DC+. Voltage regulator sub-circuit REG output pin +18V connects to sub-circuit AMP pin GA+ and to sub-circuit PWFM pin PWFM+. Sub-circuit REG provides regulated low voltage power to the controller and to the main switch buffer. VBAT negative is connected to pin DCIN− connects to sub-circuit PWFM pin PWFM0, sub-circuit AMP pin GA0, Q111 source, sub-circuit IFB pin FBE, sub-circuit REG pin REG0, sub-circuit TCTP pin DCIN−. Sub-circuit PWFM (FIG. 33) is designed for variable pulse width operation. The nominal frequency is between 20–600 Khz PWFM is configured for maximum pulse width 90% (maximum buck voltage) with no feedback current from sub-circuit IFB. Increasing the feedback current reduces the Q111 on time reducing the voltage to the push-pull stage and the output from converter LSBKPPBR. Sub-circuit PWFM clock output pin CLK is connected to the input pin GA1 of buffer sub-circuit AMP (FIG. 29). The output of switch speed up buffer sub-circuit AMP pin GA2 is connected to the gate of Q111. Floating isolated. 18-volt power from sub-circuit TCTP pin B+ connects to sub-circuit DCAC1 pin P18V. The drain of Q111 is connected to sub-circuit BL1 pin PA1 and the anode of D6. The return line of sub-circuit DCAC1 pin DC−connects to sub-circuit BL1 pin P1B, sub-circuit TCTP pin B− and C6. With sub-circuit PWFM pin CLK high buffer AMP output pin GA2 charges the gate of transistor switch Q111. Switch Q111 conducts reverse biasing diode D6; capacitor C6 starts charging through NSME BL1 from source VBAT. During the time Q111 is conducting, energy is stored in NSME sub-circuit BL1. Charging C6 provides power to final push-pull converter stage DCAC1. The output of the output rectifier sub-circuit OUTBB is connected to feedback sub-circuit IPB output pin FBC from sub-circuit IFB is connected to sub-circuit PWFM pulse-width adjustment pin PW1. Sub-circuit IFB removes current from PW1 commanding PWFM to reduce the pulse-width or on time of signal CLK. After sub-circuit PWFM reaches the commanded pulse-width PFFM switches CLK low turning off Q111 stopping the current into BL1. The energy is released from NSME BL1 into the now forward biased flyback diode D6 charging capacitor C6. By modulating the on time of switch Q111 the converter voltage is regulated. Regulated voltage is developed across C6 nodes DC+ and DC−. Providing energy to the isolated constant frequency push-pull DC to AC converter sub-circuit DCAC1 (FIG. 2). Sub-circuit DCAC1 provides efficient conversion of the regulated buck voltage to a higher or lower voltage set by the magnetic element winding sub-circuit PPT1 (FIG. 19) ratio. The return node of the sub-circuit OUTBB pin OUT− is connected to RLOAD, sub-circuit DCAC1 pin AC0, sub-circuit IFB pin OUT− and the pin OUT−. Node OUT− is the return line for the load and feedback network. Output of sub-circuit DCAC1 pin ACH is connected to sub-circuit OUTBB pin C7B. Output of sub-circuit DCAC1 pin ACL is connected to sub-circuit OUTBB pin C8B. Sub-circuit OUTBB provides rectification of the AC power generated by sub-circuit DCAC1. As the disclosed non-saturation magnetic converter has minimal output ripple, less filtering is required by OUTBB. This further reduces cost and improves efficiency as losses in filter components are minimized. Sub-circuit IFB provides the isolated feedback current to the sub-circuit PWFM. Open collector output of IFB pin FBC connects to PWFM pin PW1. When sub-circuit IFB senses the converter output (nodes OUT+ and OUT−) is greater than the designed/desired voltage, current is removed from node PM1. Sinking current from PM1 commands the PWFM to a shorter pulse-width thus increasing the buck action and reducing the first stage converter output voltage. In the event the feedback signal from IFB commands the PWFM to minimum output. Gate drive to switch Q111 is removed stopping all buck activity capacitor discharging C6. As the NSME does not saturate the destructive noisy current spikes common to prior art are absent. Input current from VBAT to charge C6 is sinusoidal making the converter very quiet. In addition the switch Q111 is not exposed a potentially destructive current spike. Placing less stress on the switches thereby increasing the MTBF. Sub-circuit LSBKPPBR takes advantage of the desirable properties of the NSME in this converter topology. Adjusting the NSME BL1 (FIG. 18B) sets the amount of buck voltage available to the final push-pull isolation stage. Greater efficiencies are achieved at higher voltages. The final output voltage is set by the turns ratio of the push-pull element PPT1 (FIG. 19). Converter LSBKPPBR provides efficient conversion from high voltage sources such as high power factor AC to DC converters such as sub-circuit ACDCPF (FIG. 4).

Figure 40:
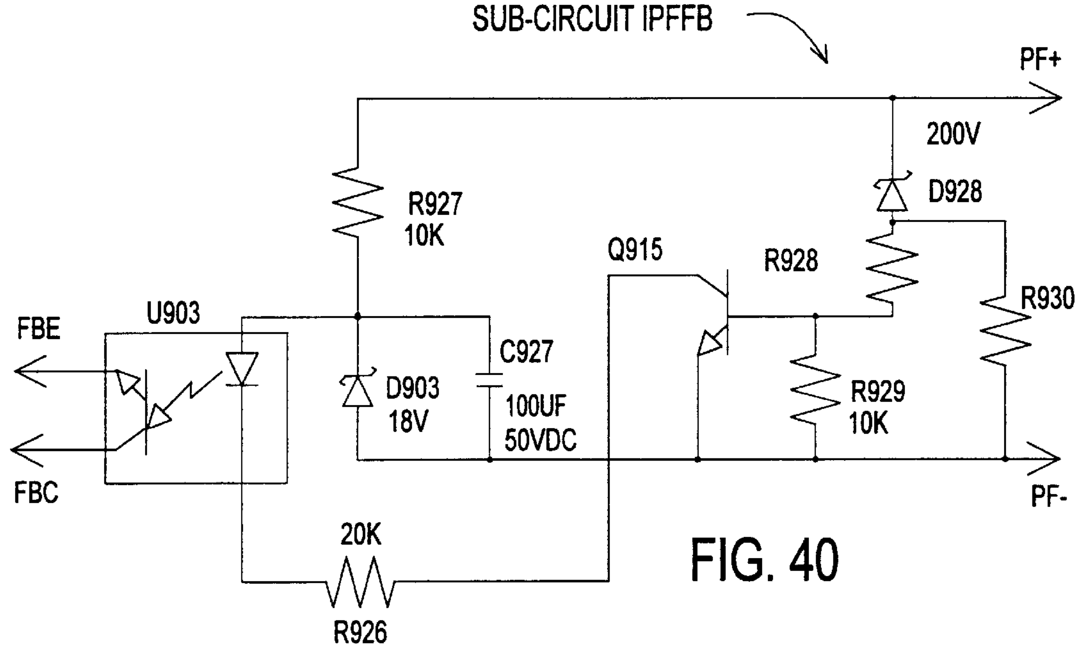
FIG. 40 is a schematic diagram of the over voltage feed back sub-circuit IPFFB.
Figure 40A:
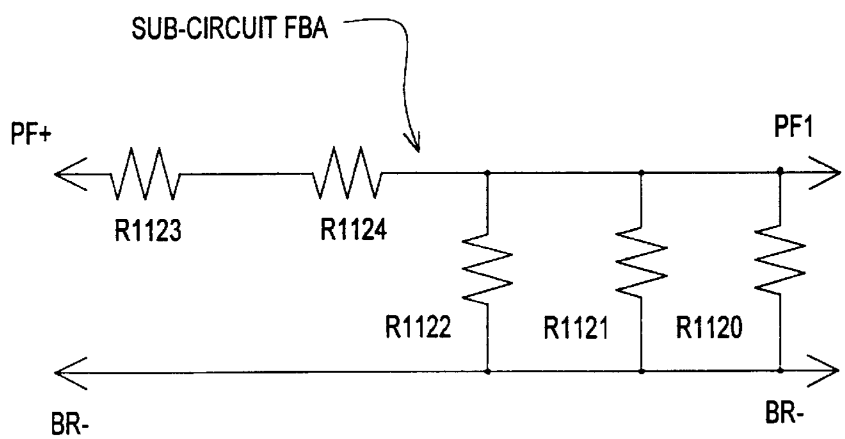
FIG. 40A is a schematic diagram of the non-isolated boost output voltage feedback sub-circuit FBA.
Figure 40B:
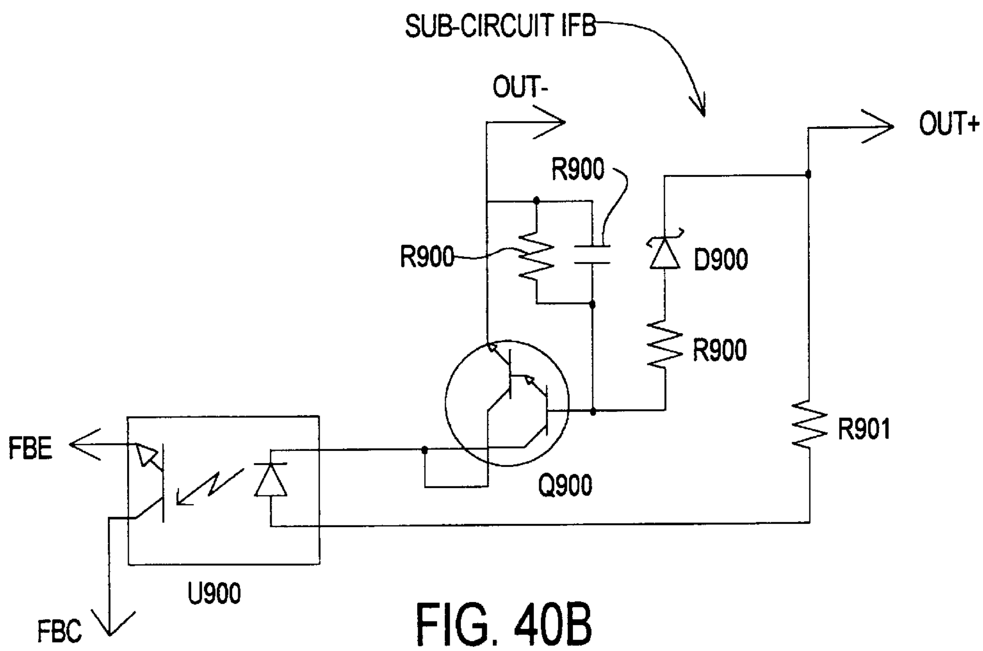
FIG. 40B is a schematic diagram of the isolated output voltage feedback sub-circuit IFB.
Figure 41:
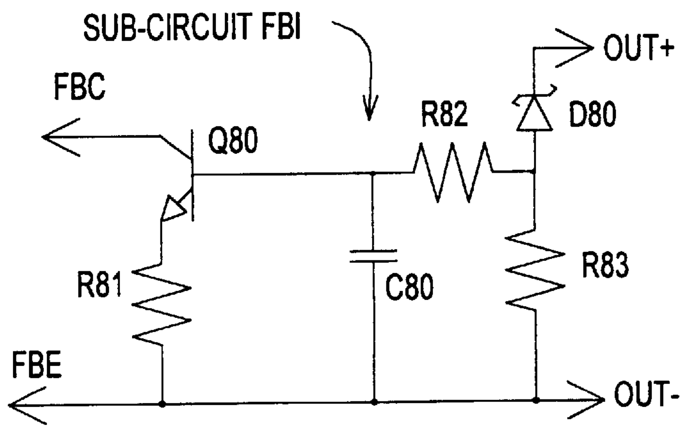
FIG. 41 is a schematic diagram of the non-isolated output voltage feedback sub-circuit FBI.

FIG. 40 PFC over voltage feed back sub-circuit IPFFB.

FIG. 40 is the schematic of the inventions isolated over voltage feed back network sub-circuit IPFFB. Sub-circuit IPFFB consists of Resistors R926, R927, R928, R929 and R930, capacitor C927, zener diodes D928 and D903, transistor Q915 and opto-isolator U903.

| FIG. 40 Element | Table Value/part number |
|---|---|
| U903 | NEC2501 |
| Q915 | FZT705CT |
| D903 | ML5248B (18 v) |
| D928 | 1SMB5956BT3 (200 v) |
| R926 | 20 k ohms |
| R927 | 10 k ohms |
| R928 | 10 k ohms |
| R929 | 10 k ohms |
| R930 | 20 k ohms |

Node PF+ connects through resistor R927 to cathode of D903 and anode of opto-isolator U903. Cathode of diode D903 is connected to pin PF+. Resistor R928 is connected from anode of D928 to base of Q915. Capacitor C927 is connected in parallel with zener diode D903. Resistor R928 limits maximum base current. Resistor R929 is connected between base and emitter of Q915. Resistor R929 is used to shunt excess zener leakage current from the base common in high voltage diodes. Two hundred-volt zener diode cathodes D928 are connected to pin PF+. Anode of D928 is connected to R930 and R928. Resistor R930 provides a path for leakage current from 200-volt zener D928. Resistor R926 limits the maximum current to U903 internal light emitting diode to about 10 ma. Resistor R927 sets the maximum zener current at maximum boost voltage of approximately 200-volts to 20 ma. Transistor Q915 is biased off when the voltage from node PF+ and PF− is less than the zener voltage of 200-volts. Transistor is in a cutoff or non-conducting state no current is injected to U903 LED. The internal phototransistor is also in a non-conducting state. The attached external control sub-circuit is not commanded to change its output. With 200 volts or more applied to nodes PF+ and PF− reverse biased zener diode D928 injects current into the base of Q915. Resistor R927, capacitor C927 and diode D903 provide 18-volts to the collector of Q915. Transistor Q915 conducts current into U903 LED injecting base current into the U903 phototransistor. Modulating the LED current is reflected as variable impedance between FBC and FBE. This phototransistor may be connected as a variable current source or impedance. This sub-circuit senses excessive boost voltage and quickly feeds back to the control sub-circuit (See PFA (FIG. 23), PFB (FIG. 24) or (PWFM FIG. 33)) automatically reducing the boost voltage.

FIG. 40A is a schematic diagram of the non-isolated boost output voltage feed back sub-circuit FBA. Sub-circuit FBA consists of Resistors R1120, R1121, R1122, R1123 and R1124.

| FIG. 40A Element | Table Value/part number |
|---|---|
| R1123 | 499 k ohms |
| R1124 | 499 k ohms |
| R1122 | 6.65 k ohms |
| R1121 | 499 k ohms |
| R1120 | 1 MEG ohms |

Input node PF+ connected to series resistor [R1123+R1124] then to parallel resistors [R20||R21||R22] to the return node BR−. Resistors R1120, R1121, R1122, R1123 and R1124 values are selected for a nominal input voltage of 385-volts and output feed back voltage of 3.85. (See oscillograph G1 FIG. 34) Resistors R1120, R1121, R1122, R1123 and R1124 are shown in surface mount configuration but can be combined into two thru hole-resistors. Feedback output node PF1 is connected to node PF1 of sub-circuit PFA (FIG. 23) or PFB (FIG. 24). Return pin BR− is connected to BR− of PFA (FIG. 23) or PFB (FIG. 24). Nodes FBE and FBC it may also be connected between nodes FM1 pin PWFM0 or PW1 pin PWFM0 of control sub-circuit PWFM (FIG. 33).

FIG. 40B output voltage feed back sub-circuit IFB.

FIG. 40B is the schematic of the inventions isolated low voltage feed back network sub-circuit FBA. Sub-circuit IFB consists of Resistors R900, R901 and R902, zener diode D900, Darlington transistor Q900 and opto-isolator U900.

| FIG. 40B Element | Table Value/part number |
|---|---|
| U900 | NEC2501 |
| Q900 | FZT705CT |
| D900 | IN5261BDICT |
| R900 | 1 k ohms |
| R902 | 4 k ohms |
| R901 | 40 k ohms |

Node OUT+ connects cathode of D900 to R901. Anode of diode D900 is connected to series resistor R900 to base of Darlington transistor Q900. Resistor R902 is connected from base to emitter to Q900. Resistor R901 connects to anode of opto-isolator U900 LED (light emitting diode) the cathode is connected to Q900 collector. Emitter of Q900 is the return current path and connects to pin/node OUT−. Resistor R901 limits the maximum current to U900 internal light emitting diode to 20 ma. Resistor R902 shunts some of the zener leakage current from the base. Zener diode voltage selection sets the converter output voltage a typical value maybe 48-volts. The zener voltage is the final desired output minus two base emitter junction drops (1.4V). Once the OUT+ node reaches the zener voltage a small base current biases Q900 into a conducting state turning "on" opto-isolator U900 internal LED. Resistor R900 limits the maximum base current to Q900. Resistors R900 and R901 are selected to bias Darlington transistor Q900 collector current with nominal voltage across nodes OUT+ and OUT−. Change in voltage between OUT+ and OUT− modulates the opto-isolator U900 LED current in turn changing the base current of U900 internal photo transistor. Phototransistor emitter is node FBE collector is node FBC. Modulating the LED current is reflected as variable impedance between FBC and FBE. This phototransistor may be connected as a variable current source or impedance. When used with control sub-circuit PFA (FIG. 23), PFB (FIG. 24) or (PWFM FIG. 33) the phototransistor is connected as a current shunt. Higher voltage applied to OUT+ and OUT− nodes increases the feedback shunt current commanding the control sub-circuit (See PFA (FIG. 23) or PFB (FIG. 24) or PWFM (FIG. 33)) to reduce the pulse-width or frequency. IFB accomplishes high speed feed back due to the very high gain of the Darlington transistor and the rapid response of the internal converter stage(s) active ripple reduction and excellent load regulation are achieved.

Figure 40C:
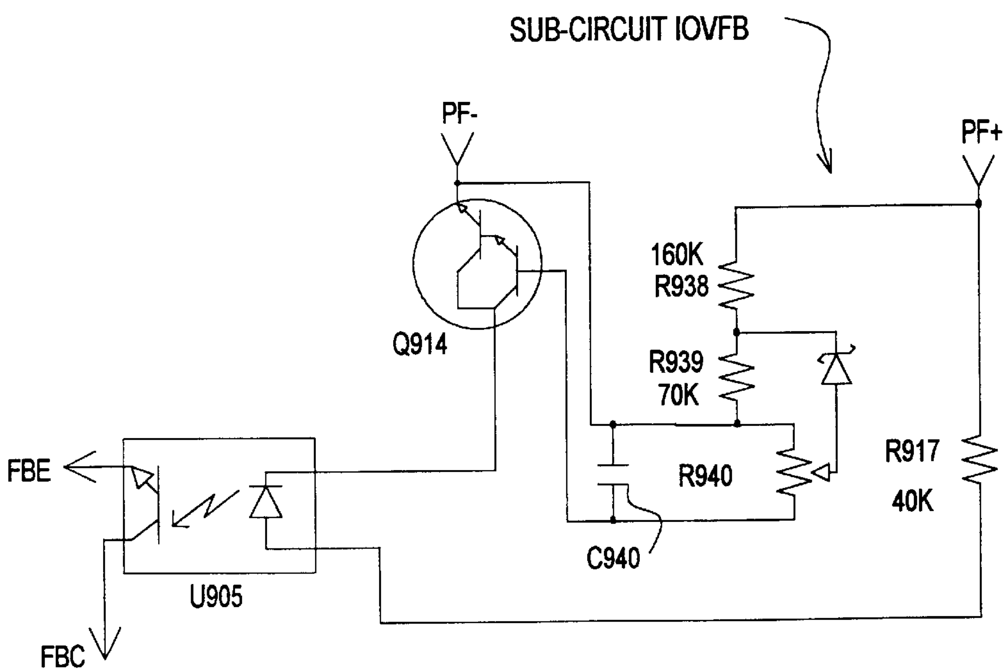
FIG. 40C is a schematic diagram of the alternate isolated over voltage feedback sub-circuit IOVFB.

FIG. 40C is the schematic of the alternate PFC isolated over voltage feed back network sub-circuit IOVFB. Sub-circuit IOVFB consists of resistors of R917, R938, R939 and R940, diode D911, Darlington transistor Q914 and opto-isolator U905.

| FIG. 40C Element | Table Value/part number |
|---|---|
| U905 | NEC2501 |
| Q914 | FZT705CT |
| R938 | 160 k ohms |
| R939 | 70 k ohms |
| D911 | 1N5261BOTCT |
| R940 | 50 k ohms |
| R917 | 40 k ohms |

The output of the PFC at pin PF+ is connected to R917 then to collector of Q914. Resistor R917 sets the maximum current to U905 light emitting diode. Resistor R938 is connected from return node PF+ to zener diode D911 cathode and R938. Resistor R939 is connected from return node PF− to zener diode D911 cathode and R938. Anode of D911 is connected to wiper arm of adjustable resistor R940. One leg of R940 is connected to the base of transistor Q914 the other to R939 and U905 LED anode and R939. Emitter of Q914 is connected to anode of U904. Adjustable resistor R940 sets the maximum or trip voltage before transistor Q914 is biased on. Providing current to U905 LED. Phototransistor emitter is node FBE collector is node FBC. Modulating the LED current is reflected as variable impedance between FBC and FBE. This phototransistor is normally connected as a shunt to force the control element to a minimum output. This sub-circuit senses the boost voltage and feeds back to the PFC. Where excessive boost voltage forces the PFC to automatically reduce the boost voltage.

FIG. 41 output voltage feed back-sub-circuit FBI.

FIG. 41 is the schematic of the alternate low voltage feed back network sub-circuit FBI. Sub-circuit FBI consists of Resistors R81, R82 and R83, zener diode D80, NPN transistor Q80 and capacitor C80.

| FIG. 41 Element | Table Value/part number |
|---|---|
| R81 | 1 k ohms |
| D80 | Zener Voltage = (Desired Output − 0.65 V) |
| Q80 | BCX70KCT |
| C80 | 1000 pf |
| R82 | 1 k ohms |
| R83 | 715 k ohms |

Node OUT+ connects cathode of D80. Anode of diode D80 is connected to through resistor R83 to OUT− and resistor R82 to base of transistor Q80. Capacitor C80 is connected from base to pin OUT−. Capacitor C80 bypasses high frequency to noise to OUT−. Resistor R81 is connected from emitter of Q80 to node OUT−. Resistor R81 adds local negative feedback to reduces the effects of variation in transistor gain. Collector of Q80 is connected to pin FBC. The return current node connects to pins FBE and OUT−. Resistor R82 limits the maximum base current protecting Q80. Resistor R83 shunts some of the zener leakage current from the base. Zener diode voltage selection sets the converter output voltage a typical value maybe 48-volts. The zener voltage is the final desired output minus one base emitter junction drop (0.65-Volts). When the OUT+ node reaches the nominal level reverse biased zener starts to conduct injecting a small base current into Q80. Biasing transistor into a conducting state. Change in voltage between OUT+ and OUT−modulates Q80 collector current. During normal operation the zener diode is biased at it's knee thus small changes in voltage result in relatively large collector current changes. When sub-circuit FBI used with control sub-circuit PFA (FIG. 23), PFB (FIG. 24) or (FIG. 33) the transistor is connected as a current shunt. Higher voltage applied to OUT+ and OUT− nodes increases the feedback shunt current commanding the control sub-circuit (See PFA (FIG. 23) or PFB (FIG. 24) or PWFM (FIG. 33) to reduce the pulse-width or frequency. Sub-circuit FBI provides high-speed feedback and gain to ripple components. With the rapid response of the internal converter stage(s) active ripple reduction and excellent load regulation are achieved.

Figure 42:
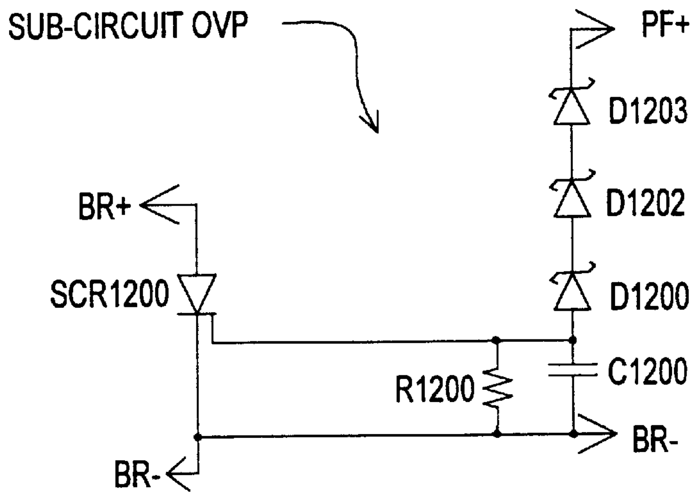
FIG. 42 is a schematic diagram of an over voltage protection sub-circuit OVP.

FIG. 42 over voltage protection sub-circuit OVP1.

FIG. 42 is the schematic of the inventions over voltage protection embodiment sub-circuit OVP1. Sub-circuit OVP1 consists of SCR (silicon controlled rectifier) SCR1200, resistor R1200, capacitor C1200 and zener diodes D1200, D1202 and D1203.

| FIG. 42 Element | Table Value/part number |
|---|---|
| SCR1200 | MCR265-10 |
| D1203 | BZT03-C200 (200 V) |
| D1202 | BZT03-C200 (200 V) |
| D1200 | IN4753 (5.1 v) |
| C1200 | 220 pf |
| R1200 | 10,0 k ohms |

Input pin PF+ is connected to cathode of zener diode D1203, anode of D1203 is connected to series zener diodes [D1202+D1200] then to gate of SCR1200. Noise attenuation network of [R1200||C1200] is connected from SCR SCR1200 gate to the return node BR−. Diodes D1102 and D1103 are both 200-volt; D1101 is a 5.1-volt type the sum of the zener voltages set the trip point of the OVP at 405-volts. Other trip voltages may be implemented by selecting other zener diode combinations. Capacitor C1200 and R1200 prevents leakage current and transients from accidentally tripping the OVP. In the event of very high AC line voltages or a component failure in a feed back loop (FIGS. 40A, 40B, 40C or 40) The boost voltage may quickly rise increase to levels dangerous to the output switch or output storage capacitors. When the output boost voltage of the at node PF+ rises above 405V, zener diodes D1203, D1202 and D1200 conduct a small current into the gate of SCR1200 turning SCR1200 on. Turning SCR1200 on places a low impedance path across the AC line through the rectifier sub-circuit BR (FIG. 22). SCR1200 and bridge rectifier diodes must be selected to withstand the short circuit currents that may exceed 100 amperes until the input fuse opens. Thus quickly limiting the boost output voltage to a safe level. This circuit should never operate under normal AC line voltages. By changing zener voltages this sub-circuit would also be suitable for use in the across the rectifier output to protect the load from an over voltage condition. Sub-circuits OVP1 shuts down the converter with out opening the line fuse. Sub-circuit OVP may be used in combination with OVP1 (FIG. 42A) as a fail-safe back up for critical loads.

Figure 42A:
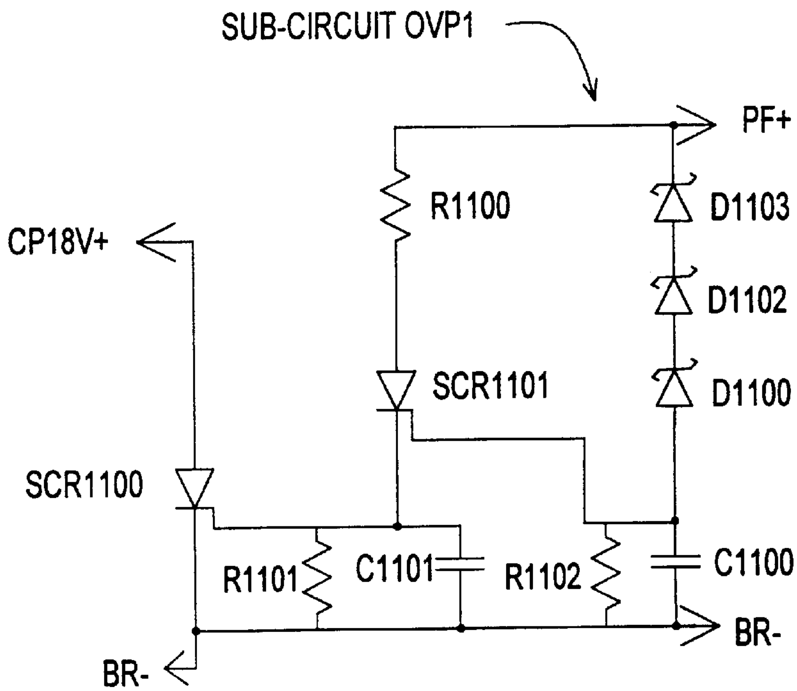
FIG. 42A is a schematic diagram of the isolated over voltage feedback sub-circuit OVP1.

FIG. 42A over voltage protection sub-circuit OVP1.

FIG. 42A is the schematic of the inventions over voltage protection embodiment sub-circuit OVP2. Sub-circuit OVP2 consists of SCRs (silicon controlled rectifier) SCR1101 and SCR1100, resistors R1101 and R1102, capacitors C1100 and C1101 and zener diodes D1100, D1102 and D1103.

| FIG. 42A Element | Table Value/part number |
|---|---|
| SCR1101 | S101E (Teccor) |
| SCR1100 | S601E (Teccor) |
| D1103 | BZT03-C200 (200 V) |
| D1102 | BZT03-0200 (200 V) |
| D1100 | IN4753 (5.1 v) |
| R1100 | 16000 |
| R1101 | 5.1 K ohms |
| R1102 | 5.1 K ohms |
| C1100 | 1200 pf |
| C1101 | 1200 pf |

Figure 42B:
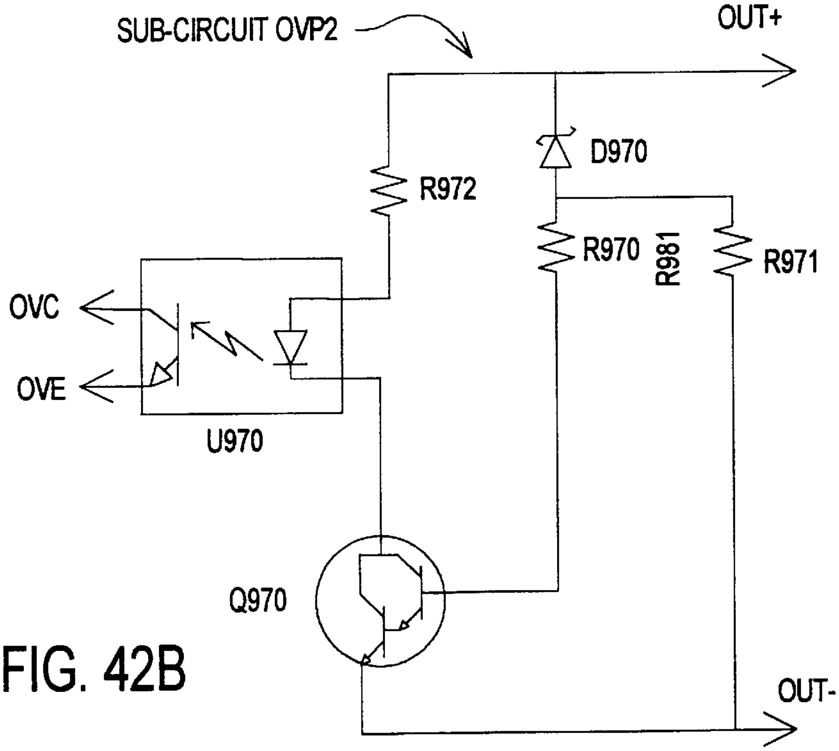
FIG. 42B is a schematic diagram of the over voltage protection sub-circuit OVP2.

Anode of SCR1101 is node/pin CP18V+ that is connected to external control DC source. Return node BR− is connected to SCR1101 cathode and capacitor C1100. Input node PF+ is connected to cathode of zener diode D1103 and to series resistor R1100 then to anode of SCR SCR1102. The anode of D1103 is connected to the cathode of D1102. The anode of D1102 is connected to the cathode of D1100. The cathode of SCR1100 is connected to the gate of SCR1101. The anode of D1103 is connected to series zener diodes [D1102+D1100] then to capacitor C1100 then to the return node BR−. Capacitor [C1200||R1200] prevents leakage current and transients from accidentally tripping OVPB. In the event of very high AC line voltages or a component failure in a feed back loop (IPFFB FIG. 40A, FBA 40B, IFB 40C or FBI FIG. 41) The boost voltage may quickly rise increase to levels dangerous to the output switch or output storage capacitors. When the output boost voltage of the at node PF+ rises above 405V, zener diodes D1103, D1102 and D1100 conduct a small current into the gate of SCR1101 latching SCR1101 on. Resistor R1100 provides holding current for SCR1101. Turning SCR1101 provides gate current to SCR1100, resistors R1100 and R1101 limits the gate current and provides the hold current to SCR1100. With gate current to SCR1100 the SCR is turned on providing a low impedance path from nodes CP18V+ to BR−. This action removes the regulated power to the main switch buffer and or PWM controllers PFA (FIG. 23) or PWFM (FIG. 33) and or buffer AMP (FIG. 29) thus turning off the main switch. The converter is held in an off state until boost voltage PF+ through R1100 can not maintain the holding current of SCR1101. Typically power must be removed from the system to reset SCR1101. The minimum holding current of SCR1101 is typically 5–10 ma. The action of OVP1 quickly limits the boost output voltage to a safe level. This circuit should never operate under normal AC line voltages. By changing zener voltages this sub-circuit would also be suitable for use across the output rectifier to protect the load from an over voltage condition. Sub-circuit OVP1 gracefully shuts down the converter requiring manual intervention to reset the fault. FIG. 42B is the schematic of the isolated output over voltage feed back network sub-circuit OVP2. Sub-circuit OVP2 consists of resistors of R970, R971, and R972, capacitor C970, zener diode D970, SCR SCR970, Darlington transistor Q970 and opto-isolator U970.

| FIG. 42B Element | Table Value/part number |
|---|---|
| D970 | 1N5261BOTCT |
| U970 | NEC2501 |
| Q970 | FZT705CT |
| R970 | 160 k ohms |
| R971 | 10 k ohms |
| R972 | 22 k ohms |
| C970 | 200 pf |

Figure 42C:
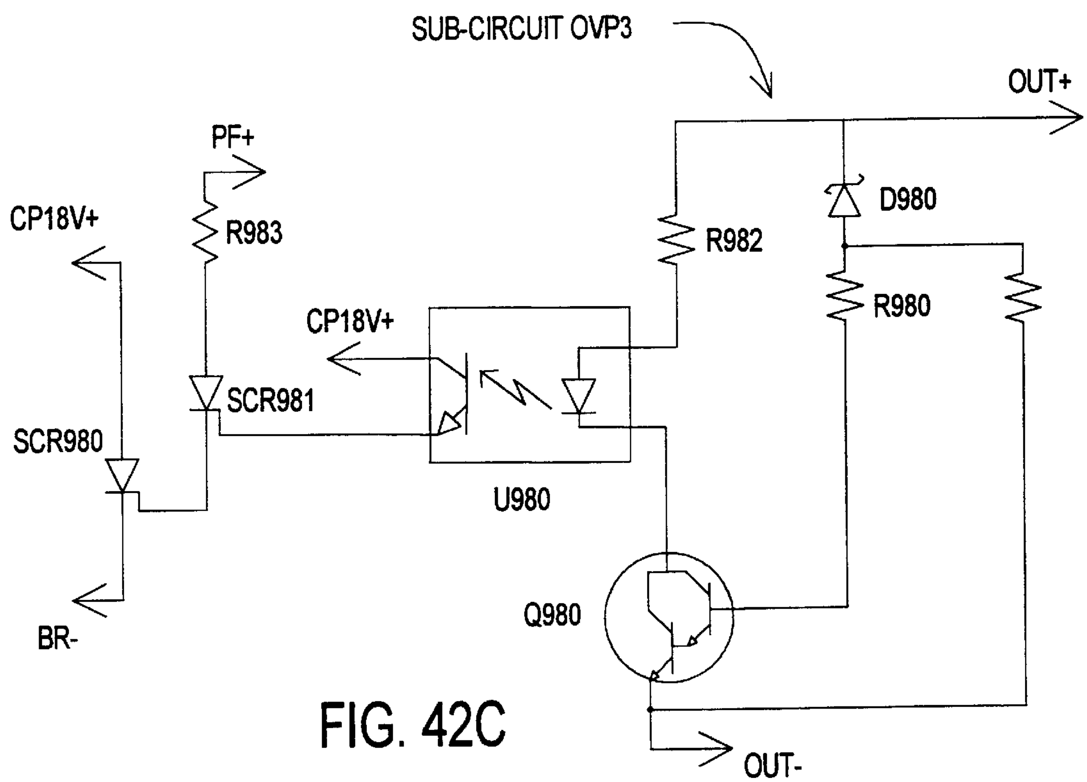
FIG. 42C is a schematic diagram of the isolated over voltage feedback sub-circuit OVP3.

The output of the converter at pin OUT+ is connected to R972 and to the cathode of zener diode D970. The anode of D970 is connected to series resistor R970 then to base of Q970. Resistor R970 sets the maximum base current to Q970. Resistor R971 is connected between the anode of D970 and return node OUT− Anode of light emitting diode U970 is connected to resistor R972 then to OUT+. The cathode of U970 LED is connected to Q980 collector. Emitter of Q980 is connected to return node OUT−. Zener diode D960 sets the maximum or trip voltage before transistor Q970 is biased on providing current to U970 LED. Application of voltage greater than the zener voltage of D970 injects a small base current into Q970. Transistor Q970 turns on the internal LED of U970 placing phototransistor in a conducting state and low impedance to pins OVC and OVC. External push-pull driver sub-circuit PPG (FIG. 43) is shut down immediately by bringing pin PPEN high stopping the output stage. Sub-circuit OVP2 senses the output voltage and quickly feeds back to the push-pull PFC. Where excessive boost voltage forces the PFC to automatically reduce the boost voltage. FIG. 42C is the schematic of the isolated output over voltage crowbar network sub-circuit OVP3. Sub-circuit OVP3 consists of resistors of R980, R981, R982, R983, R984 and R985, capacitors C980, C981 and C982 zener diode D980, SCRs SCR980 and SCR981, Darlington transistor Q980 and opto-isolator U980.

| FIG. 42C Element | Table Value/part number |
|---|---|
| D980 | 1N5261BOTCT |
| SR980 | S601E (Teccor) |
| U980 | NEC2501 |
| Q980 | FZT705CT |
| R980 | 160 k ohms |
| R981 | 10 k ohms |
| R982 | 22 k ohms |
| R983 | 51 k ohms |
| R984 | 1200 ohms |
| R985 | 510 ohms |
| C980 | 200 pf |
| C981 | 1200 pf |
| C982 | 1200 pf |

The converter output is sensed at pin OUT+ reference to pin OUT−. Pin OUT+ is connected to resistor R982 and to the cathode of zener diode D980. The anode of D980 is connected to series resistor R980 then to base of Q980. Resistor R980 limits the base current to Q980. Resistor R981 is connected. between the anode of D980 and return node OUT− to provide a diode leakage current path. Anode of light emitting diode U980 is connected through resistor R982 then to OUT+. The cathode of U980 LED is connected to Q980 collector. Emitter of Q980 is connected to return node OUT−. Zener diode D960 sets the maximum or trip voltage before transistor Q980 is biased on providing current to U980 LED. Application of voltage greater than the zener voltage of D980 injects a small base current into Q980.Emitter of opto-isolator U980 is connected to the gate of SCR981 and through [R984||C982] to return node BR−. Transistor Q980 turns on the internal LED of U980 placing phototransistor in a conducting state and supplying gate current to SRC SCR981 from the external 18-volt source connected to pin CP18V+. Network [R984||C982] prevents false triggering of SCR SCR981. The cathode of SCR SCR981 is connected to the gate of SCR SCR980 and through [R985||C981] to return BR−. With SCR SCR981 turned on gate current is provided to low voltage SCR SCR980. High voltage boost output is connected to pin PF+ resistor R983 supplies hold current to SCR SCR981 holding SCR SCR980 on. SCR SCR980 is selected for low hold current and ability to block the maximum boost voltage on PF+. SCR SRC980 anode is connected to pin CP18V+. SCR SRC980 cathode is connected to return pin BR−. SCR980 clamps the low voltage supply CP (FIG. 26) or CPA (FIG. 27). With the low supply held down the gate drive to the main switch is disabled turning off the converter. With the main switch Q1 (FIGS. 1,3,4) turned off holdup capacitor C17 charges to applied AC line peak. With pin PF+ held near line peak SCRs SCR981 will hold SCR SCR981 on until AC line power is removed to the converter. Sub-circuit OVP3 senses the out of specification output voltage and quickly stop the converter thereby protecting the load and converter with out generating destructive currents like OVP (FIG. 42).

Figure 43:
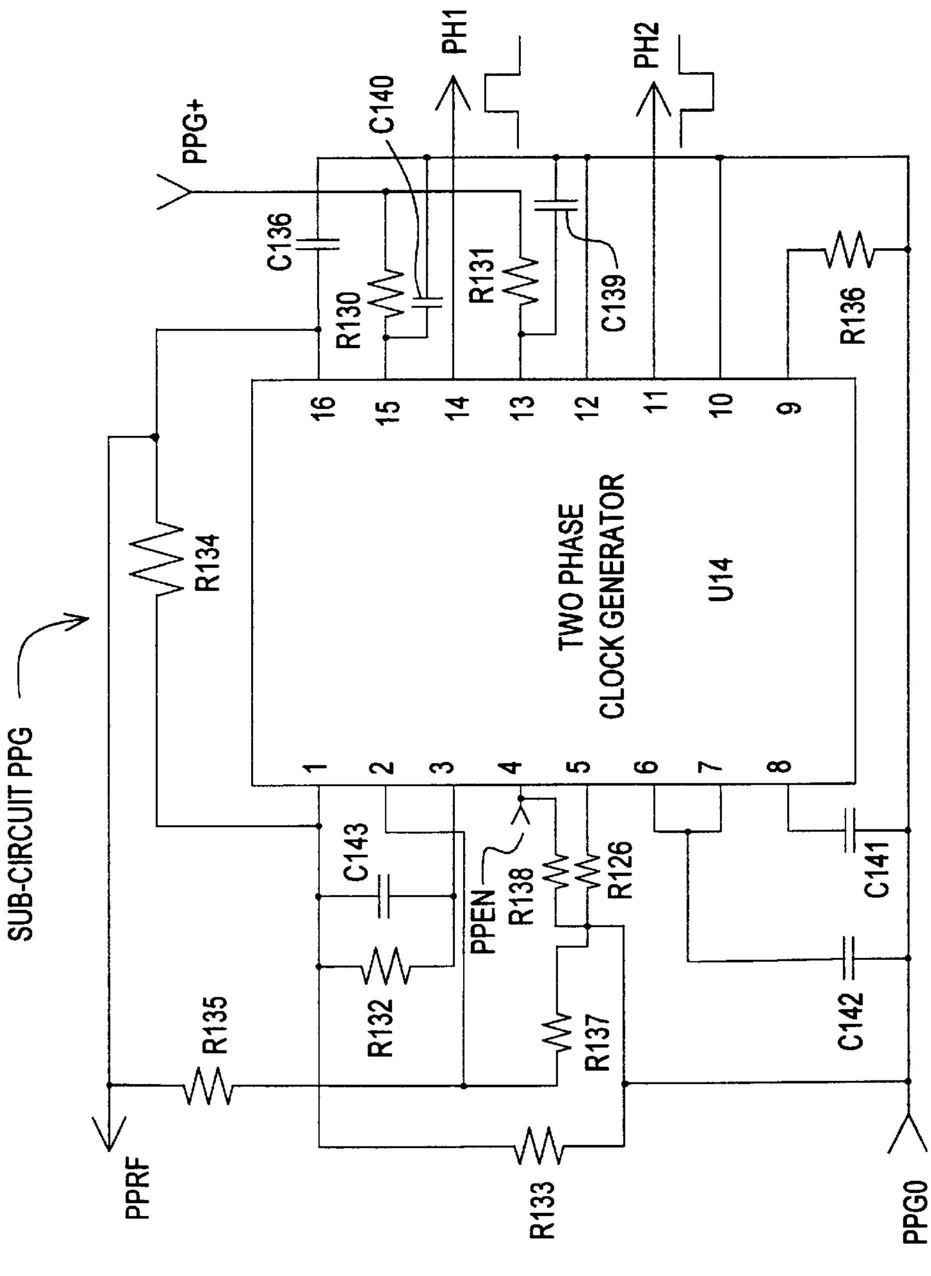
FIG. 43 is a schematic diagram of the Push-pull oscillator sub-circuit PPG.

FIG. 43 Push-pull oscillator sub-circuit PPG FIG. 43 is the push-pull oscillator sub-circuit of the invention. The current implementation uses a Motorola MC33025 pulse width modulator IC to generate the clock signals to drive the push-pull output stage. Sub-circuit PPG consists of U14 a two-phase oscillator, resistors R126, R130, R131, R132, R133, R134, R135, R136 and R137, capacitors C143, C136, C139, C140, C141 and C142.

| FIG. 43 Element | Table Value/part number |
|---|---|
| U14 | MC33025 |
| R126 | 12 k ohms |
| R130 | 10 ohms |
| R131 | 10 ohms |
| R132 | 47 k ohms |
| R133 | 10 k ohms |
| R134 | 100 k ohms |
| R135 | 15 k ohms |
| R136 | 1.5 MEG ohms |
| R137 | 15 k ohms |
| C136 | 0.22 uf |
| C139 | 0.22 uf |
| C140 | 0.22 uf |
| C141 | 0.01 uf |
| C142 | 0.001 uf |
| C143 | .33 uf |

The current implementation uses a Motorola MC33025 pulse width modulator IC to generate the clock signals to drive the push-pull stage. But, any non-overlapping two phase fixed frequency generator could be used. Pin 1 of U14 is connected to [capacitor C143||Resistor R132] then to pin 3. Resistor R134 connects the internal 5.1-volt reference output of U14 pin 16 to pin 1. Resistors R135 in series with R137 from 5.1-volt reference to return node PPG0 form a voltage divider; the center is connected to U14 pin 2 placing pin 2 at 2.55-volts. Resistor R126 is connected from U14 pin 5 to return node PPG0. Resistor R133 is connected from U14 pin 1 to return node PPG0. Timing capacitor C142 is connected from U14 pins 6 and 7 to return node PPG0. Resistor R126 and capacitor C142 set the operating frequency of the internal oscillator. Timing resistor could be replaced with a JFET, MOSFET, transistor, or similar switching device to provide variable frequency operation. The drain of the transistor would be connected to pin 5. The source would be connected to return node PPG0. The variable frequency command voltage/current is applied between gate and source. Capacitor C141 is connected from U14 pin 8 to return node PPG0. Capacitor C136 is connected from U14 pin 16 to return node PPG0. Capacitor C140 is connected from U14 pin 15 to return node PPG0. Capacitor C139 is connected from U14 pin 13 to return node PPG0. Resistor R136 is connected from U14 pin 9 to return node PPG0. U14 pins 10 and 12 is connected to return node PPG0. External power is connected to node/pin PPG+ to PWM (pulse width modulator) IC U14 on pin 15 through resistor R130 connected to the 18-volt control supply. Resistor R131 connected to pin 13 of U14 and PPG+ provides power to the totem-poll output stage. The power return line is connected to node PPG0. IC U14 is designed to operate at a constant frequency of approximately 20–600 Khz with a fixed duty cycle of 35–49.9%. Resistors R135, R137, R133 configure U14 to operate at maximum pulse width. A two-phase non-over lapping square wave is generated on pins 11 node PH2 and pin 14 node PH1 and delivered to speed-up buffers AMP described in FIG. 29. The two-phase generator is configured to prevent the issue of overlapping drive signals that would null the core bias and present excessive current to the switches. Sub-circuit PPG provides the drive to the push-pull switches making efficient use of the NSME.

Although the present invention has been described with reference to a preferred embodiment, numerous modifications and variations can be made and still the result will come within the scope of the invention. No limitation with respect to the specific embodiments disclosed herein is intended or should be inferred.

We claim:

1. A converter comprising:

a power factor corrected flyback converter having a feedback circuit connecting a rectified output from a rectifier circuit to a controller circuit;

said power factor corrected flyback converter further comprising a magnetic element operating in a non-saturated region (NSME);

a push pull converter having a controller which provides a duty cycle and a frequency;

said push pull converter having a rectifier circuit;

said power factor corrected flyback converter providing a variable signal to said push pull converter;

said push pull converter providing a signal having an operating duty cycle and frequency to said push pull rectifier circuit; and said push pull converter further comprising a magnetic element operating in a non-saturated region (NSME).

2. The converter of claim 1, wherein said NSME further comprises a low permeability.

3. The converter of claim 2, wherein the NSME further comprises a mixture of 85% by weight of iron, 6% by weight of aluminum, and 9% by weight of silicon, thereby providing a wide thermal operating range for the magnetic element.

4. The converter of claim 1, wherein the low permeability has a range of one to 500 u.

5. The converter of claim 4, wherein the NSME is an air magnetic element.

6. The converter of claim 1, wherein the NSME further comprises a B-H curve characteristic ranging from B=1 to 10,000 gauss and H=1 to 100 oersteds.

7. The converter of claim 1 further comprising a frequency modulating circuit to optimize an output signal from the NSME.

8. The converter of claim 7, wherein said push pull converter further comprises a double-ended controller having a fixed pulse width.

9. The converter of claim 7, wherein said push pull converter further comprises a double-ended controller having a variable frequency.

10. The converter of claim 7, wherein said push pull converter further comprises a double ended controller having a duty cycle ranging from 40% to 60% of a fixed pulse width.

11. The converter of claim 10, wherein the duty cycle is 50%.

12. The converter of claim 7, wherein said push pull converter further comprises a double-ended controller having an optimizing circuit varying a relationship between pulse width and frequency.

13. The converter of claim 1, wherein said duty cycle is a variable.

14. The converter to claim 1, wherein said duty cycle is a constant.

15. The converter of claim 1 further comprising a control circuit to monitor a bias of the NSME and controls a frequency and a pulse width for optimizing a NSME efficiency.

16. The converter of claim 1, wherein the NSME is selected from the group consisting of:

an air magnetic element;

a molypermalloy powder(MPP) magnetic element;

a high flux MPP magnetic element;

a powder magnetic element;

a gapped ferrite magnetic element;

a tape wound magnetic element;

a cut magnetic element;

a laminated magnetic element; and an amorphous magnetic element.

17. A converter comprising:

a first converter circuit having a rectified output circuit;

a second converter circuit;

said first circuit providing a variable output regulating signal to said second converter circuit in response to a change in a load on the second converter circuit; and said second converter circuit further comprising a magnetic element.

18. The converter of claim 17, wherein the magnetic element further comprises a magnetic element operating in a non-saturated region (NSME).

19. The converter of claim 18, wherein the NSME further comprises a low permeability.

20. A converter comprising:

a first converter circuit having an input node, a controller, a magnetic element having a primary winding and a secondary winding, a feedback circuit from a rectified output of the primary winding to the controller;

said primary winding having an output connection to a primary winding of a second converter circuit;

said second converter circuit having a secondary winding connected to a load; and wherein a change in the load inductively changes a primary winding voltage of the second circuit which in turn changes a load on the primary winding of the first converter circuit, thereby causing the feedback of a first converter circuit to regulate the output of the second converter circuit.

21. The converter of claim 20, wherein the primary winding of the first converter is rectified.

22. The converter of claim 21, wherein the secondary winding of the second converter circuit is rectified.

23. The converter of claim 22, wherein the second converter circuit primary winding is a center tapped winding.

24. The converter of claim 23, wherein the second converter circuit secondary winding is a center tapped winding.

25. The converter of claim 24, wherein the first and the second converter circuit each has a magnetic element operating in a non-saturated region (NSME).

26. The converter of claim 25, wherein the NSME further comprises a low permeability.

27. A converter comprising:

a first converter circuit having an input node, a controller, a magnetic element having a primary winding and a secondary winding, a feedback circuit from a rectified output of the primary winding to the controller;

a second converter circuit having an input node, a controller, a magnetic element having a primary winding and a secondary winding, a feedback circuit from a rectified output of the primary winding to the controller;

said rectified output of the primary winding of the first converter having an output connection to the primary winding of the second converter circuit;

said rectified output of the primary winding of the second converter circuit connected to a primary winding of a third converter circuit;

said third converter circuit having a secondary winding connected to a load; and wherein a change in the load is sensed by an isolator device in the third converter circuit, which in turn modulates a controller in the second converter circuit, thereby regulating an output of the third converter circuit.

28. The converter of claim 27, wherein the primary winding of the first converter is rectified.

29. The converter of claim 28, wherein the secondary winding of the second converter circuit is rectified.

30. The converter of claim 29, wherein the first and the second and the third converter circuit each has a magnetic element operating in a non-saturated region (NSME).

31. The converter of claim 30, wherein the NSME further comprises a low permeability.

* * * * *